(12) United States Patent
Momma et al.

(10) Patent No.: US 10,235,961 B2
(45) Date of Patent: Mar. 19, 2019

(54) FILM FORMATION METHOD AND ELEMENT

(71) Applicant: Semiconductor Energy Laboratory Co., Ltd., Atsugi-shi, Kanagawa-ken (JP)

(72) Inventors: Yohei Momma, Isehara (JP); Takahiro Kawakami, Atsugi (JP); Junpei Momo, Sagamihara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 257 days.

(21) Appl. No.: 15/159,036

(22) Filed: May 19, 2016

(65) Prior Publication Data
US 2016/0349905 A1    Dec. 1, 2016

(30) Foreign Application Priority Data
May 29, 2015    (JP) .................................. 2015-109495

(51) Int. Cl.
*H01B 13/00*    (2006.01)
*H05K 1/11*    (2006.01)
(Continued)

(52) U.S. Cl.
CPC ....... *G09G 3/3696* (2013.01); *G02F 1/13439* (2013.01); *G06F 3/044* (2013.01); *G06F 3/0412* (2013.01); *G09G 3/3677* (2013.01); *G02F 1/13338* (2013.01); *G06F 2203/04102* (2013.01); *G06F 2203/04103* (2013.01); *G06F 2203/04111* (2013.01);
(Continued)

(58) Field of Classification Search
None
See application file for complete search history.

(56) References Cited

U.S. PATENT DOCUMENTS 3,705,846 A    12/1972    Kato et al.
6,495,013 B2    12/2002    Mazur et al.
(Continued)

FOREIGN PATENT DOCUMENTS

JP    2011-500488    1/2011

OTHER PUBLICATIONS

Singh.V et al., "Graphene based materials: Past, present and future", Progress in Materials Science , 2011, vol. 56, pp. 1178-1271, Elsevier.
(Continued)

*Primary Examiner* — Carl Adams
(74) *Attorney, Agent, or Firm* — Robinson Intellectual Property Law Office; Eric J. Robinson

(57) ABSTRACT

A novel element, a novel formation method of a film, or a novel formation method of an element is provided. Alternatively, a film including graphene is formed at low cost and high yield. A formation method of a film including graphene includes a first step of forming a film including graphene oxide that includes a first region and a second region by application of a dispersion liquid in which graphene oxide is dispersed over a substrate and removal of dispersion medium from the applied dispersion liquid, a second step of forming a film including graphene by light irradiation to the first region to reduce the first region, and a third step of removing the second region by washing.

9 Claims, 37 Drawing Sheets

(51) Int. Cl.
*G09G 3/36* (2006.01)
*G06F 3/044* (2006.01)
*G06F 3/041* (2006.01)
*G02F 1/1343* (2006.01)
*G02F 1/1333* (2006.01)

(52) U.S. Cl.
CPC .............. *G06F 2203/04112* (2013.01); *G09G 2300/0809* (2013.01); *G09G 2300/0842* (2013.01)

(56) References Cited

U.S. PATENT DOCUMENTS

| | | | |
|---|---|---|---|
| 8,317,984 | B2 | 11/2012 | Gilje |
| 8,470,477 | B2 | 6/2013 | Miwa et al. |
| 8,519,406 | B2 | 8/2013 | Yoon et al. |
| 8,709,654 | B2 | 4/2014 | Takeuchi et al. |
| 8,715,610 | B2 | 5/2014 | Wallace et al. |
| 8,883,351 | B2 | 11/2014 | Todoriki et al. |
| 2007/0131915 | A1 | 6/2007 | Stankovich et al. |
| 2009/0110627 | A1 | 4/2009 | Choi et al. |
| 2010/0079384 | A1 | 4/2010 | Grivna |
| 2010/0105834 | A1 | 4/2010 | Tour et al. |
| 2010/0303706 | A1 | 12/2010 | Wallace et al. |
| 2011/0070146 | A1 | 3/2011 | Song et al. |
| 2011/0108069 | A1* | 5/2011 | Zwanziger ............. A01N 59/00 134/26 |
| 2013/0045156 | A1 | 2/2013 | Nomoto et al. |
| 2013/0065120 | A1 | 3/2013 | Miwa et al. |
| 2013/0084384 | A1 | 4/2013 | Yamakaji |
| 2013/0134051 | A1 | 5/2013 | Takahashi et al. |
| 2013/0156942 | A1 | 6/2013 | Yamakaji et al. |
| 2013/0164619 | A1 | 6/2013 | Yamakaji et al. |
| 2013/0212879 | A1 | 8/2013 | Ogino |
| 2013/0266859 | A1 | 10/2013 | Todoriki et al. |
| 2013/0337320 | A1 | 12/2013 | Yukawa |
| 2014/0028597 | A1 | 1/2014 | Cho et al. |
| 2014/0104508 | A1 | 4/2014 | Yamazaki et al. |
| 2014/0361980 | A1 | 12/2014 | Iwaki et al. |
| 2014/0375660 | A1 | 12/2014 | Tamaki |
| 2015/0062525 | A1 | 3/2015 | Hirakata |
| 2015/0103023 | A1 | 4/2015 | Iwaki |
| 2015/0155077 | A1* | 6/2015 | Yamazaki ................ H01B 1/04 174/257 |
| 2015/0279577 | A1* | 10/2015 | Uchida ............. H01M 10/0569 429/336 |
| 2016/0219736 | A1* | 7/2016 | Bermel .................. H05K 5/065 |

OTHER PUBLICATIONS

Seo.D et al., "Fully transparent InGaZnO thin film transistors using indium tin oxide/graphene multilayer as source/drain electrodes", Appl. Phys. Lett. (Applied Physics Letters), 2010, vol. 97, pp. 172106-1-172106-3.

Blake.P et al., "Graphene-Based Liquid Crystal Device", Nano Letters, Apr. 30, 2008, vol. 8, No. 6, pp. 1704-1708.

Li.N et al., "High Performance Organic Light-Emitting-Diodes on Graphene Electrode and Thin c-Si TFT for Flexible Display and Lighting", SID Digest '13 : SID International Symposium Digest of Technical Papers, 2013, pp. 848-851.

Park.S et al., "Chemical structures of hydrazine-treated graphene oxide and generation of aromatic nitrogen doping", Nature Communications, Jan. 24, 2012, vol. 3, pp. 638-1-638-8.

Pei.S et al., "Direct reduction of graphene oxide films into highly conductive and flexible graphene films by hydrohalic acids", Carbon, 2010, vol. 48, pp. 4466-4474, Elsevier.

Tung.V et al., "High-throughput solution processing of large-scale graphene", Nature Nanotechnology, Nov. 9, 2008, vol. 4, No. 1, pp. 25-29.

Wang.G et al., "Highly efficient and large-scale synthesis of graphene by electrolytic exfoliation", Carbon, 2009, vol. 47, pp. 3242-3246, Elsevier.

Wu.X et al., "Highly Conductive and Uniform Graphene hybrid Electrode with Chemical Reduction for Flexible Organic Light-Emitting Diodes", SID Digest '14 : SID International Symposium Digest of Technical Papers, Jun. 3, 2014, pp. 1336-1339.

Xin.G et al., "Graphene Sheet Synthesized with Microwave Irradiation and Interlinked by Carbon Nanotubes for High-Performance Transparent Flexible Electrodes", IDW '10 : Proceedings of the 17th International Display Workshops, 2010, pp. 1671-1674.

* cited by examiner

320

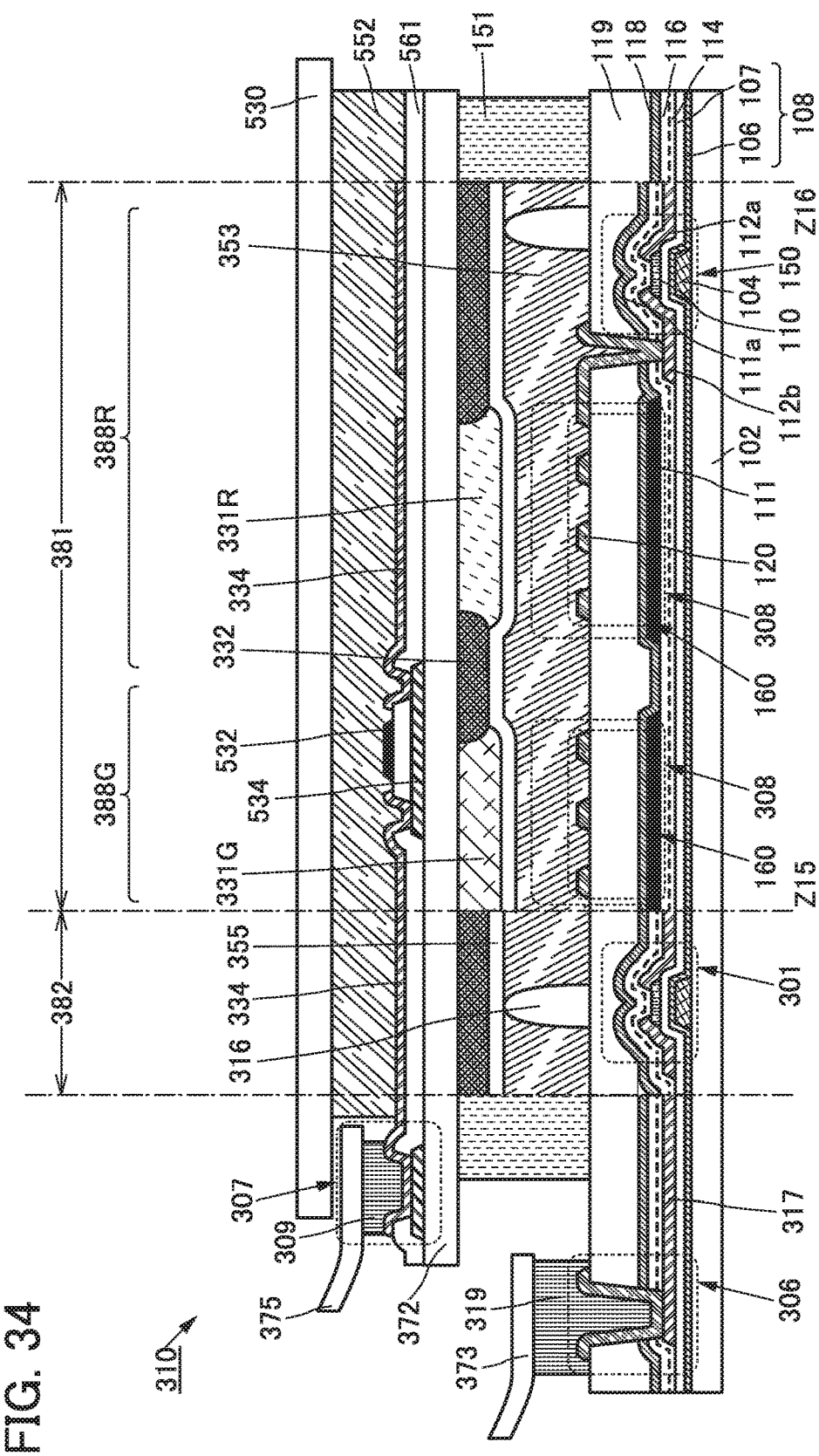

FILM FORMATION METHOD AND ELEMENT

BACKGROUND OF THE INVENTION

1. Field of the Invention

One embodiment of the present invention relates to a semiconductor device. One embodiment of the present invention relates to a film formation method. One embodiment of the present invention relates to an element. One embodiment of the present invention relates to a touch panel. One embodiment of the present invention relates to an input/output device. One embodiment of the present invention relates to an input device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification and the like include a semiconductor device, a display device, a liquid crystal display device, a light-emitting device, a lighting device, a power storage device, a memory device, an imaging device, an input device, an input/output device, a method for driving any of them, and a method for manufacturing any of them.

2. Description of the Related Art

Graphene is a carbon material having a crystal structure in which hexagonal skeletons of carbon are spread in a planar form and is one atomic plane extracted from graphite crystals. Due to its excellent electrical property of high conductivity and excellent physical properties of high flexibility and mechanical strength, the graphene has been expected to be used for a variety of products, for example, field-effect transistors with high mobility, highly sensitive sensors, highly-efficient solar cells, and next-generation transparent conductive films.

There are various methods for forming graphene. One of the methods is to reduce graphite oxide or graphene oxide in the presence of a base (see Patent Document 1). For a method of forming graphene by reducing graphene oxide, heat treatment can be employed.

REFERENCE

Patent Document 1

Japanese Published Patent Application No. 2011-500488

SUMMARY OF THE INVENTION

Graphene formed by reduction of graphene oxide has excellent conductivity. A film that includes stacked sheets of the graphene transmits light when the number of the stacked sheets is small. The film including the graphene has the possibility of use in wirings, electrodes, and the like in various devices.

In general, a lithography method can be used to pattern a film including graphene into a shape of a wiring or electrode. Specifically, a resist mask is applied onto a film including graphene oxide that is formed over a substrate, and a photomask pattern with a shape of a wiring or electrode is transferred to the resist mask by exposure. After that, an unnecessary resist is removed by development to expose part of the film including graphene oxide. The exposed part of the film is removed by etching, whereby the film including graphene oxide is patterned into a desired shape. Then, the resist mask is removed and the patterned film including graphene oxide is reduced to obtain a film including graphene with a desired shape.

However, a film including graphene oxide has surface unevenness because many flakes of the graphene oxide randomly overlap each other in the film. For accurate patterning, it is generally important in a lithography method to apply a resist mask evenly and uniformly. However, when a resist mask is applied to a film including graphene oxide, the unevenness makes the resist mask difficult to attach to the film including graphene oxide. In addition, in some cases, the resist mask also gets surface unevenness along the unevenness of the film, which disturbs the even and uniform application of the resist mask.

One option to avoid the unevenness is to increase the thickness of a resist mask applied to a film including graphene oxide. However, the resist mask with increased thickness may lead to long-term development of the resist mask at a later step, causing loss of shape in the pattern and peeling of the resist mask. Furthermore, in a step of removing the resist mask, the thicker resist mask may greatly lower the operation efficiency because the removal of the resist mask requires a long period of time.

When a film including graphene oxide is exposed to an alkaline solution, part of the film might be peeled. For example, when a film including graphene oxide is exposed to an alkaline developer in development of a resist mask with a photolithography technique, the film including graphene oxide might be partly peeled.

In view of the above problems, an object of one embodiment of the present invention is to provide a novel formation method of a film including graphene. Another object is to provide a novel manufacturing method of an element. Another object is to provide a formation method of a film including graphene at low cost. Another object is to provide a formation method of a film including graphene at high yield. Another object is to provide a novel element provided with a film including graphene. Another object is to provide a manufacturing method of a novel element provided with a film including graphene. Another object of one embodiment of the present invention is to provide a novel material, a novel electrode, a novel semiconductor device, or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

A formation method of a film including graphene of one embodiment of the present invention includes a first step of forming a film including graphene oxide and comprising a first region and a second region by applying a dispersion liquid in which graphene oxide is dispersed to a substrate and removing dispersion medium from the applied dispersion liquid, a second step of forming a film including graphene by light irradiation to the first region to reduce the first region, and a third step of removing the second region by washing. The first step, the second step, and the third step are performed in this order.

Another formation method of a film including graphene of one embodiment of the present invention includes a first step of forming a film including graphene oxide and comprising a first region and a second region by applying a dispersion liquid in which graphene oxide is dispersed to a substrate and removing dispersion medium from the applied dispersion liquid, a second step of forming a film including graphene by light irradiation to the first region to reduce the first region, and a third step of removing the second region by water washing. The first step, the second step, and the third step are performed in this order.

In the above-described formation methods of a film including graphene of one embodiment of the present invention, the light may be laser light or ultraviolet light.

In the above-described formation method of a film including graphene, the water washing may include a step of ultrasonic irradiation or a step of high-pressure water flushing.

Another formation method of a film including graphene of one embodiment of the present invention includes a first step of forming a film including graphene oxide and comprising a first region and a second region by applying a dispersion liquid in which graphene oxide is dispersed to a substrate and removing dispersion medium from the applied dispersion liquid, a second step of removing the first region by laser irradiation to the first region, and a third step of reducing the second region. The first step, the second step, and the third step are performed in this order.

Another formation method of a film including graphene of one embodiment of the present invention includes a first step of forming a film including graphene oxide and comprising a first region and a second region by applying a dispersion liquid in which graphene oxide is dispersed to a substrate and removing dispersion medium from the applied dispersion liquid, a second step of removing the first region by laser irradiation to the first region, a third step of chemically reducing the second region, and a fourth step of thermally reducing the second region. The first step and the second step are performed in this order. After that, the third step and the fourth step are performed in this order or a reverse order.

In the above-described formation methods of a film including graphene, the second step may be performed under an oxygen atmosphere.

One embodiment of the present invention is an element including a first electrode and a second electrode apart from the first electrode. At least one of the first and second electrodes includes a layer including graphene which is obtained through a first step of forming a dispersion liquid comprising graphene oxide, a second step of forming a layer including graphene oxide that includes a first region and a second region by using the dispersion liquid, a third step of reducing the first region by light irradiation to the first region, and a fourth step of removing the second region by water washing.

One embodiment of the present invention is an element including a first electrode and a second electrode apart from the first electrode. At least one of the first and second electrodes includes a layer including graphene which is obtained through a first step of forming a dispersion liquid comprising graphene oxide, a second step of forming a layer including graphene oxide that includes a first region and a second region by using the dispersion liquid, a third step of removing the first region by laser irradiation to the first region, and a fourth step of reducing the second region.

In the element of one embodiment of the present invention, the first electrode serves as one electrode of a touch sensor, and the second electrode serves as the other electrode of the touch sensor.

A touch panel of one embodiment of the present invention includes the above-mentioned element and a display portion. The display portion includes a liquid crystal layer.

A touch panel of one embodiment of the present invention includes the above-mentioned element and a display portion. The display portion includes a light-emitting element.

An electronic device of one embodiment of the present invention includes the above-mentioned touch panel, and any of a switch, a speaker, and a housing.

Graphene has carbon atoms arranged in one atomic layer. A π bond exists between the carbon atoms. A compound including graphene as a basic skeleton is referred to as a graphene compound in some cases.

Graphene compounds are detailed below.

Among graphene compounds, those with two to a hundred layers of graphene are referred to as multilayer graphene in some cases.

The length of one side (also referred to as a flake size) of graphene and multilayer graphene is, for example, greater than or equal to 50 nm and less than or equal to 100 μm, or greater than or equal to 800 nm and less than or equal to 50 μm.

A graphene compound may be a compound where graphene or multilayer graphene is modified with an atom other than carbon or an atomic group with an atom other than carbon. A graphene compound may be a compound where graphene or multilayer graphene is modified with an atomic group composed mainly of carbon, such as an alkyl group. An atomic group is sometimes referred to as a substituent group, a functional group, a characteristic group, or the like.

The top and rear surfaces of a graphene compound may be modified with different atoms or atomic groups. When a graphene compound has multiple layers, those layers may be modified with different atoms or atomic groups.

An example of the above-mentioned graphene modified with an atomic group is graphene or multilayer graphene modified with oxygen. Alternatively, graphene or multilayer graphene modified with a functional group containing oxygen may be used. Examples of functional groups containing oxygen include a carbonyl group such as a carboxyl group, an epoxy group, and a hydroxyl group. Graphene modified with oxygen is referred to as graphene oxide in some cases.

A formation method example of graphene oxide is described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may be further modified with the above-mentioned atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state of bonded oxygen or atomic group containing oxygen. In some cases, RGO includes a functional group, e.g., an epoxy group, a carbonyl group such as a carboxyl group, or a hydroxyl group.

A graphene compound may have a sheet-like shape where a plurality of graphene compounds overlap each other. Such a graphene compound is referred to as a graphene compound sheet in some cases. The graphene compound sheet has, for example, an area with a thickness larger than or equal to 0.33 nm and smaller than or equal to 50 μm, or preferably larger than or equal to 0.34 nm and smaller than or equal to 10 μm. The graphene compound sheet may be modified with an atom other than carbon, an atomic group containing an atom other than carbon, an atomic group mainly composed of carbon such as an alkyl group, or the like. A plurality of layers in the graphene compound sheet may be modified with different atoms or atomic groups.

A graphene compound may have a five-membered ring composed of carbon atoms or a poly-membered ring that is a seven or more-membered ring composed of carbon atoms, in addition to a six-membered ring composed of carbon atoms. In the neighborhood of a poly-membered ring except a six-membered ring, a region through which a lithium ion can pass may be generated.

A plurality of graphene compounds may be gathered to form a sheet-like shape.

A graphene compound has a planar shape, thereby enabling surface contact.

A graphene compound with high conductivity, such as graphene or multilayer graphene, maintains its high conductivity even when it is thin, because it has a large contact area among flakes of graphene by surface contact.

In contrast, a graphene compound may also be used as an insulator. For example, a graphene compound sheet may be used as a sheet-like insulator. Graphene oxide, for example, has a higher insulation property than graphene in some cases. A graphene compound modified with an atomic group may have an improved insulation property, depending on the type of the modifying atomic group.

A graphene compound of one embodiment of the present invention may include a precursor of graphene. The precursor of graphene may contain the above-mentioned graphene oxide, graphite oxide, or the like.

Graphene containing an alkali metal or atom other than carbon, such as oxygen, is referred to as a graphene analog in some cases. Graphene compounds of one embodiment of the present invention include graphene analogs.

A graphene compound of one embodiment of the present invention may include an atom, an atomic group, and ions of them between the layers. The physical properties, such as electric conductivity and ion conductivity, of a graphene compound sometimes change when an atom, an atomic group, and ions of them exist between layers of the compound. In such a case, a distance between the layers may increase compared to that of multilayer graphene, for example.

Among graphene compounds, a film including graphene oxide or multilayer graphene oxide is expressed as "a film including graphene oxide" for convenience in one embodiment of the present invention. A film including graphene, multilayer graphene, or a compound (RGO) that can be obtained by reducing graphene oxide and multilayer graphene oxide is expressed as "a film including graphene."

According to one embodiment of the present invention, a novel method for forming a film including graphene can be provided. According to one embodiment of the present invention, a novel method for forming an element can be provided. According to one embodiment of the present invention, a method for forming a film including graphene at low cost can be provided. According to one embodiment of the present invention, a method for forming a film including graphene at high yield can be provided. According to one embodiment of the present invention, a novel element provided with a film including graphene can be provided. According to one embodiment of the present invention, a method for forming a novel element provided with a film including graphene can be provided. One embodiment of the present invention can provide a novel material, a novel electrode, a novel semiconductor device, or the like.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIG. 34 is a cross-sectional view illustrating an example of a touch panel of an embodiment;

DETAILED DESCRIPTION OF THE INVENTION

Figure 1:
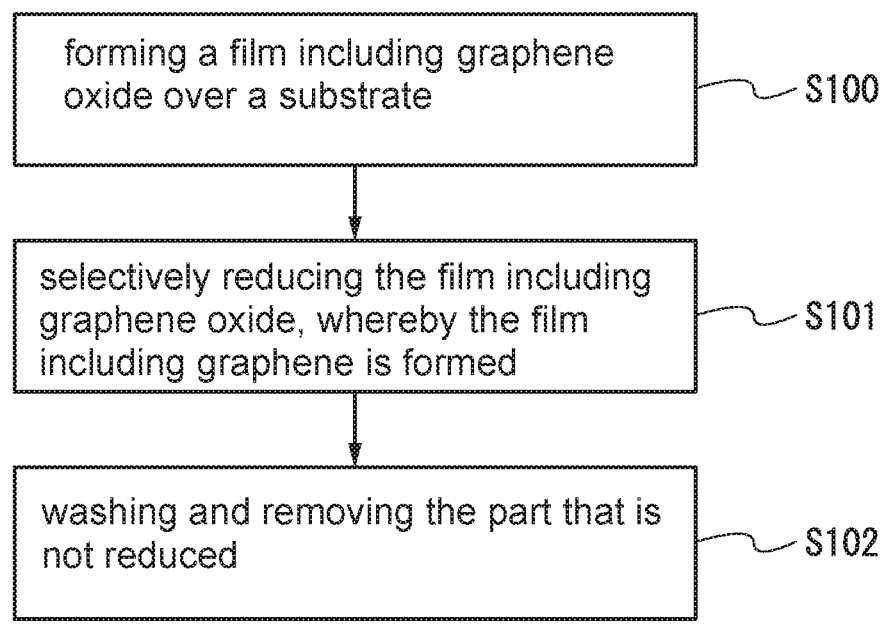
FIG. 1 is a flow chart showing a formation method of a film of an embodiment.

Embodiments will be described in detail with reference to drawings. Note that the present invention is not limited to the following description and it will be readily appreciated by those skilled in the art that modes and details can be modified in various ways without departing from the spirit and the scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Note that the position, size, range, or the like of each structure illustrated in drawings and the like is not accurately represented in some cases for easy understanding. Therefore, the invention disclosed in this specification and the like is not necessarily limited to the position, size, range, or the like disclosed in the drawings and the like.

It is also noted that in this specification and the like, ordinal numbers such as "first" and "second" are used in order to avoid confusion among components, and the terms do not limit the components numerically.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Embodiment 1

A method for forming a film including graphene of one embodiment of the present invention and the physical properties of graphene formed by the method for forming a film including graphene will be described.

One embodiment of the present invention is a method for forming a patterned film including graphene by selectively reducing a film including graphene oxide.

<Method 1 for Forming Film Including Graphene>

Figure 2A:
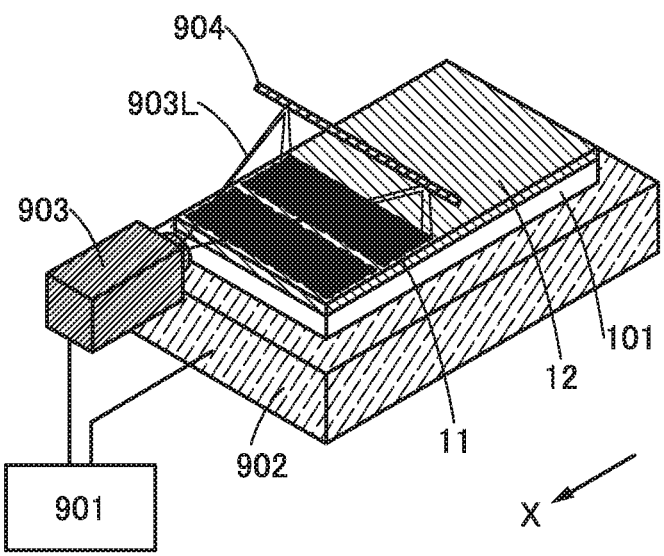
FIGS. 2A and 2B are schematic views of reducing devices of an embodiment.
Figure 2B:
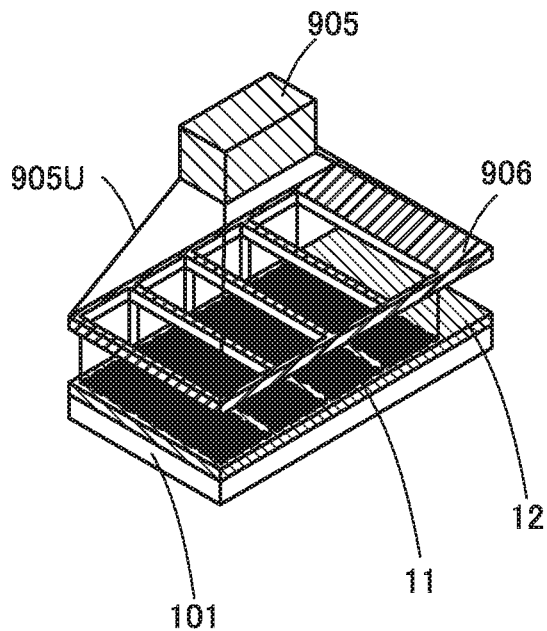

FIG. 1 is a flow chart showing a method for forming a film including graphene, and FIGS. 2A and 2B are projection views illustrating a device that can selectively reduce a film including graphene oxide.

<Step S100>

In a step S100 in FIG. 1, a film including graphene oxide is formed over a substrate.

For example, the film including graphene oxide can be formed by applying a dispersion liquid including graphene oxide over the substrate with a spray drying method. The thickness of the film including graphene oxide can be controlled by the application time. The thickness can be controlled to be, for example, larger than or equal to 10 nm and less than or equal to 50 μm. A film including graphene oxide with a thickness of approximately 10 μm can be formed over the substrate by applying the dispersion liquid for approximately four hours, for example. The dispersion liquid is a liquid where graphene oxide is dispersed in dispersion medium such as water.

Alternatively, the film including graphene oxide can be formed by applying a dispersion liquid including graphene oxide over the substrate with a blade. When a dispersion liquid of 1 mL in which graphene oxide is dispersed in water at a concentration of 10 mg/mL is applied to the substrate (with an area of 200 mm×200 mm, for example), the application can be performed with a blade having a gap of 50 μm with respect to the substrate surface and a width of 250 mm. Note that the gap of the blade (a space between the substrate surface and the blade) or the width may be determined on the basis of a desired thickness or width of the film including graphene oxide to be applied.

Note that the dispersion liquid may be one where graphene oxide is dispersed in water. For example, a dispersion liquid in which graphene oxide is dispersed at a concentration of more than or equal to 0.1 mg/mL and less than or equal to 50 mg/mL can be used. In this embodiment, a dispersion liquid where graphene oxide is dispersed in water at a concentration of 10 mg/mL is used. A thinner film including graphene oxide can be applied with a dispersion liquid having a lower concentration of graphene oxide (for example, 0.1 mg/mL).

Drying is then performed to remove dispersion medium from the dispersion liquid including graphene oxide applied to the substrate, so that the film including graphene oxide is formed. For example, water is removed by heating the substrate with a hot plate. Specifically, heating is performed at 110° C. for 10 minutes.

As a surface on which the film is formed has higher hydrophilicity, the thickness of the film can be more uniform. For example, the film is preferably formed over a hydrophilic base film formed over the surface of the substrate. Specifically, the base film can be an silicon oxynitride film or silicon oxide film in which proportions of atoms (atomic %) of silicon, oxygen and nitrogen calculated from the result of X-ray photoelectron spectroscopy (XPS) are 31% or less, 66% or less, and 1% or less, respectively.

Furthermore, treatment for increasing the hydrophilicity of the surface on which the film is formed may be performed. For example, plasma treatment, chemical liquid treatment, ozone treatment, or a combination of two or more of them may be performed on the surface on which the film is formed. Moreover, to control the hydrophilicity of the surface on which the film is formed, treatment for decreasing the hydrophilicity may be performed in combination.

Any of various materials can be used as the substrate. For example, a borosilicate glass with a thickness of 0.7 mm can be used as the substrate.

Graphene oxide can be formed by various synthesis methods such as a Hummers method, a modified Hummers method, and oxidation of graphite.

For example, the Hummers method is a method for forming graphite oxide by oxidizing graphite such as flake graphite. The obtained graphite oxide is graphite which is oxidized in places and thus to which a functional group such as a carbonyl group, a carboxyl group, or a hydroxyl group is bonded. In the graphite oxide, the crystallinity of the graphite is lost and the distance between layers is increased. Therefore, the layers can be easily separated by ultrasonic treatment or the like to obtain graphene oxide.

The length of one side (also referred to as a flake size) of graphene oxide to be used is greater than or equal to 50 nm and less than or equal to 100 μm, preferably greater than or equal to 800 nm and less than or equal to 50 μm.

<Step S101>

Next, in a step S101 in FIG. 1, the film including graphene oxide is selectively reduced.

For example, the film including graphene oxide formed over the substrate can be selectively reduced by selective laser irradiation to the film including graphene oxide. A region of the film including graphene oxide that is irradiated with the laser beam is reduced. To reduce the film including graphene oxide in a desired shape, laser irradiation may be performed on a region with the desired shape in the film including graphene oxide.

FIG. 2A shows an example of a reducing device that can selectively reduce the film including graphene oxide by selective laser irradiation to the film.

A reducing device 900 includes a control portion 901 that supplies a first control signal and a second control signal that synchronizes with the first control signal, a stage 902 to which the first control signal is supplied and which can move in at least one axis direction (an X direction shown in FIG. 2A) in accordance with the first control signal, a laser device 903 to which the second control signal is supplied and which emits a laser beam 903L, and a reflector 904 that reflects the supplied laser beam 903L in a predetermined direction.

The first control signal includes a signal for controlling the movement of the stage 902.

The second control signal includes a signal for controlling the laser device 903 so that the laser device 903 can perform selective irradiation with the laser beam 903L in synchronization with the first control signal.

The film including graphene oxide is selectively reduced with the reducing device 900, whereby a film 11 including graphene is formed. A film 12 including graphene oxide remains in a region that is not subjected to the reducing treatment.

The laser beam 903L may be any laser as long as it can reduce the film including graphene oxide. For example, a continuous-wave laser (a CW laser) and a pulsed laser (whose repetition rate is preferably from 10 Hz to 100 MHz) can be used. Specifically, as the continuous wave laser, an Ar laser, a Kr laser, a $CO_2$ laser, a YAG laser, a $YVO_4$ laser, a YLF laser, a $YAlO_3$ laser, a $GdVO_4$ laser, a $Y_2O_3$ laser, a ruby laser, an Alexandrite laser, a Ti: sapphire laser, a helium cadmium laser, or the like can be used. As the pulsed laser, an Ar laser, a Kr laser, an excimer (ArF, KrF, XeCl) laser, a $CO_2$ laser, a YAG laser, a $YVO_4$ laser, a YLF laser, a $YAlO_3$ laser, a $GdVO_4$ laser, a $Y_2O_3$ laser, a ruby laser, an Alexandrite laser, a Ti: sapphire laser, a fiber laser, a copper vapor laser, a gold vapor laser, or the like can be used.

When the pulse width of a laser beam used for reduction is large or the energy density thereof is high, generated graphene may be reacted with oxygen in an atmosphere and converted into carbon dioxide. Therefore, the width of the laser beam is preferably 1 picosecond (ps) or shorter. It is particularly preferable that the energy density of the laser beam be 50 mJ/cm$^2$ or less. Specifically, a Ti: sapphire laser, a Yb: YAG laser, an Er: fiber laser, or a Yb: fiber laser is preferably used. Graphene oxide and graphene have different absorption ranges. Graphene oxide has high absorptance on the short wavelength side; in particular, at wavelengths of approximately 500 nm or shorter, its absorptance gets higher as the wavelength becomes shorter. On the other hand, graphene has a constant absorptance with respect to wavelengths. Thus, a wavelength on the short wavelength side may be used to reduce both graphene oxide and graphene, and a wavelength on the long wavelength side may be used to further selectively reduce graphene. Specifically, a third harmonic of a Nd: YAG laser (wavelength: 355 nm) is preferable to reduce graphene oxide, while a helium-neon laser (wavelength: 633 nm) is preferable to reduce only graphene. An argon-ion laser (wavelength: 488 nm to 514 nm) is preferable to reduce both graphene oxide and graphene.

When the irradiation area is irradiated with a laser beam, under a reduced pressure or with a nitrogen gas blown on the irradiation area, the generated graphene can be inhibited from reacting with oxygen in the atmosphere and producing carbon dioxide.

Note that the stage 902 on the laser beam 903L irradiation side can support the substrate 101.

Alternatively, selective ultraviolet light irradiation with a photomask may be performed to selectively reduce the film including graphene oxide. FIG. 2B shows an example of a reducing device that can reduce the film including graphene oxide by selective ultraviolet light irradiation with a photomask.

In a reducing device 910, a photomask 906 processed into a desired pattern is provided over the film including graphene oxide, and an ultraviolet light irradiation device 905 is provided thereover.

Through the pattern of the photomask 906, the film including graphene oxide is selectively exposed to ultraviolet light 905U from the ultraviolet light irradiation device 905 and is reduced. By this reducing treatment, the graphene oxide is reduced to form graphene.

The film including graphene oxide is selectively reduced with the reducing device 910, whereby the film 11 including graphene is formed, for example. The film 12 including graphene oxide remains in a region that is not subjected to the reducing treatment.

As the ultraviolet light used for irradiation to the film including graphene oxide, extreme ultra-violet light (EUV) or the like may be used, for example.

The reducing treatment may be performed more than once. By performing the reducing treatment more than once, graphene oxide can be more surely reduced to graphene.

Figure 3A:
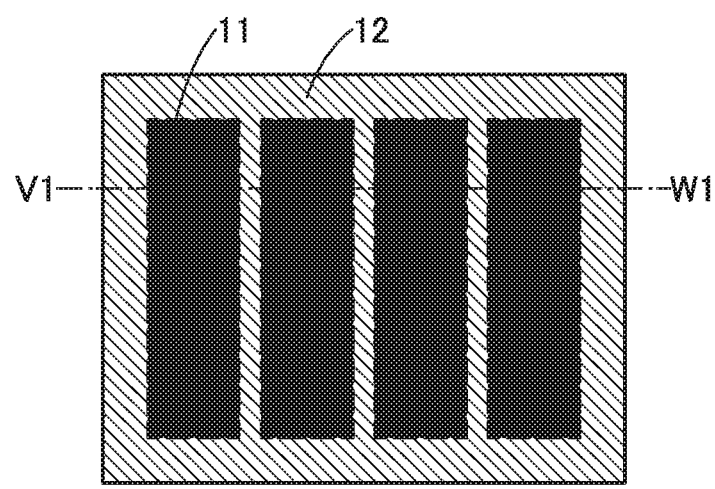
FIGS. 3A and 3B illustrate a structure of a film of an embodiment.
Figure 3B:
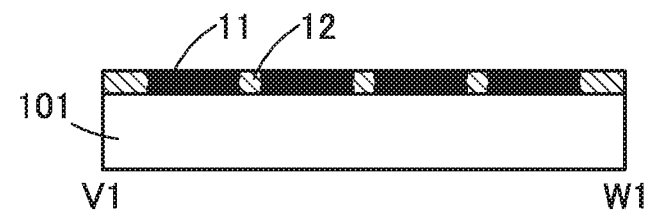

FIGS. 3A and 3B illustrate a structure of the film of one embodiment of the present invention. FIG. 3A is a top view of the film of one embodiment of the present invention obtained in the step S101, and FIG. 3B is a cross-sectional structural view of the film along the section lie V1-W1 in FIG. 3A.

The film 11 including graphene and the film 12 including graphene oxide are provided over the substrate 101. The film 11 including graphene is formed in the region subjected to the selective reduction in the step S101. The film 12 including graphene oxide remains in the region that is not subjected to the reducing treatment.

Note that in the reduction of the film including graphene oxide, oxygen contained in the graphene oxide is not completely extracted and part of it remains in some cases.

<Step S102>

In a step S102 in FIG. 1, the film including graphene oxide that is not reduced is removed.

For example, in the step S102, the substrate that has the region with the film including graphene oxide and the region with the reduced film including graphene is immersed in a liquid and washed. The liquid for immersion is preferably pure water.

Specifically, the substrate immersed in pure water at room temperature is washed with ultrasonic treatment. The ultrasonic treatment is performed, for example, for 1 to 10 minutes. Alternatively, after immersion in pure water at room temperature, the substrate is flushed with high-pressure water. Note that after the washing, blow-drying with a nitrogen stream may be performed. Here, the ultrasonic treatment means, for example, ultrasonic irradiation to water and the substrate provided with the film including graphene oxide that is immersed in the water.

There are many oxygen functional groups (e.g., an epoxy group, a hydroxyl group, a carbonyl group, and a carboxyl group) on a surface of graphene oxide. Thus, a surface of the film including graphene oxide has high hydrophilicity. Therefore, the film including graphene oxide is easily dispersed into water when physical force is added to the film by ultrasonic treatment with the film immersed in water, high-pressure water flushing, or the like. In contrast, there are a few functional groups containing oxygen on a surface of graphene, and thus the surface has high hydrophobicity. Thus, the film including graphene obtained by reducing the film including graphene oxide is not dispersed into water even when physical force is added to the film by ultrasonic treatment with the film immersed in water, high-pressure water flushing, or the like.

In the step S102, the hydrophilicity of graphene oxide and the hydrophobicity of graphene are utilized to remove the film including graphene oxide.

Figure 4A:
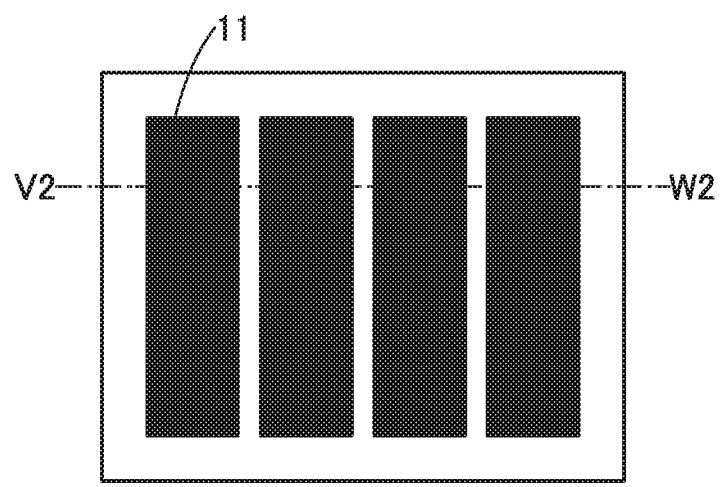
FIGS. 4A and 4B illustrate a structure of a film of an embodiment.
Figure 4B:

FIGS. 4A and 4B illustrate a structure of the film of one embodiment of the present invention. FIG. 4A is a top view of the film of one embodiment of the present invention obtained after the step S102, and FIG. 4B is a cross-sectional structural view of the film along the section lie V2-W2 in FIG. 4A.

The film 11 including graphene is over the substrate 101. In the step S102, the substrate 101 where the film 11 including graphene and the film 12 including graphene oxide are formed is immersed in water and washed by the ultrasonic treatment or high-pressure water flushing, whereby the film 12 including graphene oxide is dispersed in the water to be removed from the substrate. The film 11 including graphene is not dispersed in the water and remains over the substrate even when the washing treatment is performed. The use of the hydrophilicity of graphene oxide and the hydrophobicity of graphene allows the formation of the film including graphene with a desired pattern.

<Method 2 for Forming Film Including Graphene>

Figure 5:
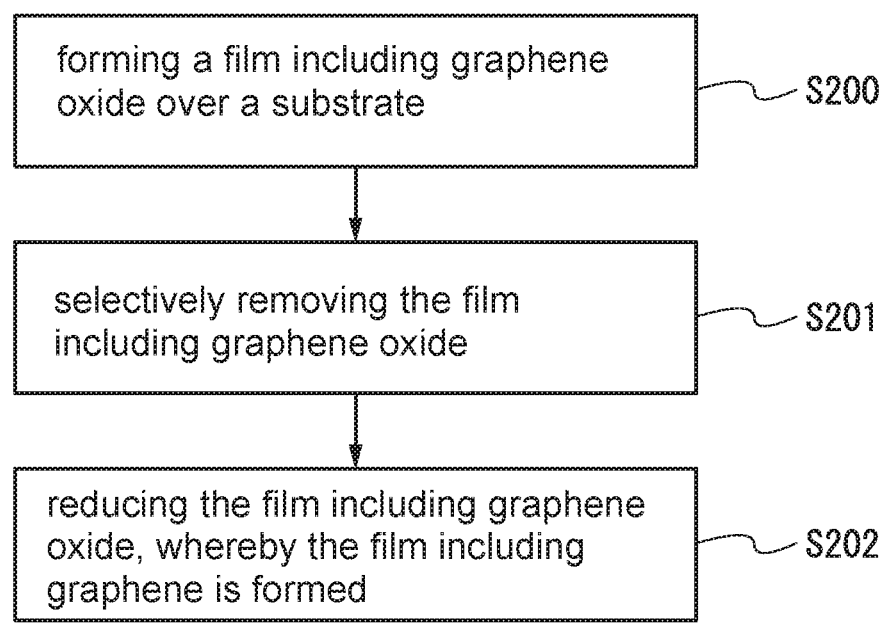
FIG. 5 is a flow chart showing a formation method of a film of an embodiment.
Figure 6:
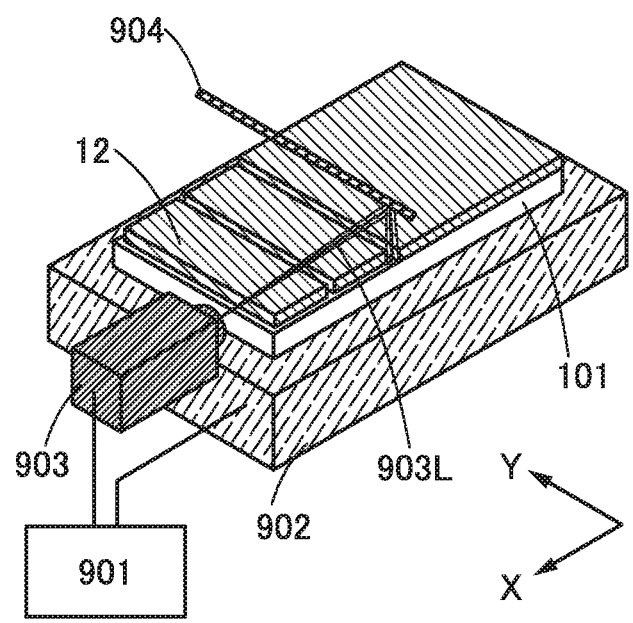
FIG. 6 is a schematic view of a removing device of an embodiment.

FIG. 5 is a flow chart showing a method for forming a film including graphene, and FIG. 6 is a projection view illustrating a device that can selectively remove a film including graphene oxide.

<Step S200>

In a step S200 in FIG. 5, a film including graphene oxide is formed over a substrate. Note that the step S200 is the same as the step S100 in FIG. 1.

<Step S201>

Next, in a step S201 in FIG. 5, the film including graphene oxide is selectively removed.

For example, the film including graphene oxide formed over the substrate is subjected to selective laser irradiation. When the film including graphene oxide is irradiated with a laser beam with a certain or even higher intensity, the film including graphene oxide is converted into gas by reaction with oxygen in an atmosphere and associated chemical change into carbon dioxide. As a result, the film including graphene oxide can be removed. To form the film including graphene oxide in a desired shape, laser irradiation may be performed to an area except the region with the desired shape in the film including graphene oxide.

The step S201 is preferably performed under an oxygen atmosphere to promote the reaction of the film including graphene oxide by laser irradiation that converts the film into carbon dioxide gas.

FIG. 6 shows an example of a removing device that can selectively remove the film including graphene oxide by selective laser irradiation to the film.

A removing device 920 includes the control portion 901 that supplies the first control signal and the second control signal that synchronizes with the first control signal, the stage 902 to which the first control signal is supplied and which can move in at least two axes directions (X and Y directions shown in FIG. 6) in accordance with the first control signal, the laser device 903 to which the second control signal is supplied and which emits the laser beam 903L, and the reflector 904 that reflects the emitted laser beam 903L in a predetermined direction.

The first control signal includes a signal for controlling the movement of the stage 902.

The second control signal includes a signal for controlling the laser device 903 so that the laser device 903 can perform selective irradiation with the laser beam 903L in synchronization with the first control signal.

The film including graphene oxide is selectively removed with the removing device 920, whereby the film 12 including graphene oxide remains.

The laser beam 903L may be any laser as long as it can remove the film including graphene oxide. For example, a continuous-wave laser (a CW laser) and a pulsed laser (whose repetition rate is preferably from 10 Hz to 100 MHz) can be used. Specifically, as the continuous wave laser, an Ar laser, a Kr laser, a $CO_2$ laser, a YAG laser, a $YVO_4$ laser, a YLF laser, a $YAlO_3$ laser, a $GdVO_4$ laser, a $Y_2O_3$ laser, a ruby laser, an Alexandrite laser, a Ti: sapphire laser, a helium cadmium laser, or the like can be used. As the pulsed laser, an Ar laser, a Kr laser, an excimer (ArF, KrF, XeCl) laser, a $CO_2$ laser, a YAG laser, a $YVO_4$ laser, a YLF laser, a $YAlO_3$ laser, a $GdVO_4$ laser, a $Y_2O_3$ laser, a ruby laser, an Alexandrite laser, a Ti: sapphire laser, a fiber laser, a copper vapor laser, a gold vapor laser, or the like can be used.

When the energy density of a laser beam used for removal is too low, the graphene oxide is not reacted with oxygen in an atmosphere and not changed into carbon dioxide in some cases and as a result, the graphene oxide may remain. Thus, it is particularly preferable that the energy density of the laser beam be 0.1 $J/cm^2$ or higher.

Note that the stage 902 on the laser beam 903L irradiation side can support the substrate 101.

Figure 7A:
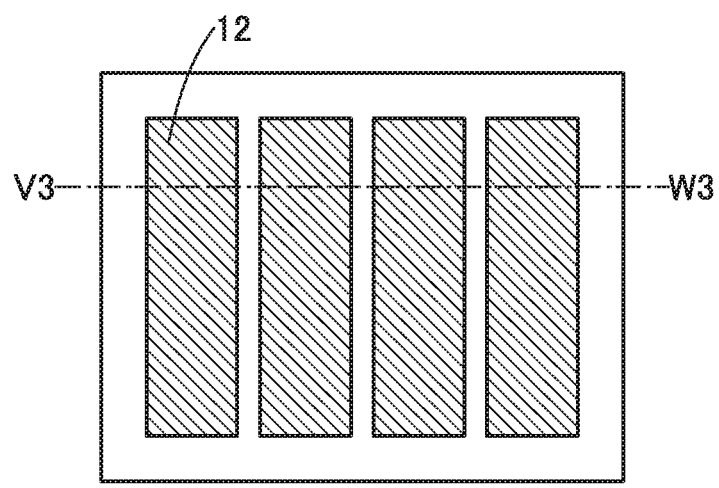
FIGS. 7A and 7B illustrate a structure of a film of an embodiment.
Figure 7B:
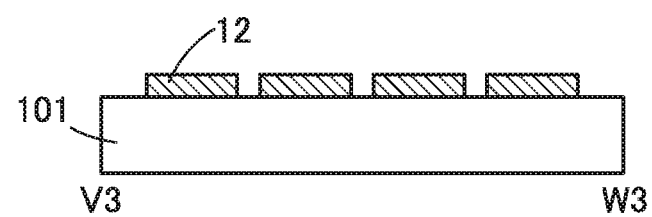

FIGS. 7A and 7B illustrate a structure of the film of one embodiment of the present invention. FIG. 7A is a top view of the film of one embodiment of the present invention obtained after the step S201, and FIG. 7B is a cross-sectional structural view of the film along the section lie V3-W3 in FIG. 7A.

The film 12 including graphene oxide is over the substrate 101. The film including graphene oxide is selectively removed in the step S201, and the film 12 including graphene oxide that is not removed remains the substrate 101.
<Step S202>

The film including graphene oxide is reduced.

For example, the substrate over which the film including graphene oxide is formed is immersed in a solvent in which a reducing agent is added, which causes chemical reaction. The chemical reduction of graphene oxide by this reaction provides a film including graphene. This reducing treatment can be performed at or above a room temperature and at or below the boiling point of the solvent, e.g., at or above a room temperature and at or below 150° C. Note that it is possible that oxygen in the graphene oxide not be entirely extracted and partly remain in the chemical reduction.

Examples of the reducing agent include L-ascorbic acid, hydrazine, dimethyl hydrazine, hydroquinone, sodium boron hydride ($NaBH_4$), $LiAlH_4$, N,N-diethylhydroxylamine, and a derivative thereof. In particular, L-ascorbic acid and hydroquinone are preferable to hydrazine and $NaBH_4$ in that they are safe due to low reducing ability and utilized industrially with ease.

A polar solvent can be used as the solvent. Any material can be used for the polar solvent as long as it can dissolve the reducing agent. Examples of the material of the polar solvent are water, methanol, ethanol, acetone, tetrahydrofuran (THF), dimethylformamide (DMF), N-methylpyrrolidone (NMP), dimethyl sulfoxide (DMSO), and a mixed solution including any one or more of them.

Alternatively, the substrate over which the film including graphene oxide is formed may be subjected to reducing treatment so as to thermally reduce the film including graphene oxide, which results in acquisition of the film including graphene. The reducing treatment (thermal reduction) can be performed at 150° C. or higher in vacuum, for example. Note that oxygen in the graphene oxide is not be entirely extracted and partly remains in the thermal reduction in some cases.

Alternatively, reduction of the film including graphene oxide may be performed by reducing treatment with light. Specifically, the reduction may be performed by laser or ultraviolet light irradiation.

As to the reducing treatment, one embodiment of the present invention is not limited to these examples. For example, the order or the number of times of thermal reduction, chemical reduction, and/or the like can be changed depending on the case or according to the circumstance. For example, the chemical reduction is performed, followed by the thermal reduction. When the thermal reduction is performed after the chemical reduction, the proportion of carbon atoms measured by XPS can increase compared to the case where graphene is formed by either thermal reduction or chemical reduction. Furthermore, such graphene contains a higher proportion of $sp^2$-bonded carbon atoms than graphene formed only by thermal reduction. Furthermore, such graphene has a lower resistivity than graphene formed only by thermal reduction or chemical reduction. In other words, such graphene has a higher conductivity than graphene formed only by thermal reduction or chemical reduction.

Figure 8A:
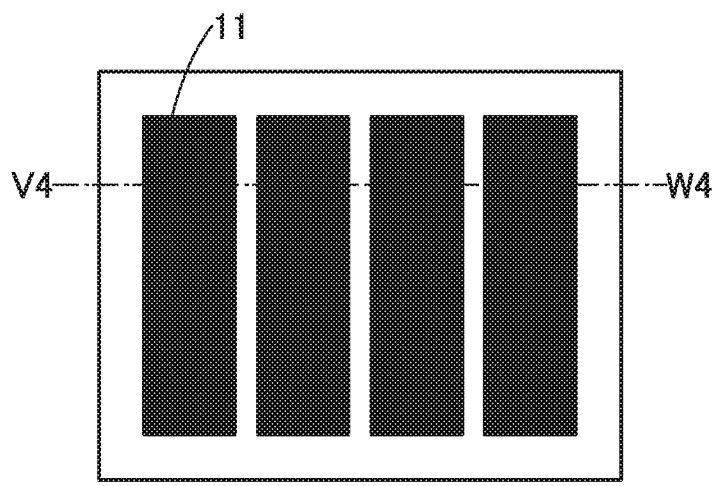
FIGS. 8A and 8B illustrate a structure of a film of an embodiment.
Figure 8B:
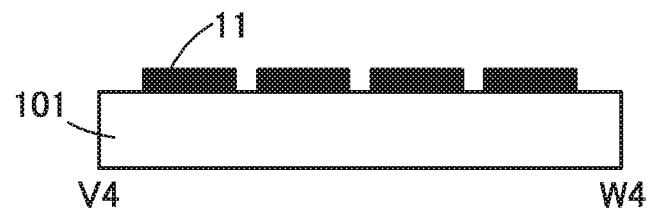

FIGS. 8A and 8B illustrate a structure of the film of one embodiment of the present invention. FIG. 8A is a top view of the film of one embodiment of the present invention obtained after the step S202, and FIG. 8B is a cross-sectional structural view of the film along the section lie V4-W4 in FIG. 8A.

The film 11 including graphene is over the substrate 101. The film 12 including graphene oxide is reduced in the step S202, whereby the film 11 including graphene is formed.

In the film including graphene that is formed by the above-mentioned formation methods, multiple sheets of graphene are stacked to form the film. Alternatively, flakes with multiple layers of graphene may be stacked and overlap each other to form the film. In this way, the film including graphene may have any of various shapes and distributions.

According to one embodiment of the present invention, the film including graphene formed over the substrate can be extremely thin. The extremely-thin film including graphene has an excellent light-transmitting property.

The film including graphene that is patterned into a desired shape can be formed by the steps of one embodiment of the present invention, resolving the problems caused in the conventional formation method with resist masks.

One of the problems caused in the conventional formation method with resist masks is that the unevenness of the surface of the film including graphene oxide makes a resist mask difficult to attach to the film including graphene oxide in application of the resist mask. In addition, in some cases, the resist mask also gets surface unevenness, influenced by the unevenness of the film, which disturbs even and uniform application of the resist mask. One option to avoid the unevenness is to increase the thickness of the resist mask. However, the resist mask with increased thickness may lead to long-term development of the resist mask at a later step, causing loss of shape in the pattern of the resist mask and peeling of the resist mask. Furthermore, in a step of removing the resist mask, the thicker resist mask may greatly lower the operation efficiency because the removal of the resist mask requires a long period of time. In addition, when the film including graphene oxide is exposed to an alkaline developer in development of the resist mask, the film including graphene oxide might be partly peeled.

The steps of this embodiment utilize the hydrophilicity of the film including graphene oxide and the hydrophobicity of the film including graphene. The film including graphene oxide is partly reduced by a laser beam to form the film including graphene, and then the part that is not reduced is removed by water washing.

Alternatively, the reaction of graphene oxide caused by laser irradiation with a certain or even higher intensity, which changes the graphene oxide into carbon dioxide gas, is utilized. The film including graphene oxide is partly irradiated with a laser beam so that the irradiated part is changed into carbon dioxide gas and removed. Thus, unlike the conventional method, the film including graphene patterned into a desired shape can be formed without the use of a resist mask, not causing the aforementioned problems.

Furthermore, in this embodiment, a dispersion liquid including graphene oxide is applied, dispersion medium is removed from the applied dispersion liquid to form a film including graphene oxide, and the film including graphene oxide is reduced to form a film including graphene. Therefore, an expensive film formation apparatus (e.g., a plasma CVD apparatus or a sputtering apparatus) is unnecessary, so that the film including graphene can be formed at low cost.

The sheet resistance of the film including graphene of one embodiment of the present invention is preferably more than or equal to $10\Omega/\square$ and less than or equal to $10^4\Omega/\square$.

In the case where the film including graphene is multi-layer graphene including two or more layers, the interlayer distance between adjacent graphene layers is preferably larger than or equal to 0.33 nm and smaller than or equal to 0.5 nm. The interlayer distance can be measured by observing a cross section of the multilayer graphene with a transmission electron microscope (TEM). The interlayer distance of multilayer graphene can be calculated from interplanar spacing information in various directions that is measured by X-ray diffraction (XRD), for example.

The oxygen concentration of the entire film including graphene measured by XPS is, for example, less than or equal to 20 atomic %, preferably more than or equal to 2 atomic % and less than or equal to 20 atomic %, further preferably more than or equal to 2 atomic % and less than or equal to 11 atomic %, or still further preferably more than or equal to 3 atomic % and less than or equal to 10 atomic %.

In the case where the film including graphene is analyzed by XPS and the spectrum of binding energy of carbon corresponding to C1s is subjected to waveform separation, the proportion of peaks indicating $sp^2$ with respect to the whole spectrum of C1s can be estimated as an area ratio. The proportion of $sp^2$ in the film including graphene is preferably higher than or equal to 50% and lower than or equal to 90% with respect to the whole spectrum of C1s. Increasing the proportion of $sp^2$ can heighten the conductivity of the film including graphene, for example.

This embodiment can be implemented in combination with any of the structures described in the other embodiments and examples as appropriate.

Embodiment 2

In this embodiment, a structure of an element of one embodiment of the present invention will be described.

Structure Example 1

A specific structure example of a touch panel including an element of one embodiment of the present invention is described below, with reference to FIGS. 9A to 9C.

Figure 9A:
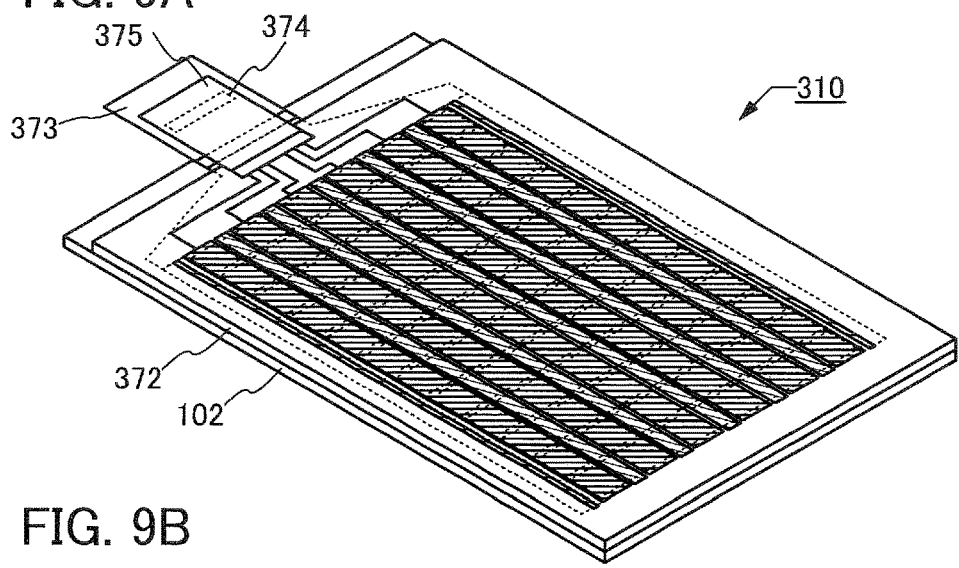
FIGS. 9A to 9C are perspective views illustrating an example of a touch panel of an embodiment.

FIG. 9A is a schematic perspective view of a touch panel 310 including an element of one embodiment of the present invention. FIGS. 9B and 9C are schematic perspective developed views of FIG. 9A. FIG. 9B is a schematic perspective view of the counter substrate side, and FIG. 9C is a schematic perspective view of the element substrate side. Note that only main components are illustrated for simplicity.

The touch panel 310 includes a substrate 102 and a substrate 372 that are provided to face each other. A display portion 381, a driver circuit 382, a wiring 386, a driver circuit 384, and the like are provided over the substrate 102 (see FIG. 9C). A film 111 including graphene is formed in the display portion 381. The substrate 102 is provided with an FPC 373 that is electrically connected to the wiring 386. In the example illustrated in FIGS. 9A and 9C, an IC 374 is provided over the FPC 373.

Figure 9B:
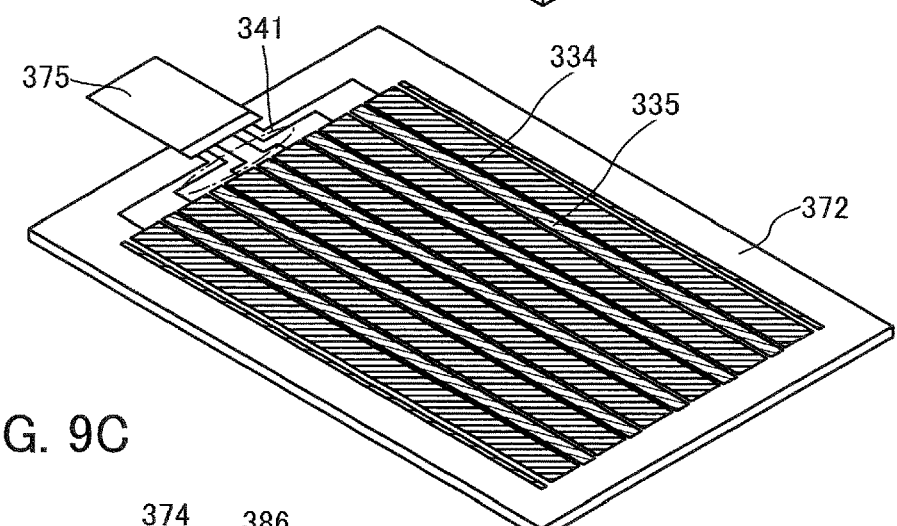

A plurality of conductive films 334, a plurality of conductive films 335, a plurality of conductive films 341, and the like are provided on a surface of the substrate 372 that is the side opposite to the side facing the substrate 102 (see FIG. 9B). Each of the conductive films 341 is electrically connected to one of the plurality of conductive films 334. An FPC 375 that is electrically connected to the conductive films 341 is provided over the substrate 372.

The conductive film 335 is provided between the two conductive films 334. With the conductive film 335, the generation of transmittance difference between a region where the conductive film 334 is provided and a region where the conductive film 334 is not provided can be suppressed. The conductive film 335 is preferably electrically floating. With this structure, a change in the potential of one of the conductive film 334 and the film 111 including graphene can be efficiently transmitted to the other through the conductive film 335, thereby increasing the detection sensitivity. Note that the conductive film 335 may be formed of the film including graphene. The conductive film 335 is not necessarily provided, when it is not needed.

Figure 9C:
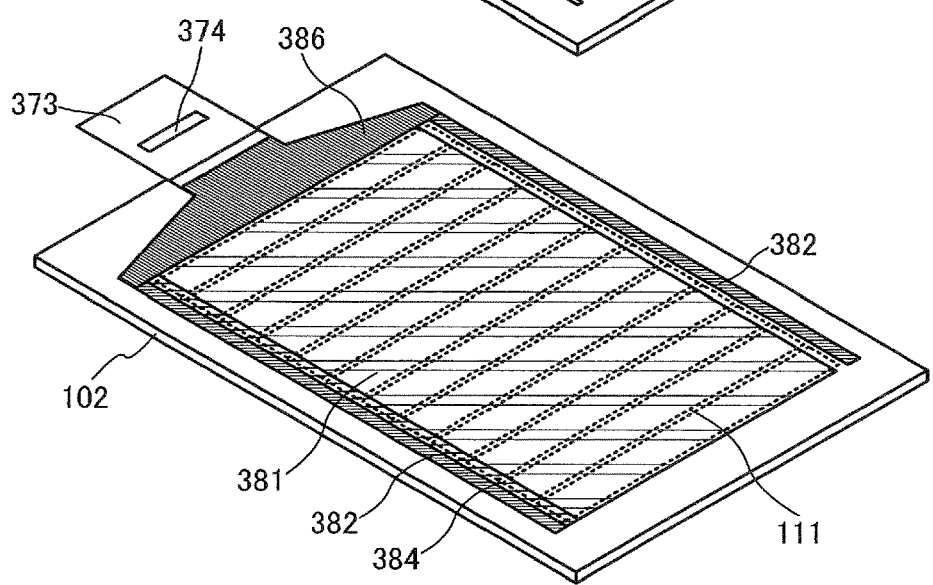

The display portion 381 includes a plurality of pixels (see FIG. 9C). The pixel includes at least one display element. It is preferable that the pixel includes a transistor and a display element. As the display element, typically, a light-emitting element such as an organic EL element, a liquid crystal element, or the like can be used. In this structure example, a liquid crystal element is used as the display element.

As the driver circuit 382, for example, a circuit functioning as a scan line driver circuit or a signal line driver circuit can be used.

The wiring 386 has a function of supplying a signal or electric power to the display portion 381 or the driver circuit 382. The signal or electric power is input from the outside or the IC 374 to the wiring 386 through the FPC 373.

The driver circuit 384 has a function of sequentially selecting the films 111 including graphene. When a touch sensor is driven by sequentially selecting the conductive films 334 instead of the films 111 including graphene, the driver circuit 384 has a function of switching a fixed potential and a sensing signal and supplying it to the film 111 including graphene. In the case where a signal for driving the touch sensor is supplied from the IC 374 or the outside, the driver circuit 384 is not necessarily provided.

In the example illustrated in FIGS. 9A to 9C, the IC 374 is mounted on the FPC 373 by a chip-on-film (COF) method. As the IC 374, for example, an IC functioning as a scan line driver circuit or a signal line driver circuit can be used. Note that it is possible that the IC 374 is not provided when the touch panel 310 includes circuits functioning as a scan line driver circuit and a signal line driver circuit or when circuits functioning as a scan line driver circuit and a signal line driver circuit are provided outside and a signal for driving the display portion 381 is input through the FPC 373. The IC 374 may also be directly mounted on the substrate 102 by a chip-on-glass (COG) method or the like.

The IC 374 can have a function of driving the touch sensor. Alternatively, an IC for driving the touch sensor may further be provided. Further alternatively, an IC for driving the touch sensor may be mounted on the substrate 102.

The touch sensor includes the conductive film 334 that is provided over the substrate 372 and the film 111 including graphene that is provided over the substrate 102. With the use of capacitance formed between the conductive film 334 and the film 111 including graphene, the approach or contact of an object can be detected.

Cross-Sectional Structure Example 1

Examples of the cross-sectional structure of a touch panel of one embodiment of the present invention are described below with reference to drawings.

Figure 10:
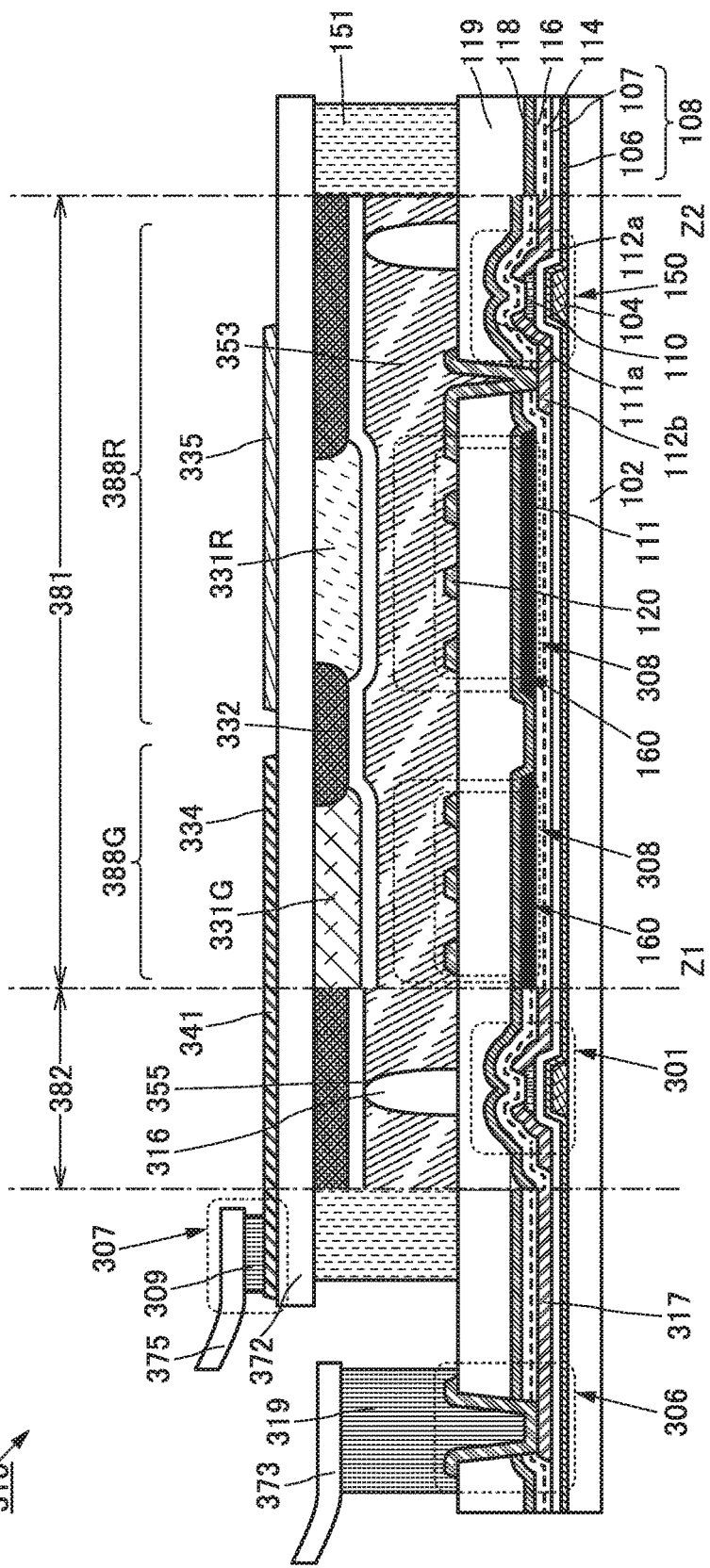
FIG. 10 is a cross-sectional view illustrating an example of a touch panel of an embodiment.

FIG. 10 is a schematic cross-sectional view of the touch panel 310. FIG. 10 illustrates the cross sections of a region including the FPCs 373 and 375, a region including the driver circuit 382, and a region including the display portion 381 in FIG. 9A.

The substrate 102 and the substrate 372 are attached to each other with a sealant 151. A region surrounded by the substrate 102, the substrate 372, and the sealant 151 is filled with liquid crystal 353.

The touch panel 310 includes a transistor 301, a transistor 150, a connection portion 306, a conductive film 317, a conductive film 120 constituting a liquid crystal element 308, a film including graphene, and the like, over the substrate 102.

FIG. 10 illustrates the cross section of two pixels as an example of the display portion 381. For example, each of the pixels is a pixel exhibiting a red color, a pixel exhibiting a green color, or a pixel exhibiting a blue color; thus, full-color display can be achieved. In the display portion 381 illustrated in FIG. 10, for example, a pixel 388R includes the transistor 150, a capacitor 160, the liquid crystal element 308, and a coloring film 331R. Furthermore, a pixel 388G includes a transistor that is not illustrated, the capacitor 160, the liquid crystal element 308, and a coloring film 331G. Note that in the capacitor 160, one of the pair of electrodes is the film 111 including graphene, and the other of the pair of electrodes is a conductive film 120.

The transistor 150 includes a gate electrode 104 over the substrate 102, an insulating film 108 serving as a gate insulating film over the gate electrode 104, a semiconductor film 110 overlapping with the gate electrode 104 over the insulating film 108, and a source electrode 112a and a drain electrode 112b over the semiconductor film 110. In other words, the transistor 150 includes the semiconductor film 110, the insulating film 108 serving as a gate insulating film in contact with the semiconductor film 110, the gate electrode 104 overlapping with the semiconductor film 110 and being in contact with the insulating film 108, and the source electrode 112a and the drain electrode 112b electrically connected to the semiconductor film 110. The semiconductor film 110 serves as a channel region of the transistor 150.

In addition, over the transistor 150, specifically, over the semiconductor film 110, the source electrode 112a, and the drain electrode 112b, insulating films 114, 116, 118, and 119 are formed. The insulating films 114, 116, and 118 function as protective insulating films for the transistor 150. The insulating film 119 functions as a planarization film. In addition, an opening reaching the drain electrode 112b is formed in the insulating films 114, 116, 118, and 119 and the conductive film 120 is formed over the insulating film 119 so as to cover the opening. The conductive film 120 has a function of a pixel electrode. Note that a structure without the insulating film 119 may be employed.

The capacitor 160 is provided over the insulating film 116. The capacitor 160 includes the film 111 including graphene serving as the one of the pair of electrodes, the insulating films 118 and 119 serving as dielectric films over the film 111 including graphene, and the conductive film 120 that serves as the other of the pair of electrodes and overlaps with the film 111 including graphene with the insulating films 118 and 119 provided therebetween. In other words, the conductive film 120 serves as the pixel electrode and the electrode of the capacitor. The film 111 including graphene preferably has a thickness that allows transmission of visible light. Specifically, the thickness is preferably greater than or equal to 0.3 nm and less than or equal to 50 nm, or further preferably greater than or equal to 0.3 nm and less than or equal to 25 nm.

Note that the film including graphene may have any of various shapes and distributions. For example, in the film 111 including graphene, multiple sheets of graphene may be stacked to form the film. Alternatively, flakes with multiple layers of graphene may be stacked and overlap each other to form the film.

Furthermore, the touch panel 310 illustrated in FIG. 10 includes the touch sensor in the display portion 381. The touch sensor includes, as a pair of electrodes, the film 111 including graphene and the conductive film 334 that is provided over the substrate 372. The touch panel 310 shown in FIG. 10 includes an element of one embodiment of the present invention provided with the film 111 including graphene and the conductive film 334 that are provided to be apart from each other. The transistor 150, the capacitor 160, and the touch sensor can be collectively referred to as a semiconductor device. Moreover, the transistor 150 and the touch sensor can also be collectively referred to as a semiconductor device. As an auxiliary electrode of the touch sensor electrode, a conductive film may be provided to contact with the film 111 including graphene. For example, a conductive film using a material similar to that of the gate electrode 104 or that of the source electrode 112a and the drain electrode 112b may be formed in a position overlapping with a light-blocking film 332. When the auxiliary electrode of the film 111 including graphene overlaps with the light-blocking film 332, delay of signal transmission for detection by the touch sensor can be reduced while the aperture ratio of the pixel is maintained.

In addition, the capacitor 160 has a light-transmitting property. In other words, each of the film 111 including graphene, the conductive film 120, and the insulating films 118 and 119 that are included in the capacitor 160 has a light-transmitting property. Since the capacitor 160 has a light-transmitting property, the capacitor 160 can be formed large (in a large area) in the pixel except a region where the transistor is formed; thus, the touch panel can have increased capacitance while improving the aperture ratio. As a result, the touch panel can have an excellent display quality.

FIG. 10 illustrates, as an example of the driver circuit 382, an example in which the transistor 301 is provided.

Note that the transistor 301 included in the driver circuit 382 and the transistor 150 included in the display portion 381 may have the same structure. The plurality of transistors included in the driver circuit 382 may have the same structure or different structures. The plurality of transistors included in display portion 381 may have the same structure or different structures.

In the example illustrated in FIG. 10, a liquid crystal element using a fringe field switching (FFS) mode is used as the liquid crystal element 308. The liquid crystal element 308 includes the conductive film 120, the liquid crystal 353, and the film 111 including graphene. Orientation of the liquid crystal 353 can be controlled with an electric field generated between the conductive film 120 and the film 111 including graphene.

The conductive film 120 has a comb-like top shape or a top shape provided with a slit (a top shape is also referred to as a planar shape). The film 111 including graphene overlaps with the conductive film 120. In a region overlapping with the coloring film 331R and the like, there is a portion where the conductive film 120 is not provided over the film 111 including graphene.

Figure 11:
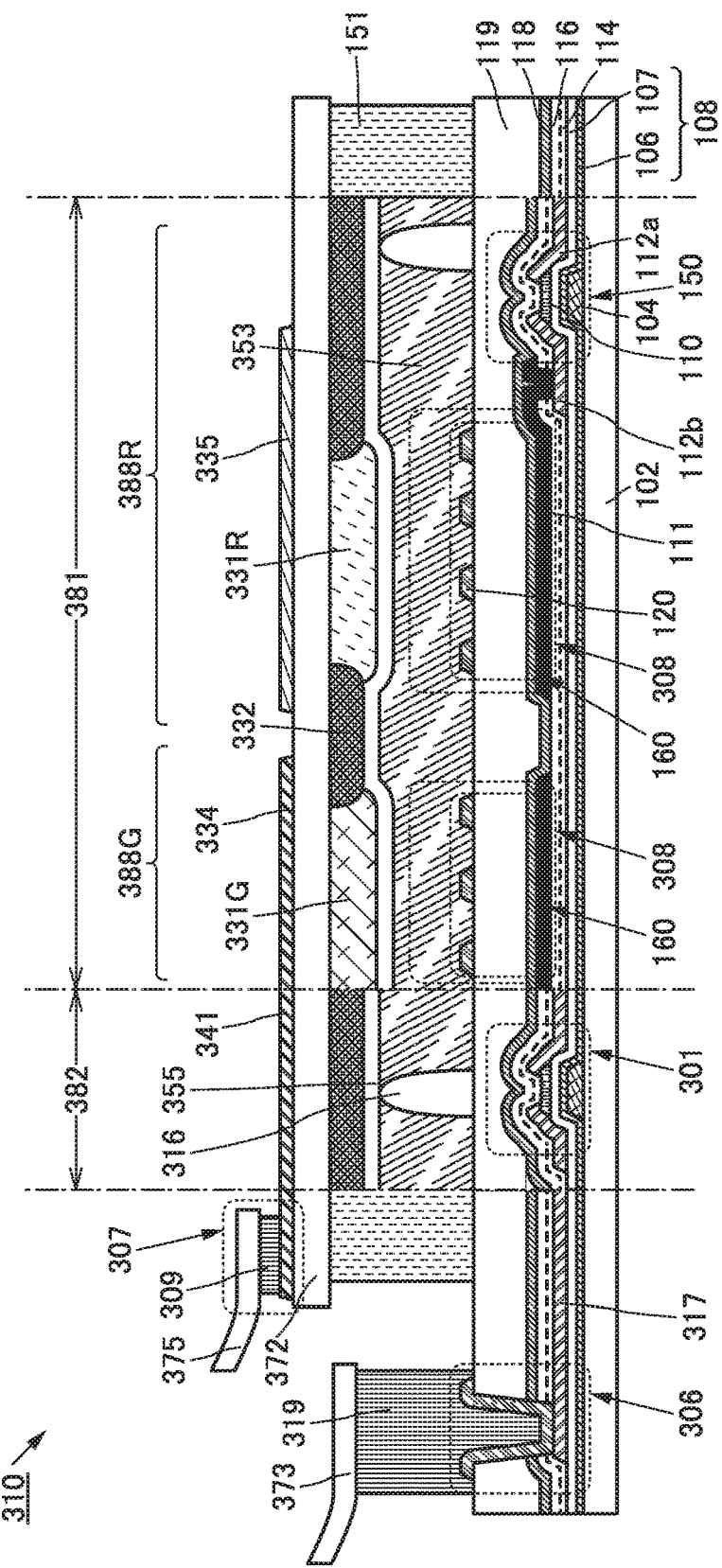
FIG. 11 is a cross-sectional view illustrating an example of a touch panel of an embodiment.

In FIG. 10, the conductive film 120 functions as a pixel electrode, and the film 111 including graphene functions as a common electrode. Alternatively, the conductive film 120 that is provided in an upper layer and has a comb-like top shape or a top shape provided with a slit may be used as the common electrode, and the film 111 including graphene that is provided in a lower layer may be used as the pixel electrode (see FIG. 11). In the touch panel 310 illustrated in FIG. 11, the film 111 including graphene is electrically connected to the drain electrode 112b of the transistor 150. In this case, the touch sensor in the touch panel 310 includes the conductive films 334 and 120 as a pair of electrodes.

The connection portion 306 is provided in a region near an end portion of the substrate 102. In the connection portion 306, the conductive film 317 is electrically connected to the FPC 373 through a connection layer 319. In the example illustrated in FIG. 10, the connection portion 306 is formed by stacking part of the conductive film 317 and a conductive film that is formed by processing the same conductive film as the conductive film 120.

The coloring film 331R, the coloring film 331G, the light-blocking film 332, an insulating film 355, and the like are provided on the substrate 102 side of the substrate 372. The conductive film 334, the conductive film 335, the conductive film 341, and the like are provided on the side of the substrate 372 opposite to the side facing substrate 102.

The conductive film 334 is electrically connected to the conductive film 341. The conductive film 335 is electrically insulated from the conductive films 334 and 341. The conductive films 334, 341, and 335 are preferably formed at the same time by processing one conductive film. Thus, it is preferable that the conductive films 341 and 335 be formed of the film including graphene.

Figure 12:
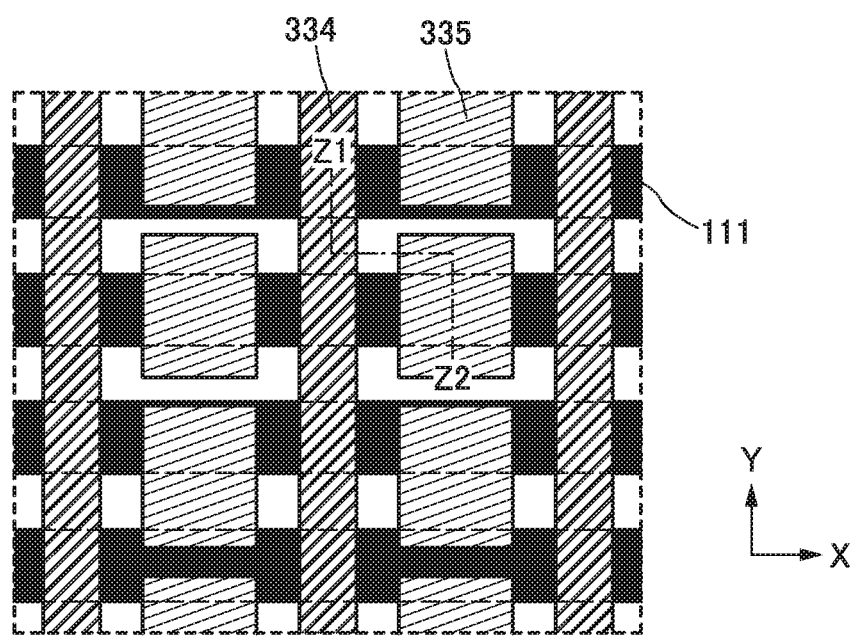
FIG. 12 is a top view illustrating a structure of electrodes of a touch sensor of an embodiment.

Here, the arrangement of the electrodes included in the touch sensor is described. FIG. 12 is a schematic top view of the pair of electrodes of the touch sensor included in the touch panel 310 illustrated in FIG. 10. The dashed-dotted line Z1-Z2 in FIG. 12 corresponds to the display portion 381 in FIG. 10.

The conductive film 334 that is one electrode of the touch sensor extends in the Y direction. The film 111 including graphene that is the other electrode of the touch sensor extends in the X direction and intersects with the conductive film 334. The conductive film 335 is preferably formed using the same conductive film as the conductive film 334; however, the conductive film 335 is illustrated with hatching that is different from that of the conductive film 334 because the functions of the conductive films 334 and 335 are different. The conductive film 335 is brought into an electrically floating state, so that the potential of one of the conductive film 334 and the film 111 including graphene can be transmitted efficiently to the other via the conductive film 335. Accordingly, the detection sensitivity of the touch sensor can be enhanced.

The coloring films 331R and 331G and the light-blocking film 332 are provided on the substrate 102 side of the substrate 372 (see FIG. 10). The insulating film 355 is provided so as to cover the coloring film 331R, the light-blocking film 332, and the like.

The insulating film 355 has a function of an overcoat preventing impurities contained in the coloring film 331R, the light-blocking film 332, and the like from diffusing into the liquid crystal 353.

A spacer 316 is provided over the insulating film 119 to adjust the distance between the substrate 102 and the substrate 372. Although FIG. 10 illustrates the example in which the spacer 316 is in contact with components (e.g., the insulating film 355) on the substrate 372 side, the spacer 316 is not necessarily in contact with them. Moreover, FIG. 10 illustrates the example in which the spacer 316 is provided on the substrate 102 side; however, the spacer 316 may be provided on the substrate 372 side. For example, the spacer 316 can be provided between adjacent two pixels. Alternatively, a particulate spacer may be used as the spacer 316.

Although a material such as silica can be used for the particulate spacer, an elastic material such as an organic resin or rubber is preferably used. In that case, the particulate spacer may be vertically crushed in some cases.

Surfaces of the conductive film 120, the insulating film 119, the insulating film 355, and the like that are in contact with the liquid crystal 353 may be provided with alignment films for controlling the orientation of the liquid crystal 353.

At least regions of the conductive films 334 and 335 that overlap with the coloring film 331R and the like preferably transmit visible light.

In the case where the touch panel 310 includes a transmissive liquid crystal display device, for example, two polarizing plates that are not illustrated are provided to be above and below the display portion 381. Light from a backlight provided on an outer side than the polarizing plate enters through the polarizing plate. At this time, orientation of the liquid crystal 353 is controlled with a voltage applied between the conductive film 120 and the film 111 including graphene. In other words, the intensity of light emitted through the polarizing plate can be controlled. Light entering from the backlight, excluding light in a particular wavelength range, is absorbed by the coloring film, whereby red, blue, or green light is emitted, for example.

In addition to the polarizing plate, a circularly polarizing plate can be used, for example. As the circularly polarizing plate, for example, a stack including a linear polarizing plate and a quarter-wave retardation plate can be used. With the circularly polarizing plate, the viewing angle dependency can be reduced.

In the example illustrated here, the liquid crystal element 308 is a liquid crystal element using an FFS mode. However, one embodiment of the present invention is not limited thereto, and a liquid crystal element using any of a variety of modes can be used. For example, a liquid crystal element using a vertical alignment (VA) mode, a twisted nematic (TN) mode, an in-plane switching (IPS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

Furthermore, a normally black liquid crystal display device, for example, a transmissive liquid crystal display device using a vertical alignment (VA) mode, may be used as the touch panel 310. Examples of the vertical alignment mode include a multi-domain vertical alignment (MVA) mode, a patterned vertical alignment (PVA) mode, and an advanced super view (ASV) mode.

The liquid crystal element controls transmission or non-transmission of light with the use of an optical modulation action of liquid crystal. Note that optical modulation action of the liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As the liquid crystal material, either of positive liquid crystal and negative liquid crystal may be used, and an appropriate liquid crystal material can be used depending on the mode or design to be used.

Alternatively, in the case of employing a horizontal electric field mode, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and has optical isotropy. In addition, the liquid crystal composition which includes liquid crystal exhibiting a blue phase and a chiral material does not need alignment treatment and has small viewing angle dependency. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

In this structure example, the touch panel 310 can detect touch operation or the like by utilizing the capacitance formed between the conductive film 334 and the film 111 including graphene. That is, the film 111 including graphene serves as one of a pair of electrodes of the liquid crystal element 308 as well as one of a pair of electrodes of the touch sensor.

The conductive film 120 preferably transmits visible light. For example, a metal oxide can be used among light-transmitting conductive materials. Alternatively, a film including graphene can be used as the conductive film 120. In that case, the thickness of the conductive film 120 is preferably greater than or equal to 0.3 nm and less than or equal to 50 nm, or further preferably greater than or equal to 0.3 nm and less than or equal to 25 nm.

A fixed potential is supplied to the conductive film 334; thus, electromagnetic noise from the outside can be blocked. For example, when sensing is not performed, a constant potential that does not influence the switching of the liquid crystal 353 may be supplied to the conductive film 334. For example, a ground potential, a common potential, or an arbitrary constant potential can be used. The conductive film 334 and the film 111 including graphene may be set at the same potential, for example.

By applying an appropriate potential to the conductive film 334, a component of the thickness direction among the directions of an electric field (the directions of the lines of electric force) generated between the conductive film 120 and the film 111 including graphene can be reduced, and an electric field can be effectively applied in the direction substantially perpendicular to the thickness direction (in the lateral direction). Thus, an orientation defect in the liquid crystal 353 can be suppressed, and a malfunction such as light leakage can be prevented.

A substrate that an object such as a finger or a stylus directly touches may be provided above the conductive films 334 and 335 and the substrate 372. In that case, a polarizing plate or a circularly polarizing plate is preferably provided between the substrate 102 and the above substrate. In that case, a protective layer (such as a ceramic coat) is preferably provided over the substrate. The protective layer can be formed using an inorganic insulating material such as silicon oxide, aluminum oxide, yttrium oxide, or yttria-stabilized zirconia (YSZ). Alternatively, tempered glass may be used for the substrate. The tempered glass which is preferably used here is one that has been subjected to physical or chemical treatment by an ion exchange method, a thermal tempering method, or the like and has a surface to which compressive stress has been added.

<Components>

The above-mentioned components are described below.

<Substrate>

A substrate having a flat surface can be used as the substrate included in the touch panel. The substrate through which light emitted from the display element is extracted is formed using a material that transmits the light. For example, a material such as glass, quartz, ceramics, sapphire, or an organic resin can be used. Alternatively, a single-crystal semiconductor substrate or a polycrystalline semiconductor substrate made of silicon or silicon carbide, a compound semiconductor substrate made of silicon germanium or the like, an SOI substrate, or the like may be used. Still alternatively, any of these substrates provided with a semiconductor element may be used as the substrate. Alternatively, a flexible substrate may be used as the substrate, and a transistor, a capacitor, or the like may be provided directly over the flexible substrate.

The weight and thickness of the touch panel can be decreased by using a thin substrate. Furthermore, a flexible touch panel can be obtained by using a substrate that is thin enough to have flexibility.

As the glass, for example, non-alkali glass, barium borosilicate glass, aluminoborosilicate glass, or the like can be used.

Examples of a material that has flexibility and transmits visible light include glass with a thickness thin enough to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). In particular, a material whose thermal expansion coefficient is low is preferred, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and thus a touch panel using this substrate can also be lightweight.

Since the substrate through which light is not extracted does not need to have a light-transmitting property, a metal substrate using a metal material or an alloy material, a ceramic substrate, a semiconductor substrate, or the like can be used as well as the above-described substrates. A metal material and an alloy material, which have high thermal conductivity, is preferable because they can easily conduct heat to the whole sealing substrate and accordingly can prevent a local temperature rise in the touch panel. To obtain flexibility and bendability, the thickness of a metal substrate is preferably greater than or equal to 10 μm and less than or equal to 200 μm, more preferably greater than or equal to 20 μm and less than or equal to 50 μm.

There is no particular limitation on a material of the metal substrate, but it is preferable to use, for example, aluminum, copper, nickel, a metal alloy such as an aluminum alloy or stainless steel.

It is also acceptable to use a substrate subjected to insulation treatment in such a manner that a surface of the conductive substrate is oxidized or an insulating film is formed on the surface. An insulating film may be formed by, for example, a coating method such as a spin-coating method and a dipping method, an electrodeposition method, an evaporation method, or a sputtering method. An oxide film may be formed over the substrate surface by an anodic oxidation method, a method of exposing to or heating in an oxygen atmosphere, or the like.

The flexible substrate may have a stacked structure of a layer of any of the above-mentioned materials and a hard coat layer (e.g., a silicon nitride layer) that protects a surface of the touch panel from damage or the like, a layer (e.g., an aramid resin layer) that can disperse pressure, and the like. Furthermore, to suppress a decrease in the lifetime of the display element due to moisture and the like, an insulating film with low water permeability may be provided. For example, a film containing nitrogen and silicon (e.g., a silicon nitride film or a silicon oxynitride film) or a film containing nitrogen and aluminum (e.g., an aluminum nitride film) may be provided.

The substrate may be formed by stacking a plurality of layers. When a glass layer is included, a barrier property against water and oxygen can be improved and thus a highly reliable touch panel can be provided.

<Transistor>

The transistor includes a conductive film functioning as the gate electrode, the semiconductor layer, a conductive film functioning as the source electrode, a conductive film functioning as the drain electrode, and an insulating film functioning as the gate insulating film. In the above example, a bottom-gate transistor is used.

Note that there is no particular limitation on the structure of the transistor included in the touch panel of one embodiment of the present invention. For example, a forward staggered transistor or an inverted staggered transistor may be used. A top-gate transistor or a bottom-gate transistor may be used.

There is no particular limitation on the crystallinity of a semiconductor material used for the transistor, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

An oxide semiconductor is preferably used as a semiconductor in which a channel of the transistor is formed. In particular, an oxide semiconductor having a wider band gap than silicon is preferably used. A semiconductor material having a wider band gap and a lower carrier density than silicon is preferably used because off-state leakage current of the transistor can be reduced.

For example, the oxide semiconductor preferably contains at least indium (In) or zinc (Zn). It is further preferable that the oxide semiconductor include an In-M-Zn oxide (M is a metal such as Al, Ti, Ga, Y, Zr, La, Ce, Sn, or Hf).

As the semiconductor layer, it is preferable to use an oxide semiconductor film including a plurality of crystal parts in which the c-axes of the crystal parts are oriented substantially perpendicular to a surface on which the semiconductor layer is formed or the top surface of the semiconductor layer and adjacent crystal parts have no grain boundary.

The oxide semiconductor film preferably includes a film represented by an In-M-Zn oxide that contains at least indium (In), zinc (Zn), and M (M is a metal such as Al, Ti, Ga, Y, Zr, La, Ce, Sn, or Hf). In addition to them, the oxide semiconductor preferably also contains a stabilizer in order to reduce fluctuations in electrical characteristics of the transistors including the oxide semiconductor.

Examples of the stabilizer, including metals that can be used as M, are gallium (Ga), tin (Sn), hafnium (Hf), aluminum (Al), and zirconium (Zr). As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As the oxide semiconductor included in the semiconductor film 110, any of the following can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

For example, when a semiconductor including silicon is used as the semiconductor layer of the transistor, a semiconductor layer including amorphous silicon or the like or a semiconductor layer including polycrystalline silicon that is crystallized by laser annealing or the like can be used. Alternatively, a semiconductor layer including single-crystal silicon or the like that is transferred from a polycrystalline or single-crystal silicon substrate or the like can be used.

<Film Including Graphene>

The film including graphene may be formed by the formation method described in Embodiment 1. The film including graphene can be formed by reducing the film including graphene oxide.

The film including graphene may have any of various shapes and distributions. For example, in the film 111 including graphene, multiple sheets of graphene may be stacked to form the film. Alternatively, flakes with multiple layers of graphene may be stacked and overlap each other to form the film.

The sheet resistance of the film including graphene is preferably more than or equal to $10\Omega/\square$ and less than or equal to $10^4\Omega/\square$.

In the case where the film including graphene is multilayer graphene including two or more layers, the interlayer distance between adjacent graphene layers is preferably larger than or equal to 0.33 nm and smaller than or equal to 0.5 nm, or more preferably larger than or equal to 0.34 nm and smaller than or equal to 0.5 nm.

The oxygen concentration of the entire film including graphene measured by XPS is, for example, less than or equal to 20 atomic %, preferably more than or equal to 2 atomic % and less than or equal to 20 atomic %, further preferably more than or equal to 2 atomic % and less than or equal to 11 atomic %, or still further preferably more than or equal to 3 atomic % and less than or equal to 10 atomic %.

In the case where the film including graphene is analyzed by XPS and the spectrum of binding energy of carbon corresponding to C1s is subjected to waveform separation, the proportion of peaks indicating $sp^2$ with respect to the whole spectrum of C1s can be estimated as an area ratio. The proportion of $sp^2$ in the film including graphene is preferably higher than or equal to 50% and lower than or equal to 90% with respect to the whole spectrum of C1s. Increasing the proportion of $sp^2$ can heighten the conductivity of the film including graphene, for example.

<Conductive Film>

Conductive films such as a gate, a source, and a drain of the transistor and a wiring and an electrode in the touch panel can have a single-layer structure or a stacked-layer structure using any of metals such as aluminum, titanium, chromium, nickel, copper, yttrium, zirconium, molybdenum, silver, tantalum, and tungsten or an alloy containing any of these metals as its main component. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. Copper containing manganese is preferably used because controllability of a shape by etching is increased.

As a material for a light-transmitting conductive film, a conductive oxide such as indium oxide, indium tin oxide (ITO), indium zinc oxide, zinc oxide, or zinc oxide to which gallium is added can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stacked film of any of the above materials can be used as the conductive film. For example, a stacked film of indium tin oxide and an alloy of silver and magnesium is preferably used because the conductivity can be increased.

Alternatively, as the material for the light-transmitting conductive film, a material similar to that of the film 111 including graphene can be used. In that case, the thickness of the film including graphene is preferably greater than or equal to 0.3 nm and less than or equal to 50 nm, or further preferably greater than or equal to 0.3 nm and less than or equal to 25 nm. The film including graphene can be formed by the formation method described in Embodiment 1.

<Insulating Film>

As each of insulating films 106 and 107 functioning as the gate insulating film of the transistor 150, an insulating film including at least one of the following films formed by a plasma chemical vapor deposition (CVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Note that the stacked structure of the insulating films 106 and 107 is not necessarily employed, and an insulating film with a single-layer structure selected from the above films may be used.

The insulating film 106 has a function of a blocking film which inhibits penetration of oxygen.

In this embodiment, a silicon nitride film is formed as the insulating film 106, and a silicon oxide film is formed as the insulating film 107. A silicon nitride film has a higher dielectric constant than a silicon oxide film and needs a larger thickness for capacitance equivalent to that of the silicon oxide film. Thus, when the silicon nitride film is included as the insulating film 108 serving as the gate insulating film of the transistor 150, the physical thickness of the insulating film can be increased. This makes it possible to reduce a decrease in the withstand voltage of the transistor 150 and furthermore increase the withstand voltage, which prevents electrostatic breakdown of the transistor 150.

<Protective Insulating Film>

As each of the insulating films 114, 116, and 118 functioning as the protective insulating film of the transistor 150, an insulating film including at least one of the following films formed by a plasma CVD method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. The thickness of the insulating film 114 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating film 116 can be greater than or equal to 30 nm and less than or equal to 500 nm, preferably greater than or equal to 150 nm and less than or equal to 400 nm.

Further, the insulating films 114 and 116 can be formed using insulating films with the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114, a single-layer structure of the insulating film 116, or a stacked-layer structure including three or more layers may be used.

The insulating film 118 functioning as the dielectric film of the capacitor 160 is preferably a nitride insulating film. The dielectric constant of a silicon nitride film is higher than that of a silicon oxide film, and the silicon nitride film needs to have a larger film thickness than the silicon oxide film to obtain a capacitance equivalent to that of the silicon oxide film. Thus, when the silicon nitride film is included in the insulating film 118 functioning as the dielectric film of the capacitor 160, the physical thickness of the insulating film can be increased. This makes it possible to reduce a decrease in the withstand voltage of the capacitor 160 and furthermore increase the withstand voltage, which prevents electrostatic breakdown of the capacitor 160.

The insulating film 118 has a function of blocking oxygen, hydrogen, water, alkali metal, alkaline earth metal, or the like. The provision of the insulating film 118 can prevent entry of hydrogen, water, or the like from the outside into the semiconductor film 110. Note that instead of the nitride insulating film having a blocking effect against oxygen, hydrogen, water, alkali metal, alkaline earth metal, and the like, an oxide insulating film having a blocking effect against oxygen, hydrogen, water, and the like, may be provided. The oxide insulating film having a blocking effect against oxygen, hydrogen, water, and the like can be an aluminum oxide film, an aluminum oxynitride film, a gallium oxide film, a gallium oxynitride film, an yttrium oxide film, an yttrium oxynitride film, a hafnium oxide film, and a hafnium oxynitride film, or the like.

Examples of an insulating material that can be used for the planarization film, overcoat, spacer, and the like include a resin such as an acrylic resin or an epoxy resin, a resin having a siloxane bond such as silicone, and an inorganic insulating material such as silicon oxide, silicon oxynitride, silicon nitride oxide, silicon nitride, or aluminum oxide.

<Adhesive Layer>

For the adhesive layers, a curable resin such as a heat curable resin, a photocurable resin, or a two-component type curable resin can be used. For example, an acrylic resin, a urethane resin, an epoxy resin, or a resin having a siloxane bond such as silicone can be used.

<Connection Layer>

As the connection layers, an anisotropic conductive film (ACF), an anisotropic conductive paste (ACP), or the like can be used.

<Coloring Film>

Examples of a material that can be used for the coloring films include a metal material, a resin material, and a resin material containing a pigment or dye.

The above is the description of each of the components.

Cross-Sectional Structure Example 2

Figure 13:
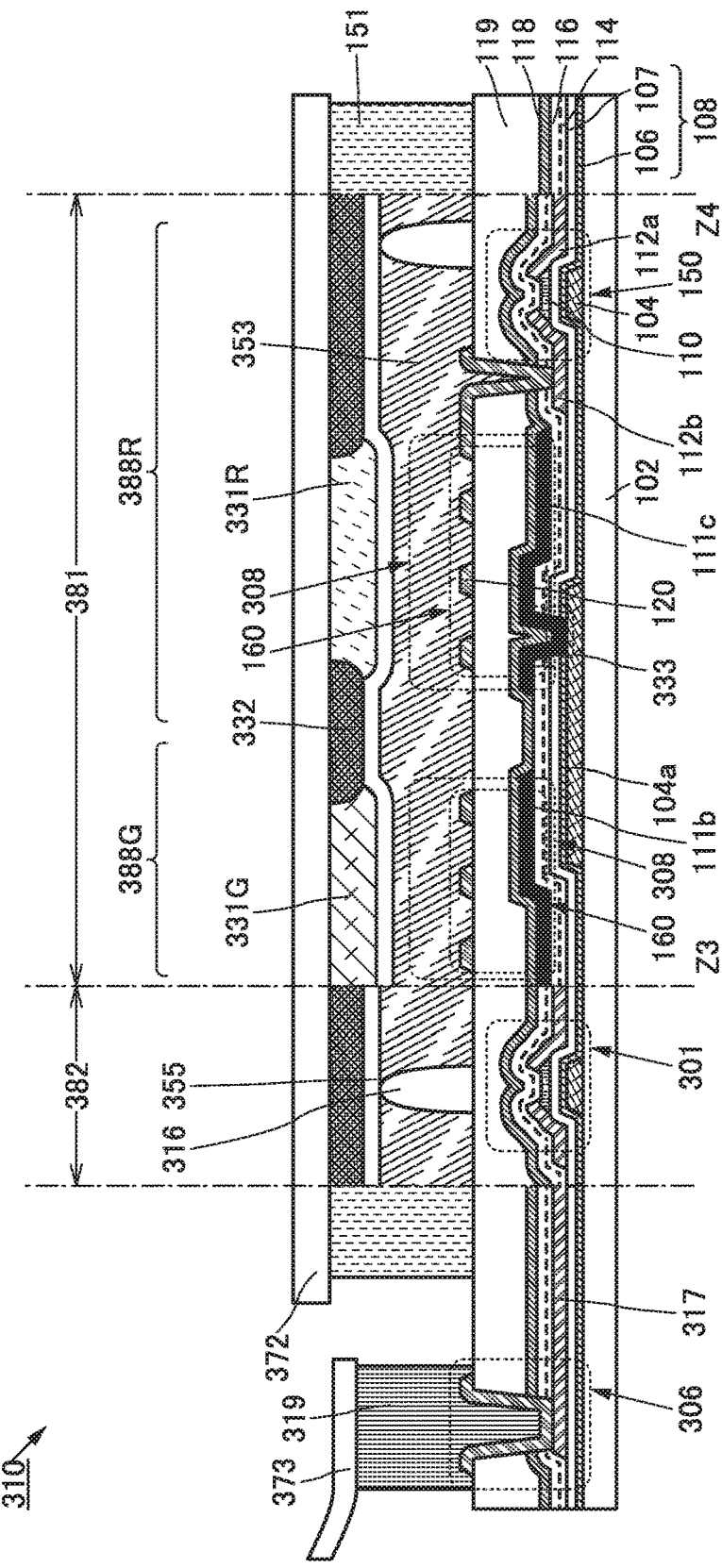
FIG. 13 is a cross-sectional view illustrating an example of a touch panel of an embodiment.

FIG. 13 illustrates a cross-sectional structure example of the touch panel that is partly different from the above-described structure examples. Note that descriptions of the portions already described are omitted and different portions are described.

FIG. 13 has a structure in which the conductive films 334, 335, and 341 and the FPC 375 are not provided on the display surface side of the substrate 372. The film 111 including graphene serving as the common electrode of the liquid crystal element 308 also serves as the pair of electrodes of the touch sensor. Specifically, a film 111b including graphene that extends in one direction and a film 111c including graphene that is electrically connected to a conductive film 104a extending in a direction perpendicular to the extending direction of the film 111b including graphene serve as a pair of electrodes of a touch sensor. With such a structure, the processing steps can be simpler than those of the structure illustrated in FIG. 10. The touch panel 310 shown in FIG. 13 includes an element of one embodiment of the present invention provided with the film 111b including graphene and the film 111c including graphene that are provided to be apart from each other. Note that the film 111c including graphene is electrically connected to the conductive film 104a via an opening 333 provided in the insulating films 108, 114, and 116. The conductive film 104a can be formed at the same time using the same material as the gate electrode 104.

Figure 14A:
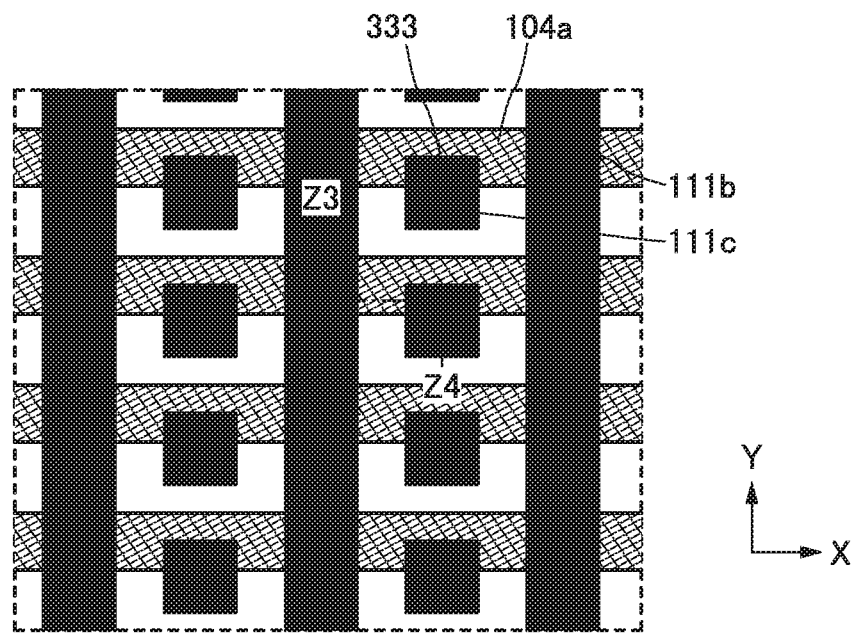
FIGS. 14A and 14B are each a top view illustrating a structure of electrodes of a touch sensor of an embodiment.

Here, the arrangement of the electrodes included in the touch sensor is described. FIG. 14A is a schematic top view of the pair of electrodes of the touch sensor included in the touch panel 310 illustrated in FIG. 13. The dashed-dotted line Z3-Z4 in FIG. 14A corresponds to the display portion 381 in FIG. 13.

The film 111b including graphene that is one electrode of the touch sensor extends in the Y direction. The film 111c including graphene that is the other electrode of the touch sensor is electrically connected to the conductive film 104a via the opening 333. The conductive film 104a extends in the X direction and intersects with the film 111b including graphene.

Figure 14B:
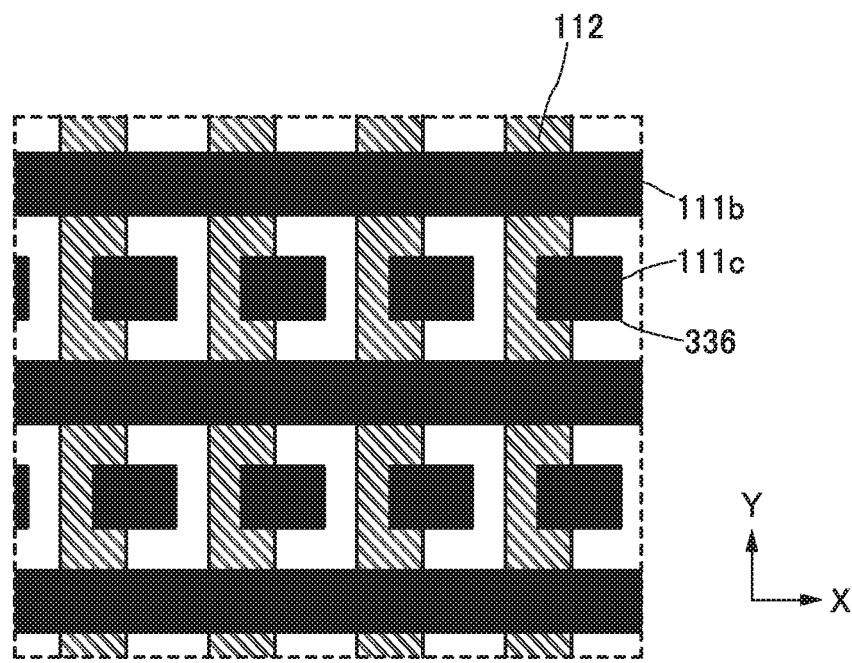

Alternatively, as the conductive film extending in one direction, a conductive film 112 that is formed at the same time using the same material as the source electrode 112a and the drain electrode 112b may be used instead of the conductive film 104a (see FIG. 14B). Note that FIG. 14B shows an example in which the film 111b including graphene extends in the X direction and the conductive film 112 extends in the Y direction. The film 111c including graphene is electrically connected to the conductive film 112 via an opening 336 provided in the insulating film 118 (not illustrated).

Cross-Sectional Structure Example 3

FIG. 34 illustrates a cross-sectional structure example of the touch panel 310 that partly differs from the above-described structure example. Note that descriptions of the portions already described are omitted and different portions are described.

FIG. 34 shows a structure where the touch sensor is provided on the display surface side of the substrate 372. A conductive film 534 and an insulating film 561 that covers part of the conductive film 534 are provided on the display surface side of the substrate 372; the conductive film 334 and a film 532 including graphene are provided over the insulating film 561. In addition, a substrate 530 is attached to the substrate 372 with an adhesive layer 552. A connection portion 307 is provided in a region near an end portion of the substrate 372. The connection portion 307 is electrically connected to the FPC 375 through a connection layer 309. In the example of the structure illustrated in FIG. 34, the connection portion 307 is formed by stacking part of the conductive film 334 and a conductive layer which is formed by processing a conductive film used for forming the conductive film 534. Through an opening in the insulating film 561, the conductive film 534 is electrically connected to the two conductive films 334 that are provided to sandwich the film 532 including graphene.

In the touch sensor, the film 532 including graphene serves as one electrode of the touch sensor. Specifically, the film 532 including graphene that extends in one direction and the conductive film 334 serve as the pair of electrodes of the touch sensor. The touch panel 310 shown in FIG. 34 includes an element of one embodiment of the present invention provided with the film 532 including graphene and the conductive film 334 that are provided to be apart from each other. Since the film 532 including graphene and the conductive film 334 are formed over the insulating film 561, the conductive film 334 is preferably formed simultaneously with the film 532 including graphene, with the use of the same material as that of the film 532 including graphene.

Figure 35:
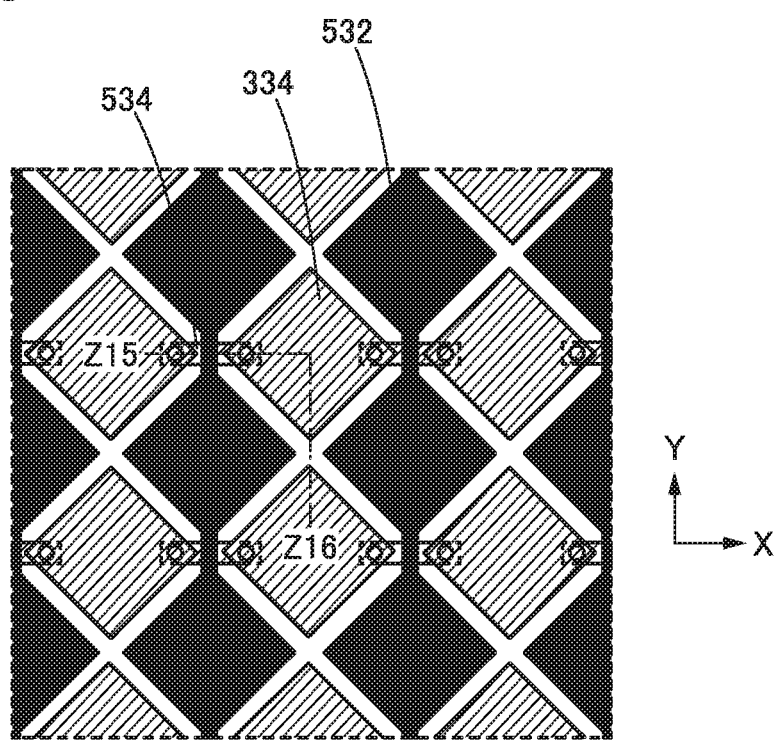
FIG. 35 is a top view illustrating a structure of electrodes of a touch sensor of an embodiment.

Here, the arrangement of the electrodes included in the touch sensor is described. FIG. 35 is a schematic top view of the pair of electrodes of the touch sensor included in the touch panel 310 illustrated in FIG. 34. The dashed-dotted line Z15-Z16 in FIG. 35 corresponds to the display portion 381 in FIG. 34.

The film 532 including graphene that is one electrode of the touch sensor extends in the Y direction. The conductive film 334 that is the other electrode of the touch sensor is electrically connected to the conductive film 534 via an opening. The conductive film 534 extends in the X direction and intersects with the film 532 including graphene.

Other Structure Examples

Note that one embodiment of the present invention is not limited to the above-described structures and can have various structures.

<Peripheral Circuit>

It is possible that peripheral circuits are not integrated with the element substrate. That is, a circuit for driving a touch sensor and a circuit for driving a pixel can be separately formed. Note that one circuit can have both the functions.

A driver circuit for selecting one of the conductive films (electrodes) in the X direction or one of the conductive films (electrodes) in the Y direction of the touch sensor can be formed with a TFT over the element substrate.

The circuit for driving the touch sensor may be provided on the gate driver side or source driver side for driving a pixel.

Among two circuits, a circuit electrically connected to the conductive films (electrodes) of the touch sensor in the X direction and a circuit electrically connected to the conductive films (electrodes) of the touch sensor in the Y direction, one that has a sensing function is preferably an IC. In that case, the conductive films are preferably controlled with the IC via an FPC.

<Material for Conductive Film (Electrode) of Touch Sensor>

The pair of conductive films of the touch sensor is preferably formed using the same material as the common electrode, the pixel electrode, or the like of the liquid crystal element.

Alternatively, the pair of conductive films of the touch sensor may be formed of a meshed metal film (also referred to as a metal mesh). Alternatively, they can be formed of a film including graphene that is processed into a meshed pattern. The film including graphene can be formed by the formation method described in Embodiment 1.

By providing a metal film directly on or below at least one of the conductive film (electrode) in the X direction and the conductive film (electrode) in the Y direction of the touch sensor, the resistance of the conductive film can be reduced. In that case, a stacked structure of a conductive film including a metal oxide and a conductive film including a metal is preferably used, because these conductive films can be formed by a patterning technique using a half tone mask and thus the process can be simplified.

<Wiring for Connecting Conductive Films (Electrodes) of Touch Sensor>

In a region of the touch sensor where the conductive film in the X direction intersects with the conductive film in the Y direction, a bridge structure using another conductive film can be formed. In that case, the conductive film for the bridge structure is, for example, a conductive film on the same plane as the gate electrode of the transistor, and is provided in the lateral direction parallel to the gate line. Alternatively, the conductive film is on the same plane as the source electrode and the drain electrode of the transistor, and is provided in the longitudinal direction parallel to the source line. In that case, a contact portion can be formed in the pixel. Alternatively, the same conductive film as the conductive film functioning as the common electrode or a conductive film on the same plane as the conductive film functioning as the pixel electrode may also be used.

<Conductive Film (Electrode) of Liquid Crystal Element>

A conductive film (electrode) having a slit on the upper side can be used as the pixel electrode, and a conductive film (electrode) provided across a plurality of pixels on the lower side can be used as the common electrode.

Alternatively, a conductive film (electrode) having a slit on the upper side can be used as the common electrode, and a conductive film (electrode) provided across a plurality of pixels on the lower side can be used as the pixel electrode.

The conductive film in the X direction of the touch sensor can also serve as the conductive film functioning as the pixel electrode or the conductive film functioning as the common electrode. Alternatively, the conductive film in the Y direction of the touch sensor can also serve as the conductive film functioning as the pixel electrode or the conductive film functioning as the common electrode.

In addition, the conductive film in the X direction of the touch sensor may be one of a conductive film to which a pulse voltage is applied and a conductive film for sensing a current. In that case, the conductive film in the Y direction of the touch sensor may be the other of the conductive films.

The conductive film functioning as the common electrode may be provided across a plurality of pixels. The conductive film functioning as the common electrode may be electrically connected to a common wiring formed using a conductive film on the same plane as the gate electrode of the transistor, for example. In that case, one conductive film functioning as the common electrode may have an island-shape.

<Counter Substrate>

When a substrate (also referred to as a counter substrate) that faces the substrate provided with the transistor and the like is provided with the conductive film in the X direction or the conductive film in the Y direction of the touch sensor, a light-blocking film is preferably provided closer to the viewing side than the conductive film.

In the case where the counter substrate is provided with one electrode of a liquid crystal element using a TN mode, an MVA mode, or the like, the one electrode may have a slit in a region that overlaps with the conductive film of the touch sensor provided on the counter substrate.

Even in the case where a pair of electrodes of a liquid crystal element are provided over the substrate provided with the transistor and the like as in the case of an FFS mode, an IPS mode, or the like, the counter substrate may be provided with a conductive film for controlling the orientation of liquid crystal. In a manner similar to the above, the conductive film for controlling the orientation of liquid crystal may have a slit in a region that overlaps with the conductive film of the touch sensor.

<Driving Method>

The touch sensor can be driven by, for example, sensing the corresponding row in a period between horizontal periods (gate selection periods) in driving of the pixel. Alternatively, one frame period may be divided in two periods;

writing to all pixels may be performed in the former period, and sensing may be performed in the latter period.

<Method for Manufacturing Transistor, Capacitor, and the Like>

Next, an example of a method for manufacturing the transistor 150 and a pair of electrodes of the capacitor 160 and the liquid crystal element 308 (the film 111 including graphene and the conductive film 120) in the touch panel 310 illustrated in FIG. 10 is described with reference to FIGS. 27A to 27D, FIGS. 28A to 28C, and FIGS. 29A to 29C.

First, the gate electrode 104 is formed over the substrate 102. After that, the insulating film 108 including the insulating films 106 and 107 is formed over the substrate 102 and the gate electrode 104 (see FIG. 27A).

Note that the substrate 102, the gate electrode 104, and the insulating films 106 and 107 can be selected from the materials which are described above. In this embodiment, a glass substrate is used as the substrate 102; a tungsten film is used as a conductive film for the gate electrode 104; a silicon nitride film is used as the insulating film 106; and a silicon oxynitride film is used as the insulating film 107.

To form the gate electrode 104, a conductive film is formed over the substrate 102 and is patterned so that a desired region thereof remains; then, unnecessary regions are etched.

Figure 27A:
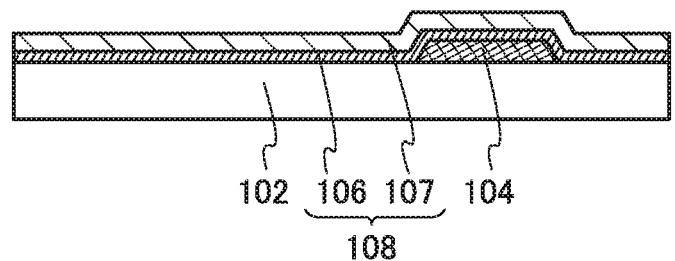
FIGS. 27A to 27D are cross-sectional views illustrating a method for manufacturing a transistor and the like of an embodiment.
Figure 27B:
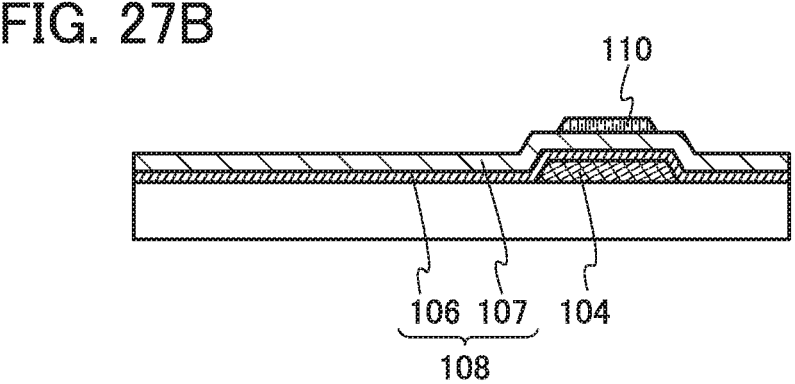

Next, the semiconductor film 110 is formed over the insulating film 108, in a region overlapping with the gate electrode 104 (see FIG. 27B).

The semiconductor film 110 can be formed using any of the materials described above. In this embodiment, as the semiconductor film 110, an In—Ga—Zn oxide film formed using a metal oxide target of In:Ga:Zn=1:1:1.2 is used.

The semiconductor film 110 can be formed in such a manner that an oxide semiconductor film is formed over the insulating film 108, the oxide semiconductor film is patterned so that a desired region thereof remains, and then unnecessary regions are etched.

Figure 27C:
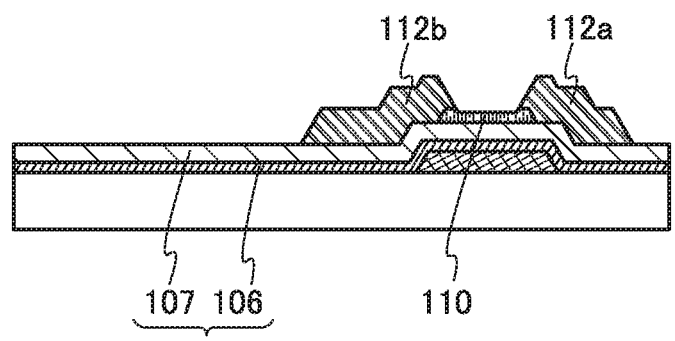
Figure 27D:
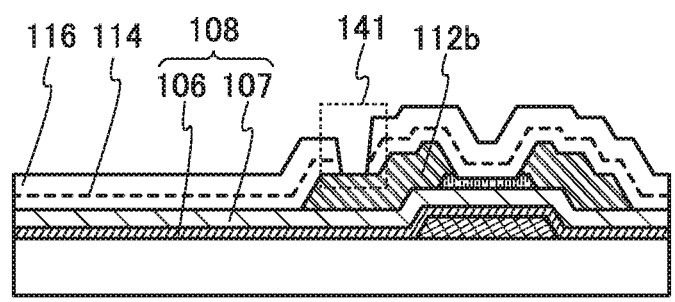

Next, a conductive film is formed over the insulating film 108 and the semiconductor film 110 and patterned such that desired regions remain, and then, unnecessary regions of the conductive film are etched away, whereby the source electrode 112a and the drain electrode 112b are formed over the insulating film 108 and the semiconductor film 110 (see FIG. 27C).

The source electrode 112a and the drain electrode 112b can be formed using a material selected from the above-described materials. Note that in this embodiment, a three-layered structure including a tungsten film, an aluminum film, and a titanium film is used for the source electrode 112a and the drain electrode 112b.

After the source electrode 112a and the drain electrode 112b are formed, a surface of the semiconductor film 110 may be cleaned. The cleaning may be performed, for example, using a chemical solution such as phosphoric acid. The cleaning using a chemical solution such as phosphoric acid can remove impurities (e.g., elements contained in the source electrode 112a and the drain electrode 112b) attached to the surface of the semiconductor film 110. Note that the cleaning is not necessarily performed, and thus the cleaning may be unnecessary.

In addition, in the step of forming the source electrode 112a and the drain electrode 112b and/or the cleaning step, the thickness of a region of the semiconductor film 110 which is not covered by the source electrode 112a and the drain electrode 112b might be reduced.

Next, the insulating films 114 and 116 are formed over the insulating film 108, the semiconductor film 110, the source electrode 112a, and the drain electrode 112b. Then, the insulating films 114 and 116 are patterned so that a desired region thereof remains and unnecessary regions are etched, whereby an opening 141 is formed (see FIG. 27D).

Note that after the insulating film 114 is formed, the insulating film 116 is preferably formed in succession without exposure to the air. When the insulating film 116 is formed in succession by adjusting at least one of the flow rate of a source gas, pressure, a high-frequency power, and a substrate temperature without exposure to the air after the insulating film 114 is formed, the concentration of impurities attributed to the atmospheric component at the interface between the insulating film 114 and the insulating film 116 can be reduced.

Note that the insulating film 114 functions as a protective film for the semiconductor film 110 in the step of forming the insulating film 116. Consequently, the insulating film 116 can be formed using the high-frequency power having a high power density while damage to the semiconductor film 110 is reduced.

The insulating films 114 and 116 can be formed using any of the materials described above. In this embodiment, silicon oxynitride films are used as the insulating films 114 and 116.

Heat treatment (hereinafter referred to as first heat treatment) is preferably performed after the insulating films 114 and 116 are formed. The temperature of the first heat treatment is typically lower than 400° C., preferably lower than 375° C., further preferably higher than or equal to 150° C. and lower than or equal to 350° C. The first heat treatment may be performed under an atmosphere of nitrogen, oxygen, ultra-dry air (air with a water content of 20 ppm or less, preferably 1 ppm or less, more preferably 10 ppb or less), or a rare gas (argon, helium, or the like). The atmosphere of nitrogen, oxygen, ultra-dry air, or a rare gas preferably does not contain hydrogen, water, and the like. An electric furnace, a rapid thermal annealing (RTA) apparatus, or the like can be used for the heat treatment.

The opening 141 is formed to expose part of the drain electrode 112b. The opening 141 can be formed by a dry etching method, for example. The method for forming the opening 141 is not limited thereto, and a wet etching method or a combination of dry etching and wet etching can be employed for the formation. Note that the etching step for forming the opening 141 can reduce the thickness of the drain electrode 112b in some cases.

Figure 28A:
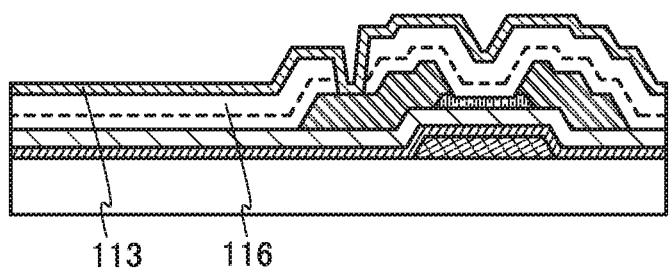
FIGS. 28A to 28C are cross-sectional views illustrating a method for manufacturing a transistor and the like of an embodiment.

Next, the film 111 including graphene is formed over the insulating film 116 to cover the opening 141 (see FIG. 28A).

Note that FIG. 28A is a schematic cross-sectional view showing that the film 113 including graphene oxide that is not yet subjected to reducing treatment for forming the film 111 including graphene is formed over the insulating film 116. In FIG. 28A, the film 113 including graphene oxide is formed by any of the application methods described in Embodiment 1. In this embodiment, a dispersion liquid including graphene oxide is applied to the insulating film 116 by a spray drying method. After that, drying is performed to remove dispersion medium from the dispersion liquid including graphene oxide applied to the insulating film 116, whereby the film 113 including graphene oxide is formed.

Subsequently, the film 113 including graphene oxide is selectively reduced (see FIG. 28B).

The film 113 including graphene oxide formed over the insulating film 116 can be selectively reduced by selective laser irradiation to the film 113 including graphene oxide.

The graphene oxide included in the film 113 is reduced to graphene by the reducing treatment. In this embodiment, part of the film 113 including graphene oxide that is irradiated with a laser beam is reduced to form the film 111 including graphene. Although a laser beam is used for the reducing treatment on the film 113 including graphene oxide in this embodiment, the reducing treatment may be performed by selective ultraviolet light irradiation to the film 113 including graphene oxide with a photomask.

Figure 28B:
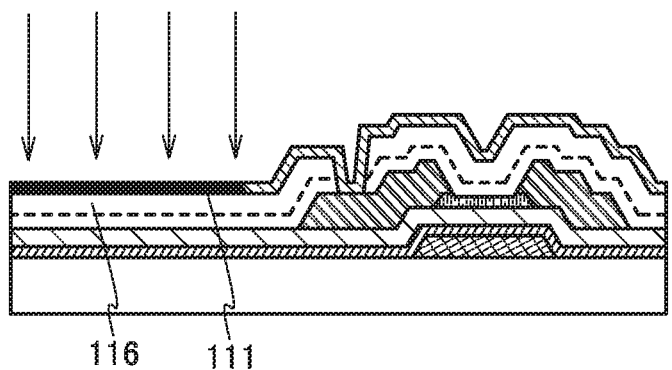

In FIG. 28B, a laser beam incident on the film 113 including graphene oxide is schematically expressed with solid arrows.

Figure 28C:
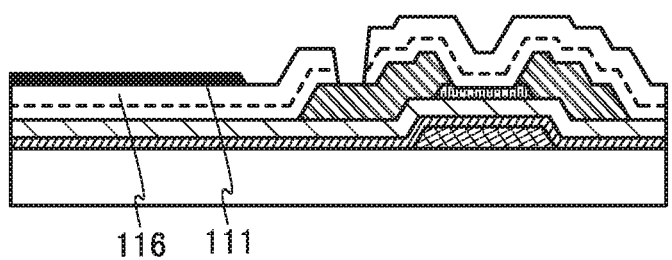

Then, the film 113 including graphene oxide that is not irradiated with a laser beam and thus not reduced in the above reducing treatment is removed (see FIG. 28C).

The film 113 including graphene oxide and the film 111 including graphene that are over the insulating film 116 are washed. In this embodiment, the films are immersed in pure water at room temperature and washed in that state with ultrasonic treatment. The ultrasonic treatment is performed, for example, for 1 to 10 minutes. Alternatively, after immersion in pure water at room temperature, they may be flushed with high-pressure water. After the washing, blow-drying with a nitrogen stream may be performed.

There are many oxygen functional groups (e.g., an epoxy group, a hydroxyl group, carbonyl group, and a carboxyl group) on a surface of the film 113 including graphene oxide. Thus, the surface of the film 113 including graphene oxide has high hydrophilicity. Therefore, the film 113 including graphene oxide is easily dispersed into water when physical force is added to the film by ultrasonic treatment with the film immersed in water or high-pressure water flushing. In contrast, there are a few oxygen functional groups on a surface of the film 111 including graphene, and thus the surface has high hydrophobicity. Thus, the film 111 including graphene obtained by reducing the film 113 including graphene oxide is not dispersed into water even when physical force is added to the film by ultrasonic treatment with the film immersed in water, high-pressure water flushing, or the like. The hydrophilicity of graphene oxide and the hydrophobicity of graphene are utilized to remove the film 113 including graphene oxide. The film 111 including graphene remains over the insulating film 116 even after the washing.

Figure 29A:
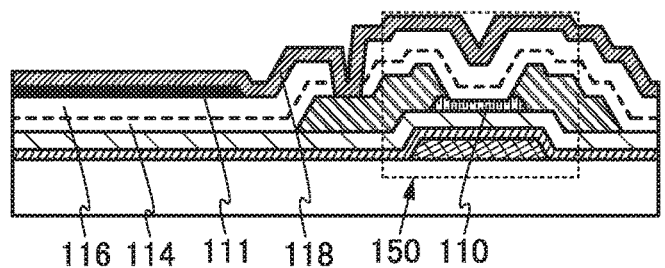
FIGS. 29A to 29C are cross-sectional views illustrating a method for manufacturing a transistor and the like of an embodiment.

Next, the insulating film 118 is formed over the insulating film 116 and the film 111 including graphene (see FIG. 29A).

A silicon nitride film can be used as the insulating film 118, for example. The insulating film 118 can be formed by a sputtering method or a PECVD method, for example. In the case where the insulating film 118 is formed by a PECVD method, for example, the substrate temperature is lower than 400° C., preferably lower than 375° C., or further preferably higher than or equal to 180° C. and lower than or equal to 350° C. The substrate temperature at which the insulating film 118 is formed is preferably within the above range because a dense film can be formed.

After the insulating film 118 is formed, heat treatment similar to the above-described first heat treatment may be performed. At this stage, the transistor 150 is completed.

Figure 29B:
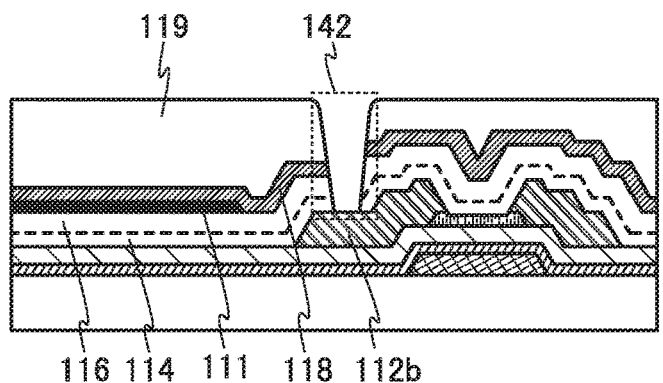

Then, an opening 142 is formed as follows: the insulating film 119 is formed over the insulating film 118, the insulating films 118 and 119 are patterned so that a desired region thereof remains, and unnecessary regions are etched (see FIG. 29B).

The insulating film 119 can be formed using any of the materials described above. Note that in this embodiment, an acrylic resin is used for the insulating film 119.

The opening 142 is formed to expose part of the drain electrode 112b. The opening 142 can be formed by a dry etching method, for example. Not limited thereto, the method for forming the opening 142 can be a wet etching method or a combination of dry etching and wet etching. Note that the etching step for forming the opening 142 can reduce the thickness of the drain electrode 112b in some cases.

Note that the opening may be formed in the insulating films 114, 116, 118, and 119 at one time in the step of forming the opening 142 without performing the step of forming the opening 141. In this case, the number of steps of manufacturing the touch panel of one embodiment of the present invention is reduced, resulting in a reduction of the manufacturing cost.

Figure 29C:
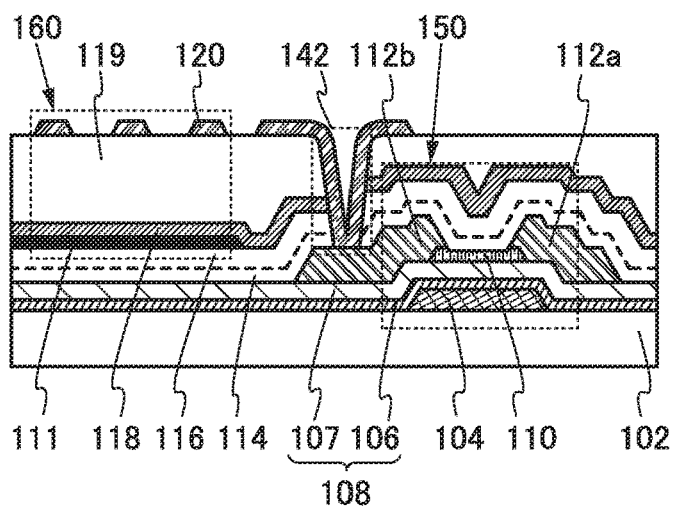

Then, a conductive film is formed over the insulating film 119 to cover the opening 142 and is patterned so that a desired region thereof remains, and unnecessary regions are etched; in this way, the conductive film 120 is formed (see FIG. 29C).

The conductive film 120 can be formed using any of the materials described above. Note that in this embodiment, indium tin oxide is used for the conductive film 120. The capacitor 160 is formed concurrently with the conductive film 120. The capacitor 160 includes a dielectric layer between a pair of electrodes. One of the pair of electrodes is the film 111 including graphene, and the other of the pair of electrodes is the conductive film 120. In addition, the insulating films 118 and 119 serve as the dielectric layer of the capacitor 160.

Through the above steps, the transistor 150 and the pair of electrodes of the capacitor 160 and the liquid crystal element 308 in the touch panel 310 illustrated in FIG. 10 can be manufactured.

Note that although the structure with the insulating film 119 is shown in FIG. 29C, a structure without the insulating film 119 may be employed (see FIG. 29C). In this case, the insulating film 118 serves as a dielectric film of the capacitor 160.

The structures, the methods, and the like described in this embodiment can be combined as appropriate with any of the structures, the methods, and the like described in the other embodiments.

Structure Example 2

In this structure example, an organic EL element is used as the display element included in the touch panel.

Cross-Sectional Structure Example 1

Examples of the cross-sectional structure of a touch panel of one embodiment of the present invention are described below with reference to drawings. Note that descriptions of the portions already described are omitted and different portions are described.

Figure 15:
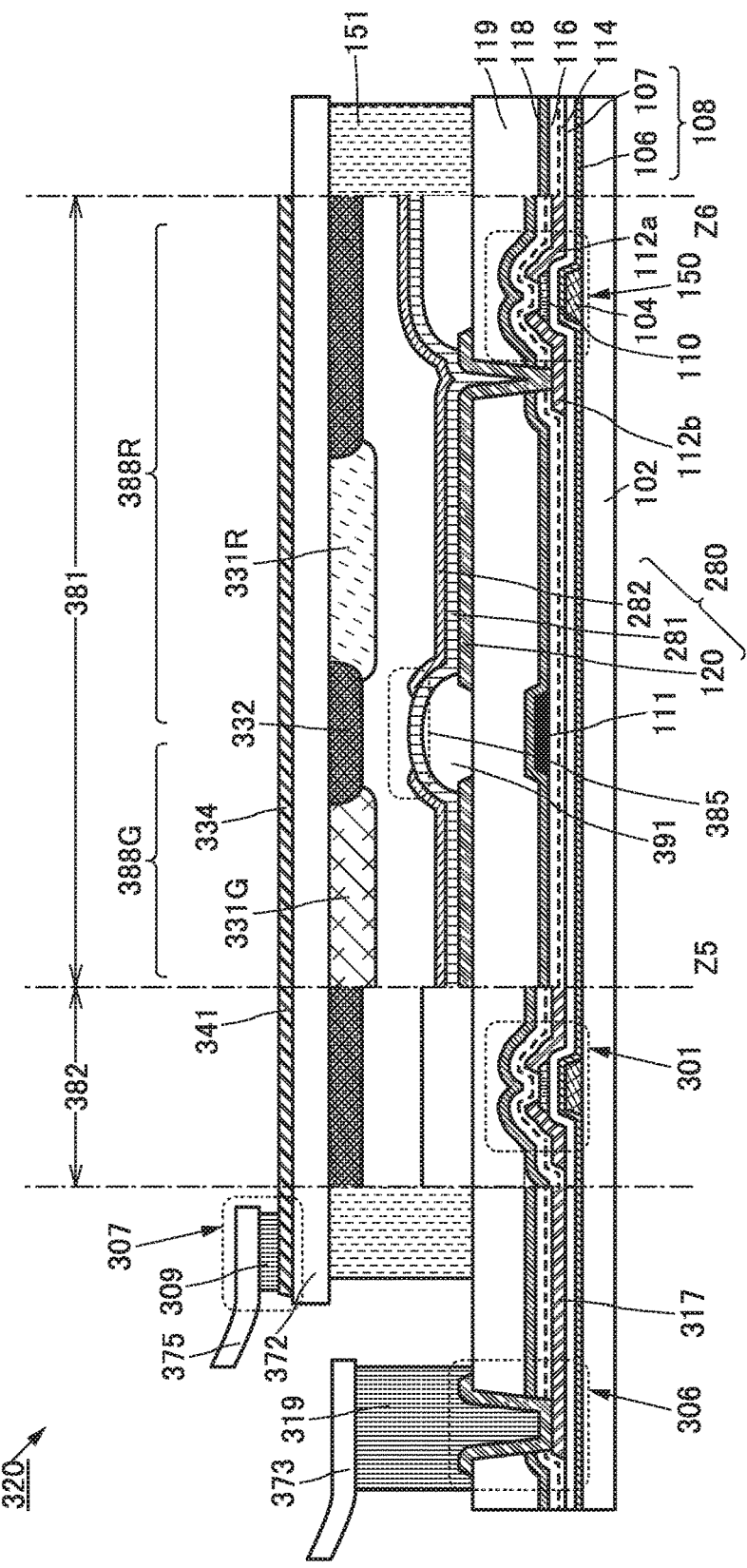
FIG. 15 is a cross-sectional view illustrating an example of a touch panel of an embodiment.

A touch panel 320 illustrated in FIG. 15 includes a light-emitting element 280 in the display portion 381. The light-emitting element 280 includes the conductive film 120, an EL layer 281, and a conductive film 282. The conductive film 120 serving as a reflective film is electrically connected to the drain electrode 112b of the transistor 150 via an opening provided in the insulating films 114, 116, 118, and 119. The conductive film 120 is also referred to as a lower electrode. A material transmitting visible light is used for the conductive film 282. Moreover, the conductive film 282 may serve as a semi-reflective film. The conductive film 282 can also be referred to as an upper electrode. By applying a voltage between the conductive films 120 and 282, light emitted by a light-emitting layer included in the EL layer 281 can be extracted through a coloring film (e.g., the coloring film 331R) provided to the substrate 372. The touch panel 320 illustrated in FIG. 15 includes a so-called top emission display device. Note that the specific structure of the light-emitting element 280 is described later in Embodiment 3.

An insulating film 391 serving as a partition is provided over the insulating film 119. The insulating film 119 is provided to overlap with end portions of the conductive films 120 of two adjacent pixels. The EL layer 281 is provided over the conductive film 120 and the insulating film 391. The conductive film 282 is provided over the EL layer 281 to overlap with at least the conductive film 120. For example, in the touch panel 320 illustrated in FIG. 15, the conductive film 282 includes an opening 385 in a position overlapping with a space between two conductive films 120 of two pixels that are adjacent in one direction. Alternatively, the conductive film 282 may include one opening 385 for each block that includes a plurality of pixels that are adjacent in one direction (e.g., 30 or 60 pixels) in a position overlapping with a space between two conductive films 120 of two pixels that are adjacent to each other in the one direction.

The film 111 including graphene is provided over the insulating film 116 in a position overlapping with the opening 385.

The touch sensor included in the touch panel 320 is formed using the conductive film 334 that is provided over the substrate 372 and the film 111 including graphene that is provided over the substrate 102. With the use of capacitance formed between the conductive film 334 and the film 111 including graphene, the approach or contact of an object can be detected. The touch panel 320 shown in FIG. 15 includes an element of one embodiment of the present invention provided with the film 111 including graphene and the conductive film 334 that are provided to be apart from each other.

Figure 16:
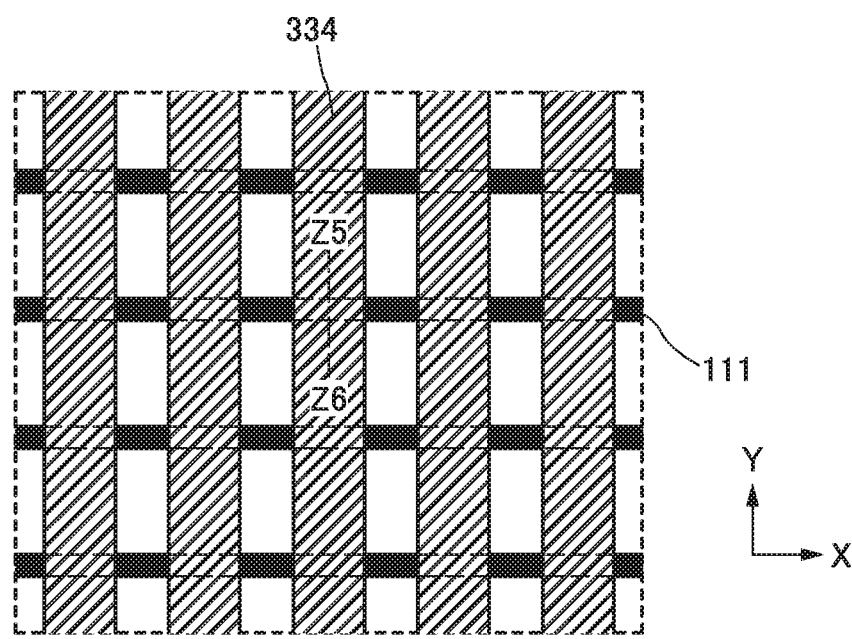
FIG. 16 is a top view illustrating a structure of electrodes of a touch sensor of an embodiment.

Here, the arrangement of the electrodes included in the touch sensor is described. FIG. 16 is a schematic top view of the pair of electrodes of the touch sensor included in the touch panel 320 illustrated in FIG. 15. The dashed-dotted line Z5-Z6 in FIG. 16 corresponds to the display portion 381 in FIG. 15.

The conductive film 334 that is one electrode of the touch sensor extends in the Y direction. The film 111 including graphene that is the other electrode of the touch sensor extends in the X direction and intersects with the conductive film 334. Note that the conductive film 334 may extend in the X direction and the film 111 including graphene may extend in the Y direction.

In the touch panel 320, the substrate 102 and the substrate 372 are attached to each other with the sealant 151. A region surrounded by the substrate 102, the substrate 372, and the sealant 151 is a hollow; however, the region may be filled with a sealant. An insulating film is not provided over the coloring films 331R and 331G and the light-blocking film 332; however, the above-described insulating film 355 serving as an overcoat may be provided.

Figure 17:
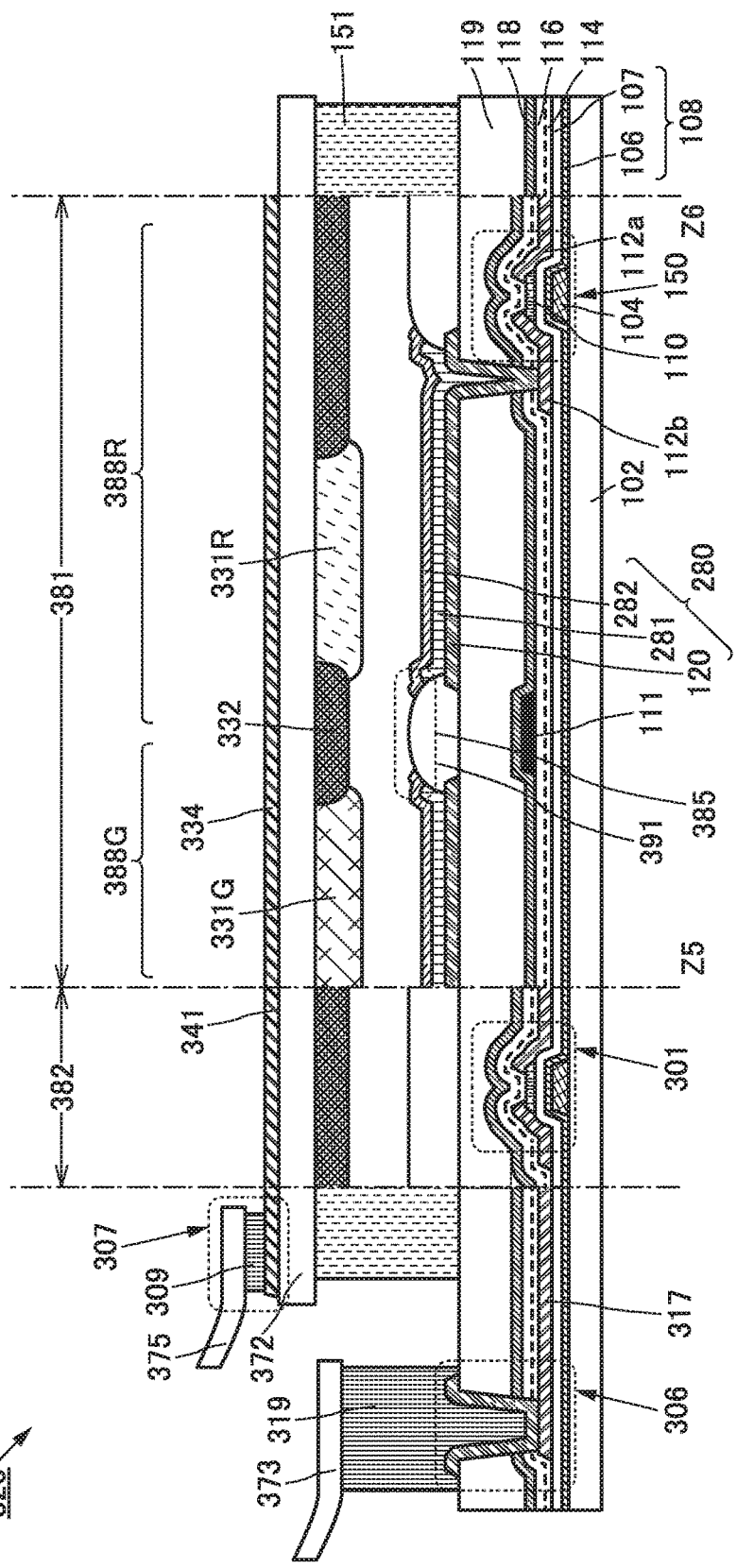
FIG. 17 is a cross-sectional view illustrating an example of a touch panel of an embodiment.

The EL layer 281 in the light-emitting element 280 in FIG. 15 is shared by a plurality of pixels; however, the EL layer 281 may be provided for each pixel (see FIG. 17). In this case, the EL layer 281 including a light-emitting layer emitting light whose color corresponds to emission color required by a pixel may be provided for each pixel. A structure without a coloring film (e.g., the coloring films 331R and 331G) may be employed.

Cross-Sectional Structure Example 2

Figure 18:
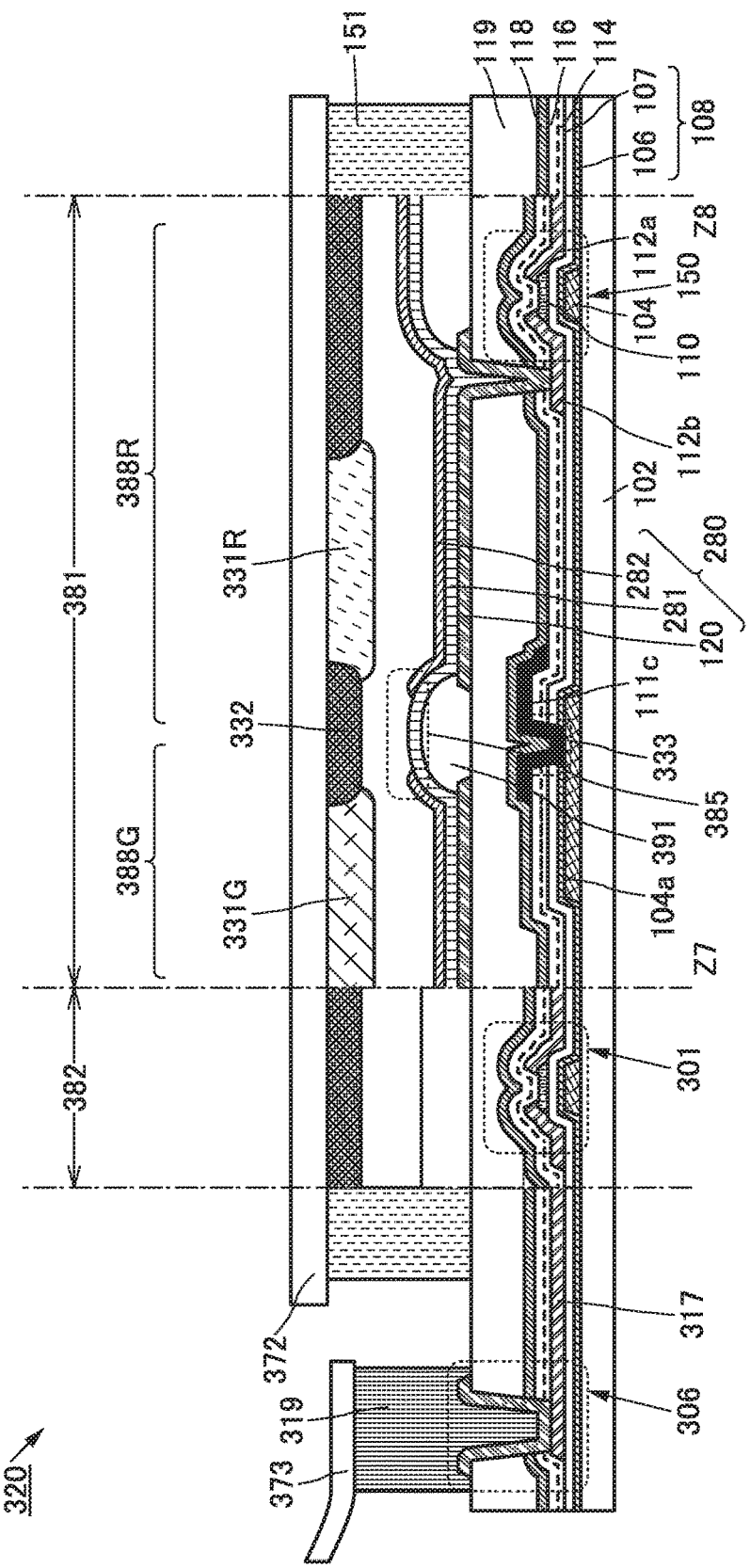
FIG. 18 is a cross-sectional view illustrating an example of a touch panel of an embodiment.

FIG. 18 illustrates a cross-sectional structure example of the touch panel that partly differs from the structure example in FIG. 15. Note that descriptions of the portions already described are omitted and different portions are described.

FIG. 18 has a structure in which the conductive films 334 and 341 and the FPC 375 are not provided on the display surface side of the substrate 372. The gate electrode of the transistor 150 and the film 111 including graphene serve as the pair of electrodes of the touch sensor. Specifically, the film 111b (not illustrated) including graphene that is electrically connected to the gate electrode and extends in one direction and the film 111c including graphene that is electrically connected to the conductive film 104a extending in a direction perpendicular to the extending direction of the film 111b including graphene serve as the pair of electrodes of the touch sensor. With such a structure, the processing steps can be simpler than those of the structure illustrated in FIG. 15. The touch panel 320 shown in FIG. 18 includes an element of one embodiment of the present invention provided with the film 111b including graphene and the film 111c including graphene that are provided to be apart from each other. Note that the film 111c including graphene is electrically connected to the conductive film 104a via the opening 333 provided in the insulating films 108, 114, and 116. The conductive film 104a can be formed at the same time using the same material as the gate electrode 104.

Figure 19:
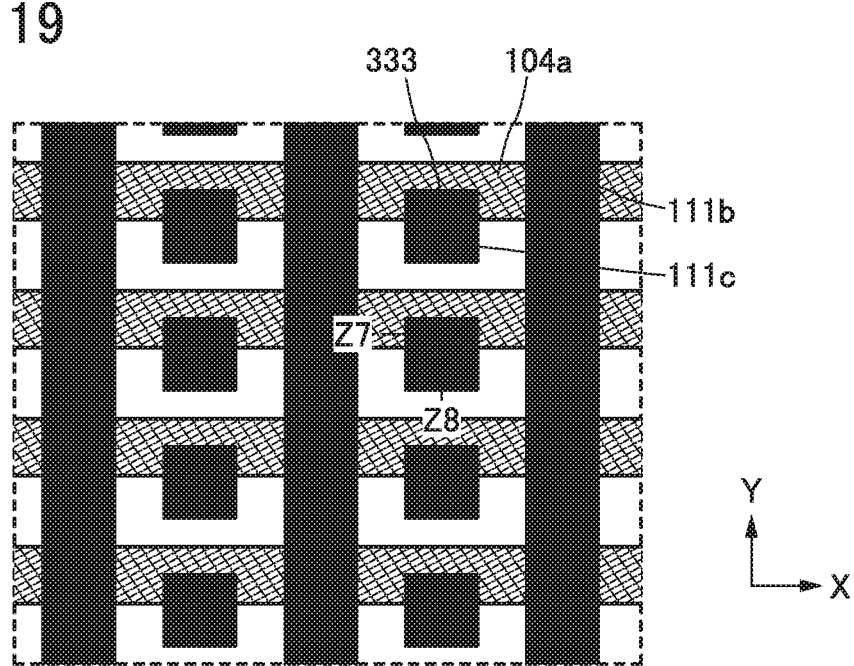
FIG. 19 is a top view illustrating a structure of electrodes of a touch sensor of an embodiment.

Here, the arrangement of the electrodes included in the touch sensor is described. FIG. 19 is a schematic top view of the pair of electrodes of the touch sensor included in the touch panel 320 illustrated in FIG. 18. The dashed-dotted line Z7-Z8 in FIG. 19 corresponds to the display portion 381 in FIG. 18.

The film 111b including graphene that is one electrode of the touch sensor extends in the Y direction. The film 111c including graphene that is the other electrode of the touch sensor is electrically connected to the conductive film 104a via the opening 333. The conductive film 104a extends in the X direction and intersects with the film 111b including graphene.

Figure 20:
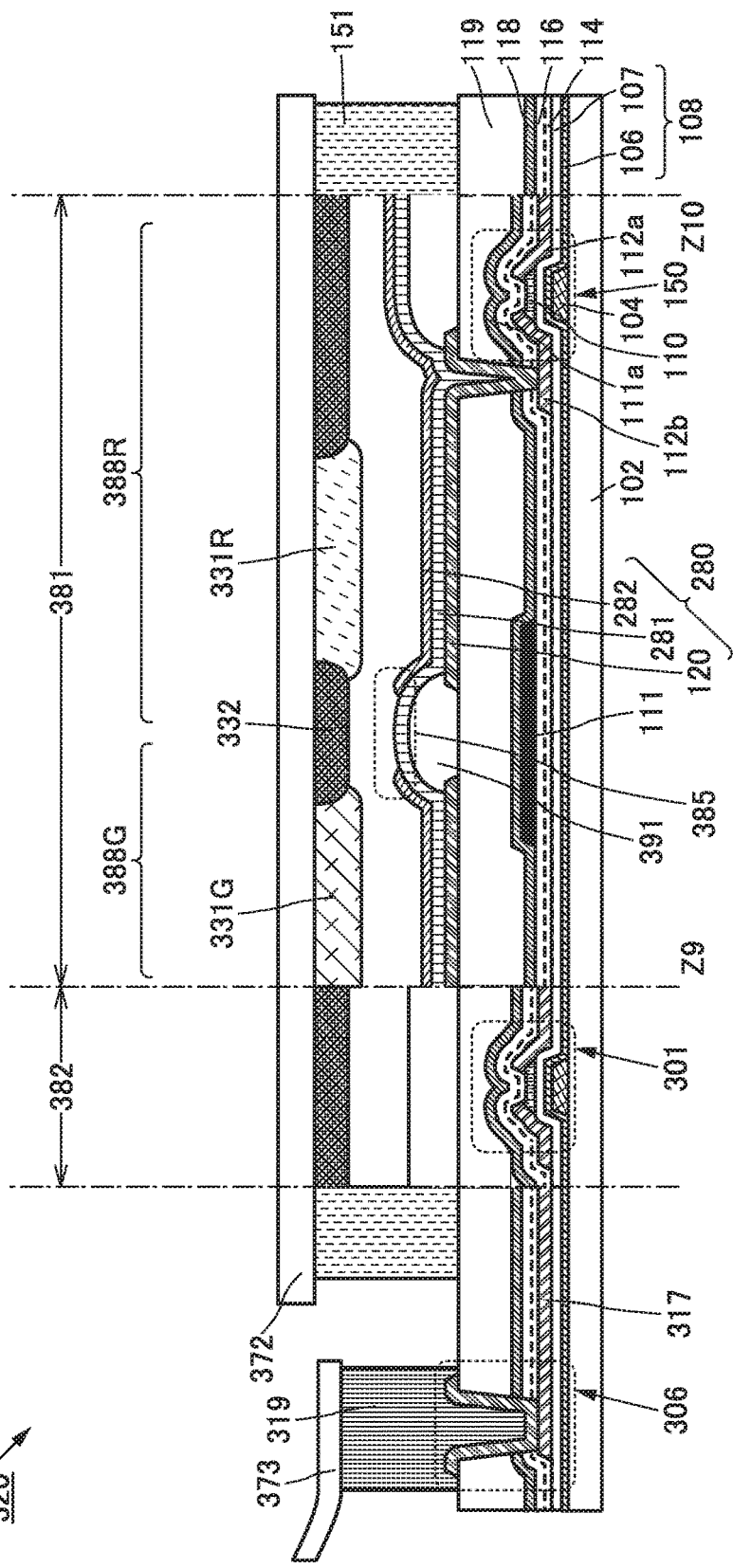
FIG. 20 is a cross-sectional view illustrating an example of a touch panel of an embodiment.
Figure 21:
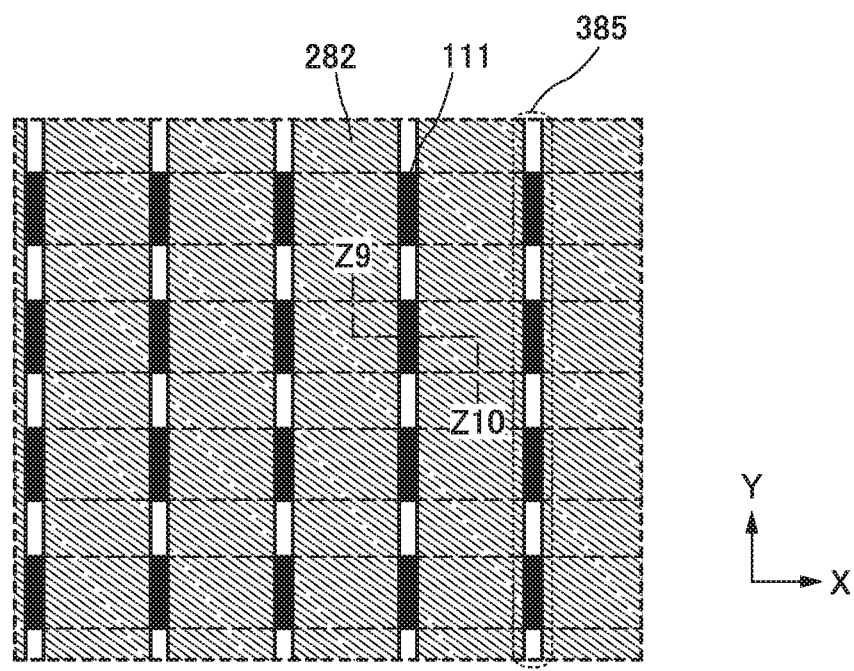
FIG. 21 is a top view illustrating a structure of electrodes of a touch sensor of an embodiment.

The conductive film 282 serving as one electrode of the light-emitting element 280 may serve as the other electrode of the touch sensor. In the touch panel 320 in FIG. 20, the film 111 including graphene that is the one electrode of the touch sensor extends in the X direction. The conductive film 282 extends in the Y direction and intersects with the film 111 including graphene. FIG. 21 is a schematic top view of the pair of electrodes of the touch sensor included in the touch panel 320 illustrated in FIG. 20. The dashed-dotted line Z9-Z10 in FIG. 21 corresponds to the display portion 381 in FIG. 20. The opening 385 in the conductive film 282 extends in the direction orthogonal to the direction in which the film 111 including graphene extends. Part of the opening 385 overlaps with the film 111 including graphene.

Cross-Sectional Structure Example 3

Figure 22:
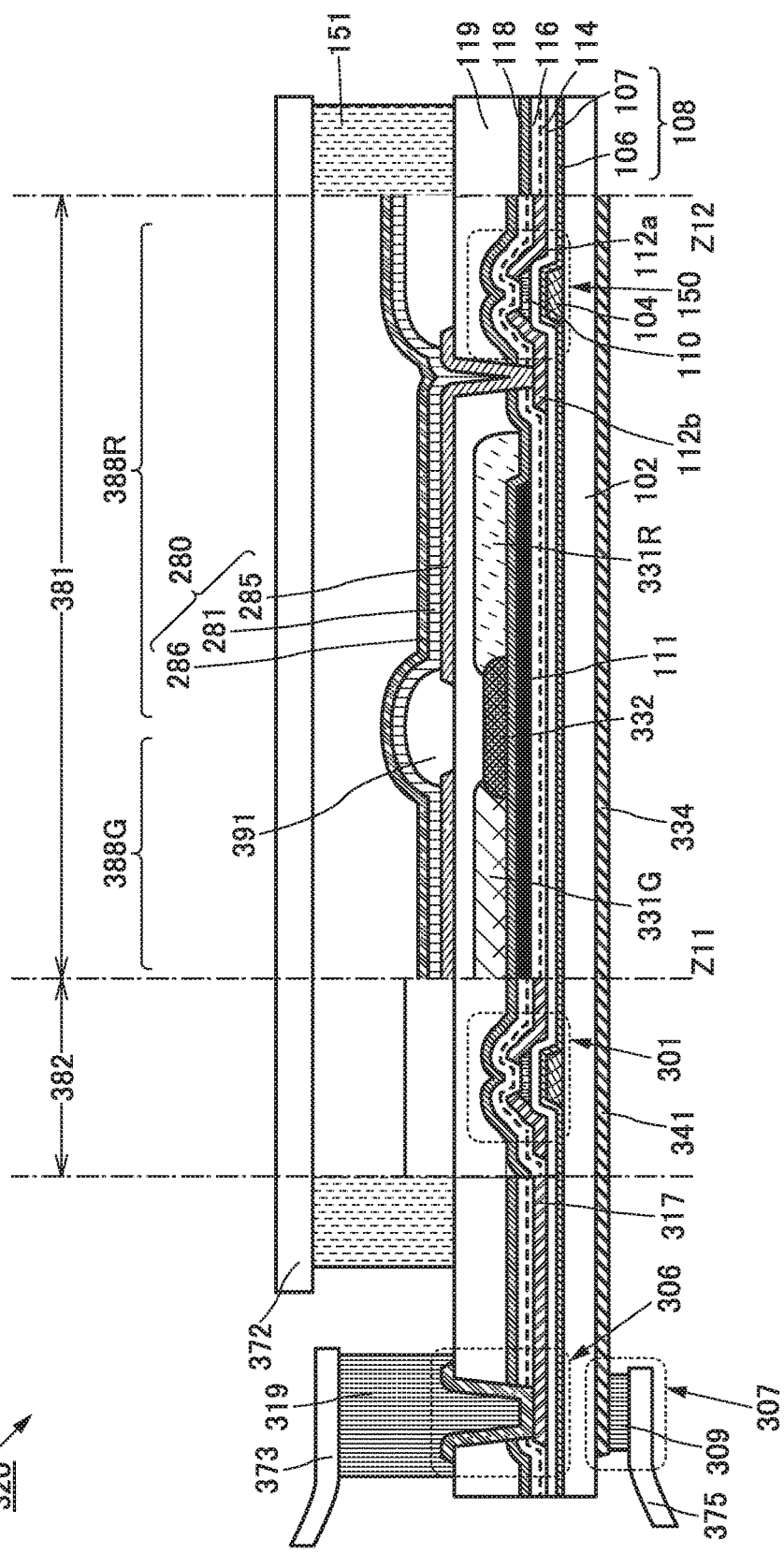
FIG. 22 is a cross-sectional view illustrating an example of a touch panel of an embodiment.

FIG. 22 illustrates a cross-sectional structure example of the touch panel that is partly different from the above-described structure examples. Note that descriptions of the portions already described are omitted and different portions are described.

The touch panel 320 illustrated in FIG. 22 includes the light-emitting element 280 in the display portion 381. The light-emitting element 280 includes a conductive film 285, the EL layer 281, and a conductive film 286. The conductive film 285 is electrically connected to the drain electrode 112b of the transistor 150 via an opening provided in the insulating films 114, 116, 118, and 119. A material transmitting visible light is used for the conductive film 285. Moreover, the conductive film 285 may serve as a semi-reflective film. The conductive film 286 serves as a reflective film. By applying a voltage between the conductive films 285 and 286, light emitted by a light-emitting layer in the EL layer 281 can be extracted through a coloring film (e.g., the coloring film 331R) provided to the substrate 102. The touch panel 320 illustrated in FIG. 22 includes a display device having a so-called bottom emission structure.

The light-blocking film 332 and the coloring films 331R and 331G are provided over the insulating film 118. The light-blocking film 332 is provided in a position overlapping with the insulating film 391. The coloring films 331R and 331G are provided in positions overlapping with the conductive film 285. The EL layer 281 and the conductive film 286 are provided in this order over the conductive film 285.

The conductive films 334 and 341 and the FPC 375 are provided on the display surface side (the side opposite to the substrate 372) of the substrate 102. The touch sensor included in the touch panel 320 is formed using the conductive film 334 and the film 111 including graphene as the pair of electrodes. The touch panel 320 shown in FIG. 22 includes an element of one embodiment of the present invention provided with the film 111 including graphene and the conductive film 334 that are provided to be apart from each other. With the conductive film 334 provided on the display surface side of the substrate 102, another conductive film (e.g., the conductive film 285 and the conductive film 286) is not interposed between the pair of electrodes. The film 111 including graphene can transmit visible light, depending on the thickness of the film 111 including graphene (e.g., when the thickness is greater than or equal to 0.3 nm and less than or equal to 50 nm, or preferably greater than or equal to 0.3 nm and less than or equal to 25 nm). Therefore, the film 111 including graphene can overlap the conductive film 285 that is a path of light emitted from the light-emitting element 280. Accordingly, the film 111 including graphene can be provided in a large area; thus, the capacitance of the touch sensor can be large.

Figure 23:
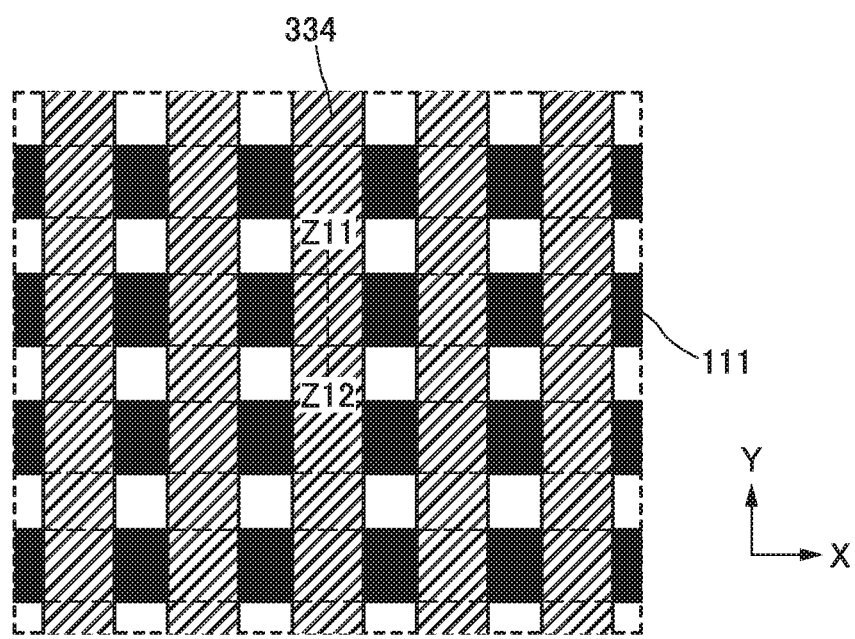
FIG. 23 is a top view illustrating a structure of electrodes of a touch sensor of one embodiment.

Here, the arrangement of the electrodes included in the touch sensor is described. FIG. 23 is a schematic top view of the pair of electrodes of the touch sensor included in the touch panel 320 illustrated in FIG. 22. The dashed-dotted line Z11-Z12 in FIG. 23 corresponds to the display portion 381 in FIG. 22.

The conductive film 334 that is one electrode of the touch sensor extends in the Y direction. The film 111 including graphene that is the other electrode of the touch sensor extends in the X direction and intersects with the conductive film 334. Note that the conductive film 334 may extend in the X direction and the film 111 including graphene may extend in the Y direction.

Figure 24:
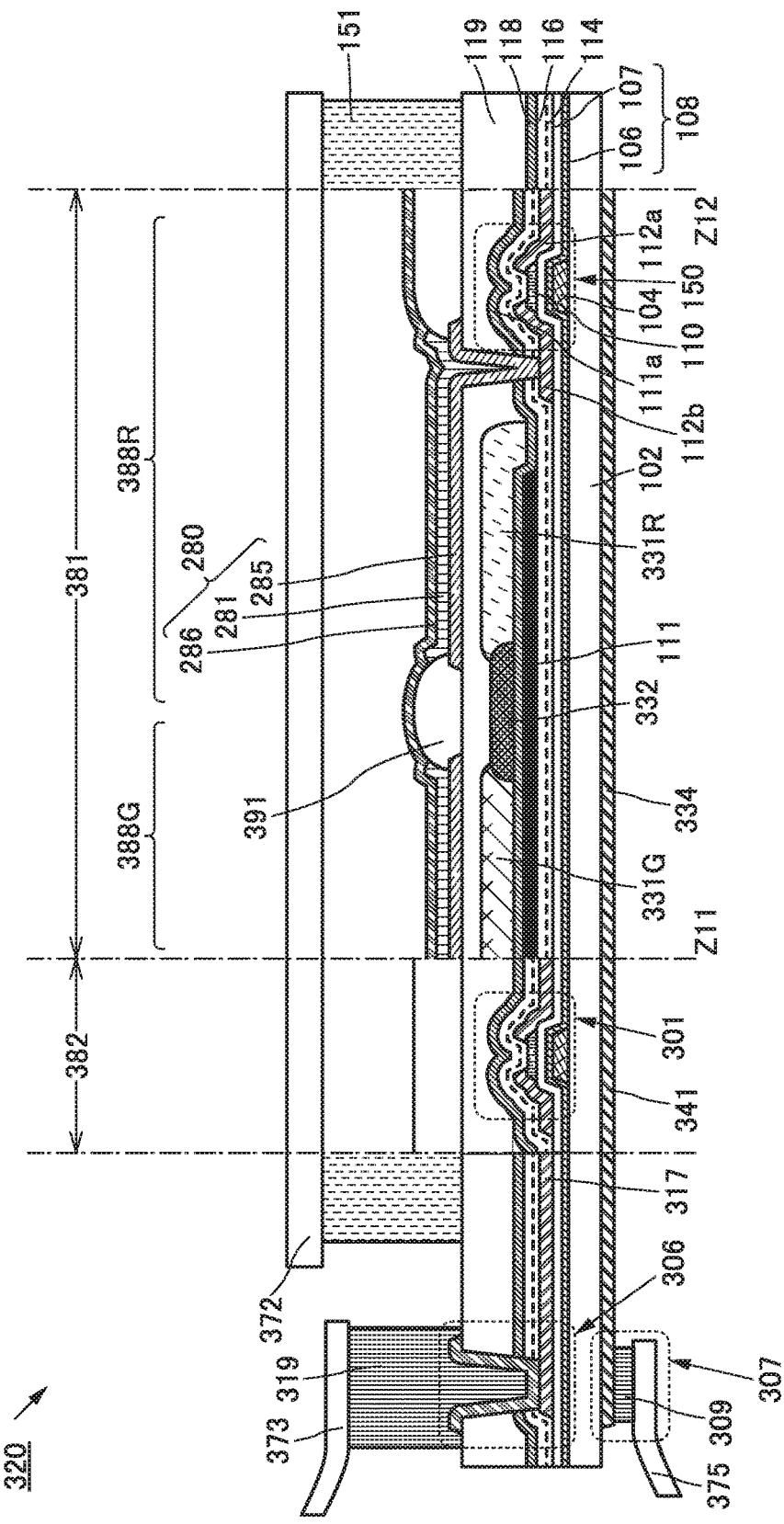
FIG. 24 is a cross-sectional view illustrating an example of a touch panel of an embodiment.

Although the EL layer 281 in the light-emitting element 280 in FIG. 22 is shared by a plurality of pixels, the EL layer 281 may be provided for each pixel (see FIG. 24). In this case, the EL layer 281 including a light-emitting layer emitting light whose color corresponds to emission color required by a pixel may be provided for each pixel. A structure without a coloring film (e.g., the coloring films 331R and 331G) may be employed.

Cross-Sectional Structure Example 4

Figure 25:
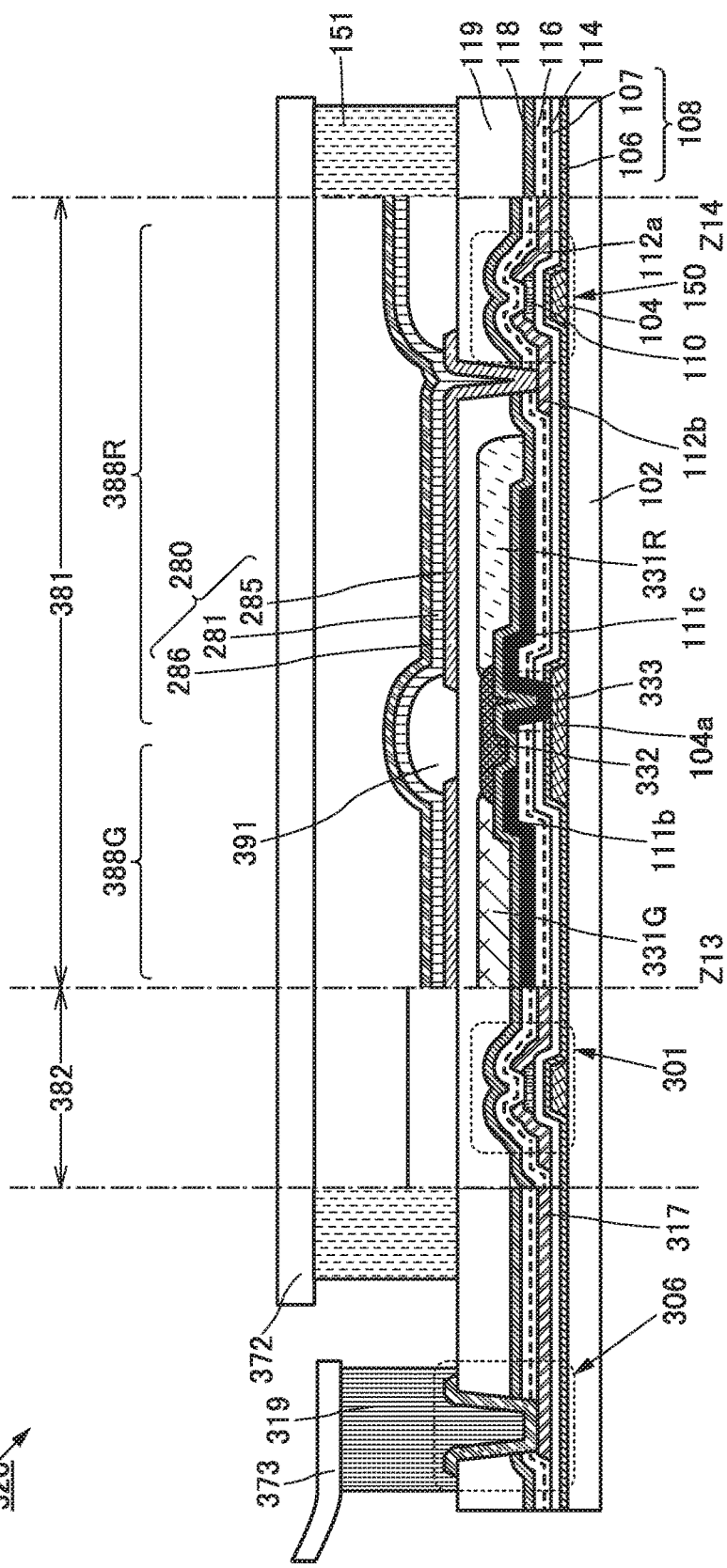
FIG. 25 is a cross-sectional view illustrating an example of a touch panel of an embodiment.

FIG. 25 illustrates a cross-sectional structure example of the touch panel that is partly different from the structure in FIG. 22. Note that descriptions of the portions already described are omitted and different portions are described.

FIG. 25 has a structure in which the conductive films 334 and 341 and the FPC 375 are not provided on the display surface side of the substrate 102. The film 111b including graphene and the film 111c including graphene that is formed with the same material at the same time as the film 111b including graphene serve as the pair of electrodes of the touch sensor. Specifically, the film 111b including graphene that extends in one direction and the film 111c including graphene that is electrically connected to the conductive film 104a extending in a direction perpendicular to the extending direction of the film 111b including graphene serve as the pair of electrodes of the touch sensor. With such a structure, the processing steps can be simpler than those of the structure illustrated in FIG. 22. The touch panel 320 shown in FIG. 25 includes an element of one embodiment of the present invention provided with the film 111b including graphene and the film 111c including graphene that are provided to be apart from each other. Note that the film 111c including graphene is electrically connected to the conductive film 104a via the opening 333 provided in the insulating films 108, 114, and 116. The conductive film 104a can be formed at the same time using the same material as the gate electrode 104. It is preferable that the conductive film 104a be provided in a region overlapping with the light-blocking film 332 because the pair of electrodes of the touch sensor can be formed with the aperture ratio of the pixel maintained.

Figure 26:
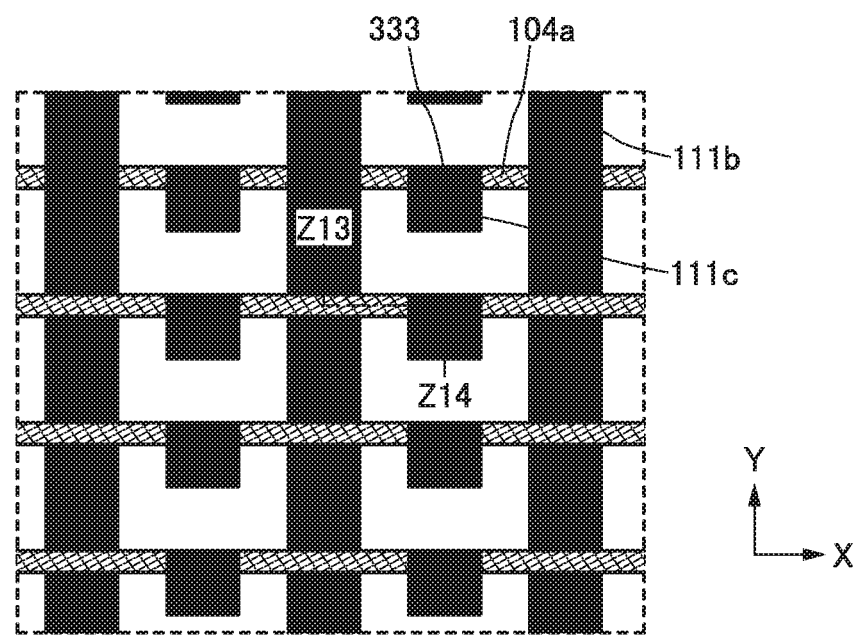
FIG. 26 is a top view illustrating a structure of electrodes of a touch sensor of an embodiment.

Here, the arrangement of the electrodes included in the touch sensor is described. FIG. 26 is a schematic top view of the pair of electrodes of the touch sensor included in the touch panel 320 illustrated in FIG. 25. The dashed-dotted line Z13-Z14 in FIG. 26 corresponds to the display portion 381 in FIG. 25.

The film 111b including graphene that is one electrode of the touch sensor extends in the Y direction. The film 111c including graphene that is the other electrode of the touch sensor is electrically connected to the conductive film 104a via the opening 333. The conductive film 104a extends in the X direction and intersects with the film 111b including graphene.

Cross-Sectional Structure Example 5

Figure 36:
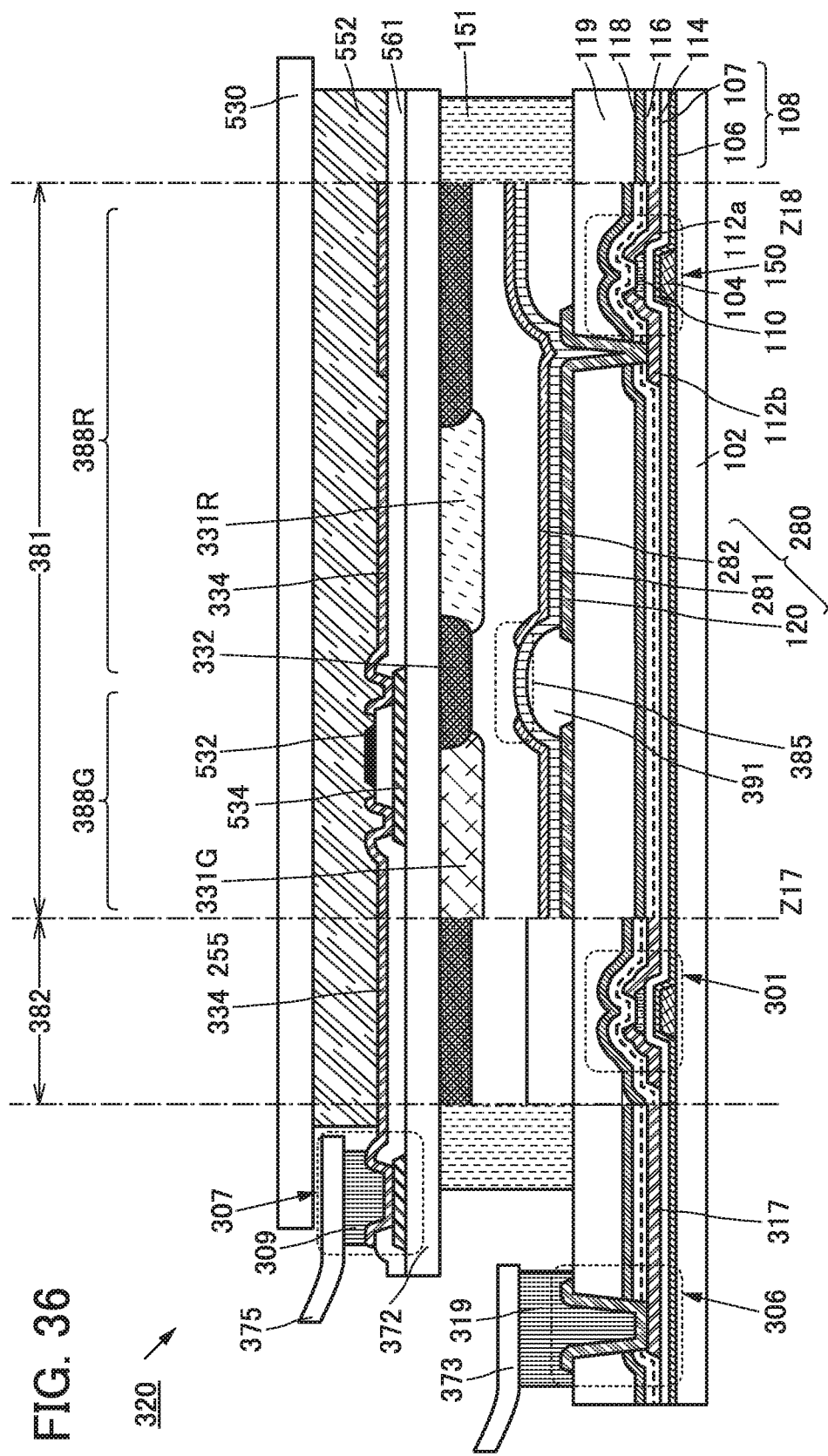
FIG. 36 is a cross-sectional view illustrating an example of a touch panel of an embodiment.

FIG. 36 illustrates a cross-sectional structure example of the touch panel that is partly different from the structure in FIG. 15. Note that descriptions of the portions already described are omitted and different portions are described.

FIG. 36 shows a structure where a touch sensor is provided on the display surface side of the substrate 372. The conductive film 534 and the insulating film 561 that covers part of the conductive film 534 are provided on the display surface side of the substrate 372; the conductive film 334 and the film 532 including graphene are provided over the insulating film 561. In addition, a substrate 530 is attached to the substrate 372 with an adhesive layer 552. The connection portion 307 is provided in a region near an end portion of the substrate 372. The connection portion 307 is electrically connected to the FPC 375 through the connection layer 309. The connection portion 307 is formed by stacking part of the conductive film 334 and a conductive layer which is formed by processing a conductive film used for forming the conductive film 534. Through an opening in the insulating film 561, the conductive film 534 is electrically connected to the two conductive films 334 that are provided to sandwich the film 532 including graphene.

In the touch sensor, the film 532 including graphene serves as one electrode of the touch sensor. Specifically, the film 532 including graphene that extends in one direction and the conductive film 334 serve as the pair of electrodes of the touch sensor. The touch panel 320 shown in FIG. 36 includes an element of one embodiment of the present invention provided with the film 532 including graphene and the conductive film 334 that are provided to be apart from each other. Since the film 532 including graphene and the conductive film 334 are formed over the insulating film 561, the conductive film 334 is preferably formed simultaneously with the film 532 including graphene, with the use of the same material as that of the film 532 including graphene.

Figure 37:
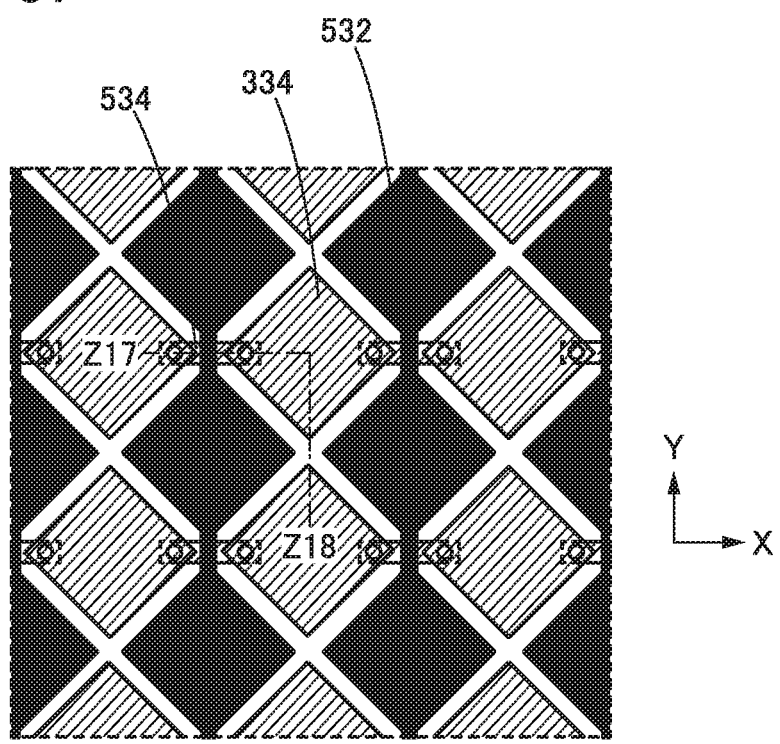
FIG. 37 is a top view illustrating a structure of electrodes of a touch sensor of an embodiment.

Here, the arrangement of the electrodes included in the touch sensor is described. FIG. 37 is a schematic top view of the pair of electrodes of the touch sensor included in the touch panel 320 illustrated in FIG. 36. The dashed-dotted line Z17-Z18 in FIG. 37 corresponds to the display portion 381 in FIG. 36.

The film 532 including graphene that is one electrode of the touch sensor extends in the Y direction. The conductive film 334 that is the other electrode of the touch sensor is electrically connected to the conductive film 534 via an opening. The conductive film 534 extends in the X direction and intersects with the film 532 including graphene.

At least part of this embodiment can be implemented in combination with any of the embodiments described in this specification as appropriate.

Embodiment 3

In this embodiment, structure examples of a light-emitting element that can be used as the light-emitting element 280 are described. Note that an EL layer 1320 described in this embodiment corresponds to the EL layer 281 described in the other embodiments.

<Structure of Light-Emitting Element>

Figure 30A:
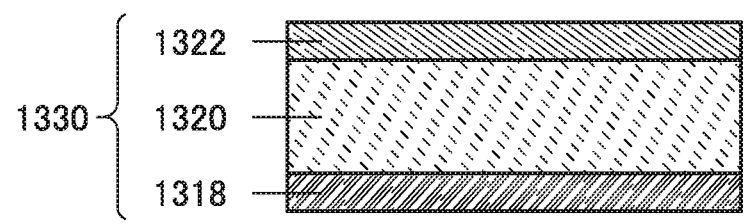
FIGS. 30A and 30B each illustrate a structure example of a light-emitting element.

In a light-emitting element 1330 illustrated in FIG. 30A, the EL layer 1320 is sandwiched between a pair of electrodes (electrodes 1318 and 1322). Note that the electrode 1318 is used as an anode and the electrode 1322 is used as a cathode as an example in the following description of this embodiment.

The EL layer 1320 includes at least a light-emitting layer and may have a stacked-layer structure including a functional layer other than the light-emitting layer. As the functional layer other than the light-emitting layer, a layer containing a substance having a high hole injection property, a substance having a high hole-transport property, a substance having a high electron-transport property, a substance having a high electron injection property, a bipolar substance (a substance having high electron- and hole-transport properties), or the like can be used. Specifically, functional layers such as a hole-injection layer, a hole-transport layer, an electron-transport layer, an electron-injection layer, and the like can be used in appropriate combination.

The light-emitting element 1330 illustrated in FIG. 30A emits light when current flows by a potential difference applied between the electrodes 1318 and 1322 and holes and electrons are recombined in the EL layer 1320. In other words, a light-emitting region is formed in the EL layer 1320.

In one embodiment of the present invention, light emitted from the light-emitting element 1330 is extracted to the outside from the electrode 1318 side or the electrode 1322 side. Thus, one of the electrodes 1318 and 1322 is formed using a light-transmitting substance.

Figure 30B:
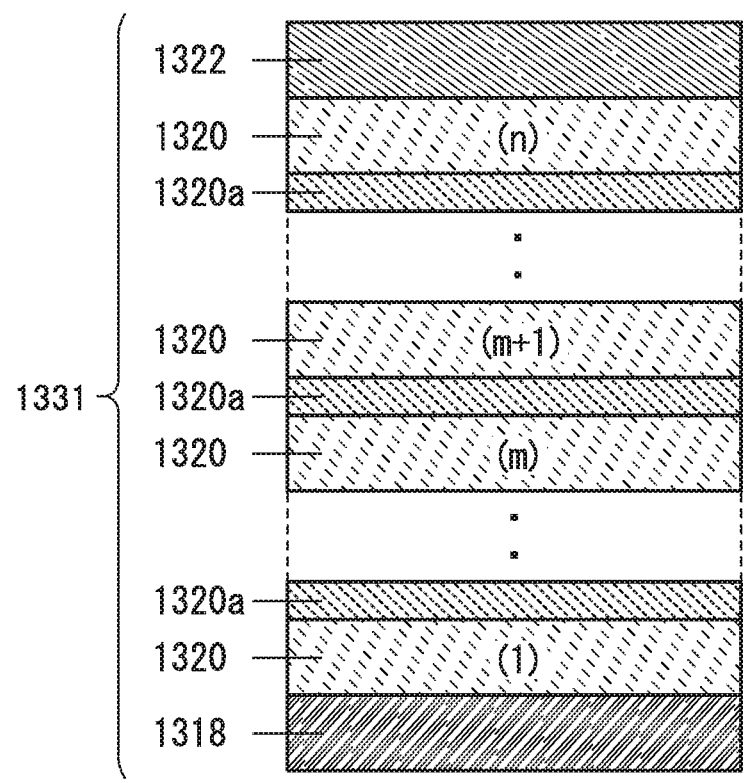

Note that a plurality of EL layers 1320 may be stacked between the electrodes 1318 and 1322 as in a light-emitting element 1331 illustrated in FIG. 30B. In the case where n (n is a natural number of 2 or more) layers are stacked, an electric charge generation layer 1320a is preferably provided between an m-th EL layer 1320 and an (m+1)th EL layer 1320. Note that m is a natural number greater than or equal to 1 and less than n. The components other than the electrodes 1318 and 1322 correspond to the EL layer 281 of the aforementioned embodiments.

The electric charge generation layer 1320a can be formed using a composite material of an organic compound and a metal oxide. Examples of the metal oxide are vanadium oxide, molybdenum oxide, tungsten oxide, or the like. As the organic compound, a variety of compounds can be used; for example, an aromatic amine compound, a carbazole derivative, an aromatic hydrocarbon, and an oligomer, a dendrimer, and a polymer which have a basic skeleton of any of these compounds can be used. It is to be noted that the organic compound having hole mobility of $10^{-6}$ cm$^2$/Vs or greater is preferably used as a hole transport organic compound. However, besides the above materials, others may be used as long as the material has a higher hole transport property than an electron transport property. These materials used for the electric charge generation layer 1320a have excellent carrier-injection properties and carrier-transport properties; thus, the light-emitting element 1331 can be driven with low current and with low voltage. Other than the composite material, a material obtained by adding an alkali metal, an alkaline earth metal, a compound of the alkali metal, a compound of the alkaline earth metal, or the like to the composite material can be used for the electric charge generation layer 1320a.

Note that the electric charge generation layer 1320a may be formed by a combination of a composite material of an organic compound and a metal oxide with another material. For example, the charge generation layer 1320a may be formed by a combination of a layer containing the composite material of an organic compound and a metal oxide with a layer containing one compound selected from among electron-donating substances and a compound having a high electron-transport property. Further, the charge generation layer 1320a may be formed by a combination of a layer containing the composite material of an organic compound and a metal oxide with a transparent conductive film.

The light-emitting element 1331 having such a structure is unlikely to cause energy transfer between the neighboring EL layer 1320 and can easily realize high emission efficiency and a long lifetime. Further, a light-emitting element which provides phosphorescence from one of light-emitting layers and fluorescence from the other of the light-emitting layers can be easily obtained.

The electric charge generation layer 1320a has a function of injecting holes to one of the EL layers 1320 that is in contact with the electric charge generation layer 1320a and a function of injecting electrons to the other EL layer 1320 that is in contact with the electric charge generation layer 1320a, when voltage is applied to the electrodes 1318 and 1322.

The light-emitting element 1331 illustrated in FIG. 30B can provide a variety of emission colors by changing the type of the light-emitting substance used for the EL layers 1320. In addition, a plurality of light-emitting substances having different emission colors may be used as the light-emitting substances, whereby light emission having a broad spectrum or white light emission can be obtained.

In the case of obtaining white light emission using the light-emitting element 1331 in FIG. 30B, as for a combination of a plurality of EL layers, a structure for emitting white light including red light, blue light, and green light may be used. For example, the structure may include an EL layer containing a blue fluorescent substance as a light-emitting substance and an EL layer containing green and red phosphorescent substances as light-emitting substances. Alternatively, the structure may include an EL layer exhibiting red light emission, an EL layer exhibiting green light emission, and an EL layer exhibiting blue light emission. Also with a structure including EL layers emitting light of complementary colors, white light emission can be obtained. In a stacked-layer element including two stacked EL layers which emit light of complementary colors, the combinations of colors are as follows: blue and yellow, blue-green and red, and the like.

Note that in the structure of the above stacked-layer element, by providing the electric charge generation layer between the stacked light-emitting layers, the element can give high-luminance emission at a low current density, and have a long lifetime.

This embodiment can be implemented in an appropriate combination with any of the structures described in the other embodiments.

Embodiment 4

In this embodiment, a display module and electronic devices that include the touch panel of one embodiment of the present invention is described with reference to FIG. 31, FIGS. 32A to 32H, and FIGS. 33A and 33B.

Figure 31:
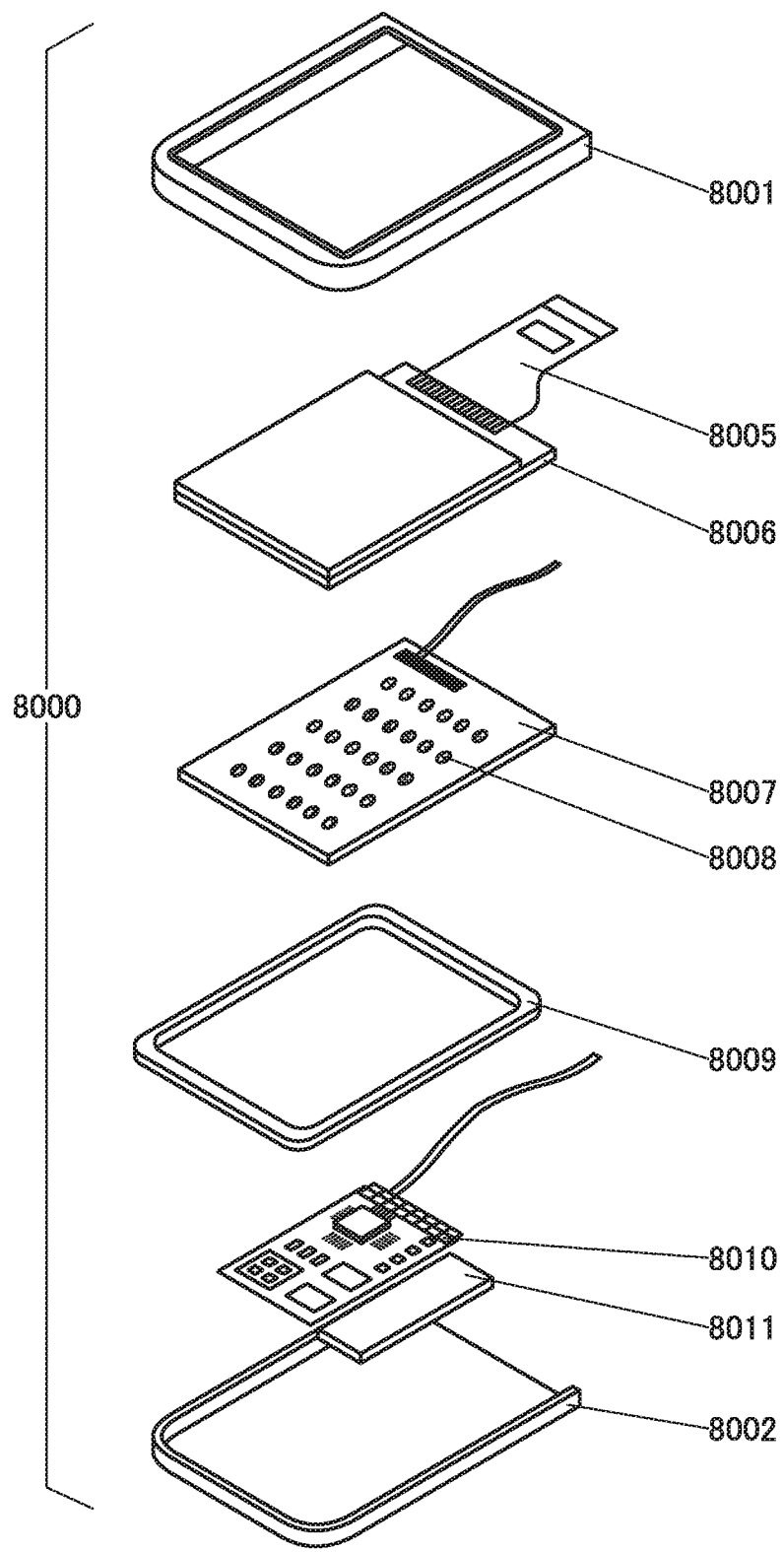
FIG. 31 illustrates a display module of an embodiment.

In a display module 8000 illustrated in FIG. 31, a display panel 8006 connected to an FPC 8005, a backlight unit 8007, a frame 8009, a printed board 8010, and a battery 8011 are provided between an upper cover 8001 and a lower cover 8002.

The display device of one embodiment of the present invention can be used for, for example, the display panel 8006.

The shapes and sizes of the upper cover 8001 and the lower cover 8002 can be changed as appropriate in accordance with the size of the display panel 8006.

The display panel 8006 has a capacitive touch sensor.

The backlight unit 8007 includes a light source 8008.

Note that although a structure in which the light sources 8008 are provided over the backlight unit 8007 is illustrated in FIG. 31, one embodiment of the present invention is not limited to this structure. For example, a structure in which the light source 8008 is provided at an end portion of the backlight unit 8007 and a light diffusion plate is further provided may be employed.

Note that the backlight unit 8007 need not be provided in the case where a self-luminous light-emitting element such as an organic EL element is used or in the case where a reflective panel or the like is employed.

The frame 8009 protects the display panel 8006 and functions as an electromagnetic shield for blocking electromagnetic waves generated by the operation of the printed board 8010. The frame 8009 can function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

FIGS. 32A to 32H and FIGS. 33A and 33B illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 32A:
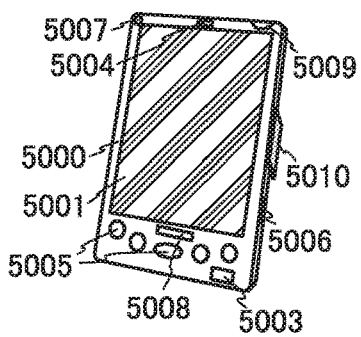
FIGS. 32A to 32H each illustrate an electronic device of an embodiment.
Figure 32B:
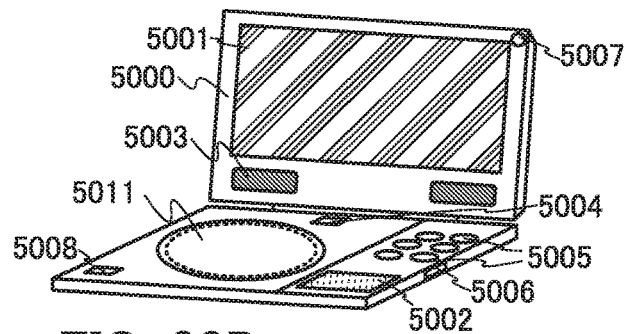
Figure 32C:
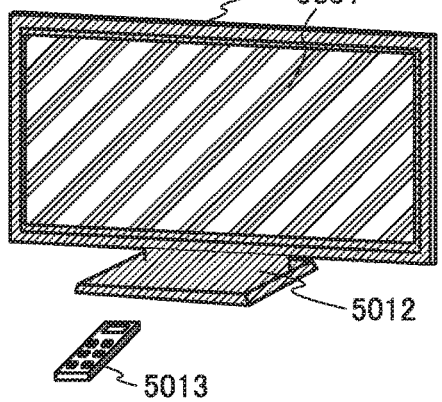
Figure 32D:
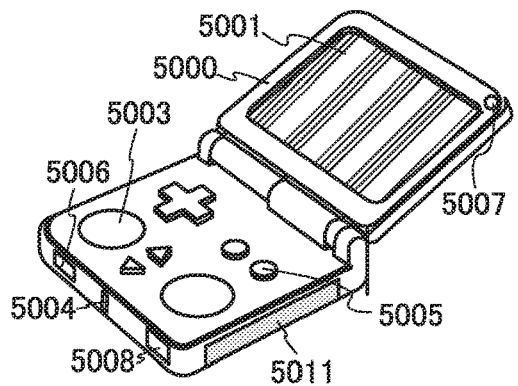
Figure 32E:
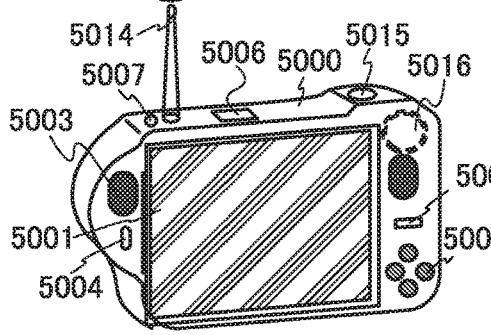
Figure 32F:
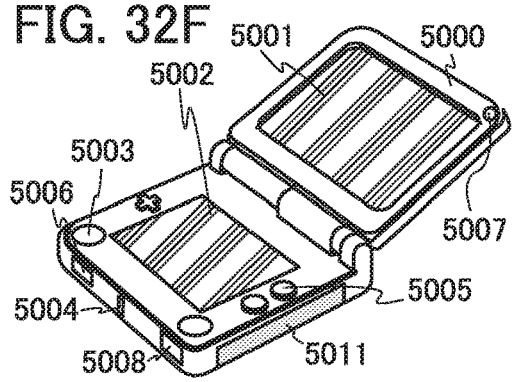
Figure 32G:
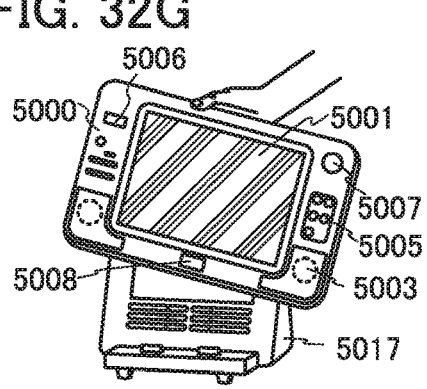
Figure 32H:
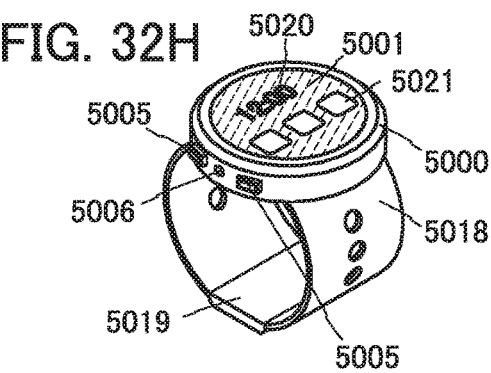
Figure 33A:
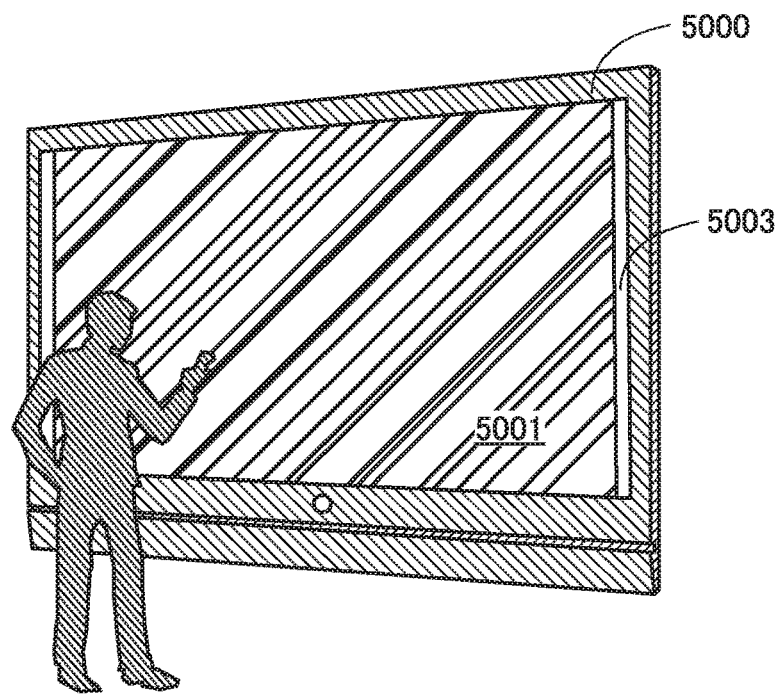
FIGS. 33A and 33B each illustrate an electronic device of an embodiment.
Figure 33B:
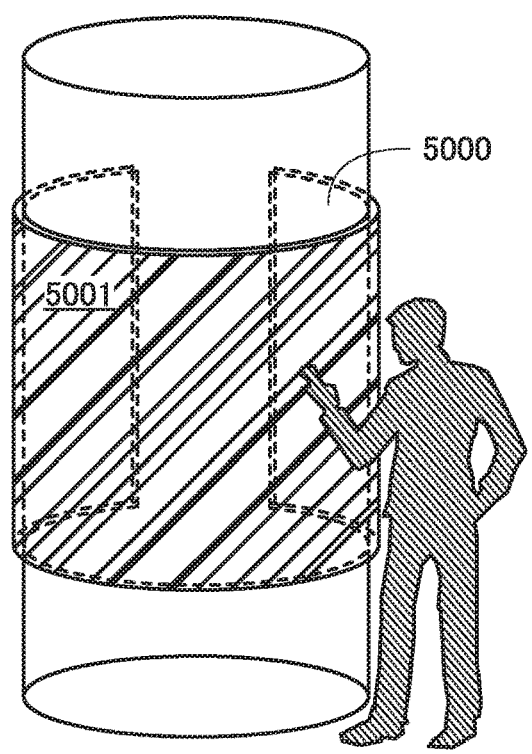

FIG. 32A illustrates a mobile computer, which can include a switch 5009, an infrared port 5010, and the like in addition to the above components. FIG. 32B illustrates a portable image regenerating device provided with a memory medium (e.g., a DVD regenerating device), which can include a second display portion 5002, a memory medium reading portion 5011, and the like in addition to the above components. FIG. 32C illustrates a television device, which can include a stand 5012 and the like in addition to the above components. The television device can be operated by an operation switch of the housing 5000 or a separate remote controller 5013. With operation keys of the remote controller 5013, channels and volume can be controlled, and images displayed on the display portion 5001 can be controlled. The remote controller 5013 may be provided with a display portion for displaying data output from the remote controller 5013. FIG. 32D illustrates a portable game machine that can include the memory medium reading portion 5011 and the like in addition to the above components. FIG. 32E illustrates a digital camera with a television receiver function which can include an antenna 5014, a shutter button 5015, an image receiving portion 5016, and the like in addition to the above components. FIG. 32F illustrates a portable game machine which can include the second display portion 5002, the memory medium reading portion 5011, and the like in addition to the above components. FIG. 32G illustrates a portable television receiver, which can include a charger 5017 capable of transmitting and receiving signals, and the like in addition to the above components. FIG. 32H illustrates a wrist-watch-type information terminal, which can include a band 5018, a clasp 5019, and the like in addition to the above components. The display portion 5001 mounted in the housing 5000 doubling as a bezel includes a non-rectangular display region. The display portion 5001 can display an icon 5020 indicating time, another icon 5021, and the like. FIG. 33A illustrates a digital signage. FIG. 33B illustrates a digital signage mounted on a cylindrical pillar.

The electronic devices shown in FIGS. 32A to 32H and FIGS. 33A and 33B can have a variety of functions. For example, they can have a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading a program or data stored in a recording medium and displaying the program or data on a display portion. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a memory medium (an external memory medium or a memory medium incorporated in the camera), a function of displaying a photographed image on a display portion, or the like. Note that functions which can be provided for the electronic devices shown in FIGS. 32A to 32H and FIGS. 33A and 33B are not limited thereto, and the electronic devices can have a variety of functions.

The electronic devices of this embodiment each include a display portion for displaying some sort of data. The touch panel of one embodiment of the present invention can be used for the display portion.

At least part of this embodiment can be implemented in combination with any of the embodiments described in this specification as appropriate.

This application is based on Japanese Patent Application serial no. 2015-109495 filed with Japan Patent Office on May 29, 2015, the entire contents of which are hereby incorporated by reference.

What is claimed is:

1. A formation method of a film including graphene comprising:
   a first step of forming a film including graphene oxide and comprising a first region and a second region, by applying a dispersion liquid in which graphene oxide is dispersed to a substrate and removing a dispersion medium from the dispersion liquid;
   a second step of forming a film including graphene by light irradiation to the first region to reduce the graphene oxide in the first region; and
   a third step of removing the second region, which is not subjected to the light irradiation, by washing,
   wherein patterning the film including graphene oxide is performed by the second and third steps, and
   wherein the first step, the second step, and the third step are performed in this order.

2. The formation method of a film including graphene according to claim 1,
   wherein the washing is water washing.

3. The formation method of a film including graphene according to claim 2,
   wherein the water washing includes a step of ultrasonic irradiation or a step of high-pressure water flushing.

4. The formation method of a film including graphene according to claim 1,
   wherein the light irradiation is performed with laser light or ultraviolet light.

5. An element comprising:
   a first electrode and a second electrode apart from the first electrode,
   wherein at least one of the first electrode and the second electrode comprises a layer including graphene that is obtained through:
      a first step of forming a dispersion liquid comprising graphene oxide,
      a second step of forming a layer including graphene oxide that includes a first region and a second region, by using the dispersion liquid,
      a third step of reducing the graphene oxide in the first region by light irradiation to the first region, and
      a fourth step of removing the second region, which is not subjected to the light irradiation, by water washing.

6. A touch panel comprising:
   the element according to claim 5; and
   a display portion,
   wherein the first electrode serves as one electrode of a touch sensor,
   wherein the second electrode serves as the other electrode of the touch sensor, and
   wherein the display portion includes a liquid crystal layer.

7. An electronic device comprising:
   the touch panel according to claim 6; and
   at least one of a switch, a speaker, and a housing.

8. A touch panel comprising:
   the element according to claim 5; and
   a display portion,
   wherein the first electrode serves as one electrode of a touch sensor,
   wherein the second electrode serves as the other electrode of the touch sensor, and
   wherein the display portion includes a light-emitting element.

9. An electronic device comprising:
   the touch panel according to claim 8; and
   at least one of a switch, a speaker, and a housing.

* * * * *